United States Patent [19]

Gfeller et al.

[11] Patent Number: 4,460,263
[45] Date of Patent: Jul. 17, 1984

[54] APPARATUS FOR CALCULATING AND DISPLAYING AND/OR CONTROLLING EXPOSURE PARAMETERS FOR PHOTOGRAPHIC PICTURES

[75] Inventors: Karl Gfeller, Langwiesen; Carl Koch, Stetten; Hans C. Koch, Flurlingen, all of Switzerland

[73] Assignee: Sinar AG Schaffhausen, Feuerthalen, Switzerland

[21] Appl. No.: 377,209

[22] PCT Filed: Sep. 8, 1981

[86] PCT No.: PCT/CH81/00100
§ 371 Date: May 7, 1982
§ 102(e) Date: May 7, 1982

[87] PCT Pub. No.: WO82/01080
PCT Pub. Date: Apr. 1, 1982

[30] Foreign Application Priority Data

Sep. 11, 1980 [CH] Switzerland ............ 6837/80

[51] Int. Cl.³ ............................................. G03B 15/05
[52] U.S. Cl. ..................................... 354/415; 354/420
[58] Field of Search ............ 354/23 D, 32, 33, 60 F, 354/415, 420

[56] References Cited
U.S. PATENT DOCUMENTS 4,130,355 12/1978 Ohtaki et al. .................. 354/60 F
4,187,019 2/1980 Uchiyama et al. ............ 354/60 F
4,227,808 10/1980 Yuasa ............................ 354/60 F
4,367,932 1/1983 Ishikawa et al. ............... 354/33
4,373,793 2/1983 Taniguchi et al. ............. 354/60 F Primary Examiner—Russell E. Adams
Attorney, Agent, or Firm—Watson, Cole, Grindle & Watson

[57] ABSTRACT

A camera control device (21) with means for electrically controlling the shutter of a camera and for setting and displaying exposure time and aperture is electrically connected to an electronic exposure computer (22). The latter contains electronic circuitries for the logic operation of exposure parameters which shall be input and output in the form of coded digital signals. In a preferred embodiment, the relative aperture selected for each situation is read into the exposure computer (22) by means of a coder placed in the camera control device (21). The corresponding exposure time is calculated by the exposure computer (22) on the basis of the aperture and other exposure parameters and set automatically at the shutter. The exposure parameter reproducing the brightness of a subject to be photographed can be read into the exposure computer (22) either manually or, by connecting a photoelectric brightness sensor (23), automatically. A flash unit (24) can be connected to the exposure computer (22), the flash output of the flash unit (24) can be controlled by output signals of the exposure computer. As a result of a single test flash the number of flashes that may be necessary is calculated and displayed by means of the exposure computer (22).

14 Claims, 17 Drawing Figures

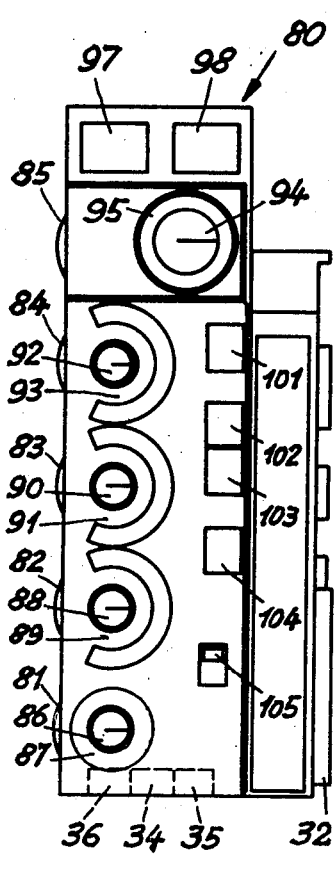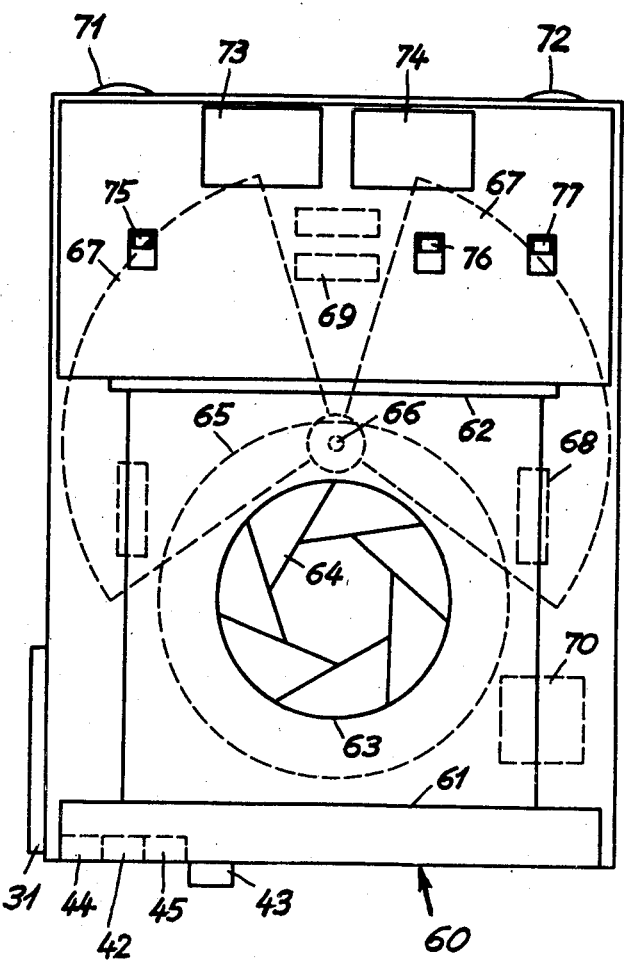

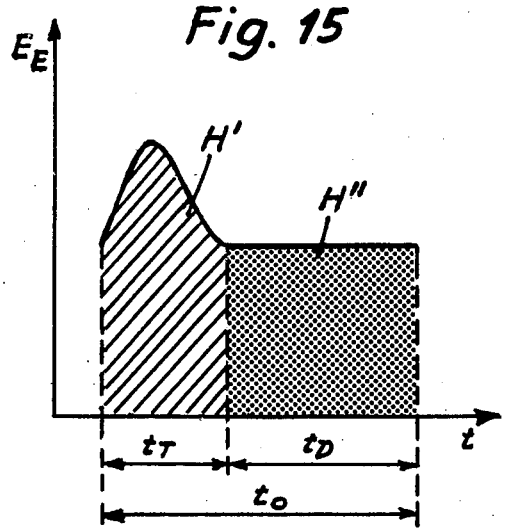
Fig. 15
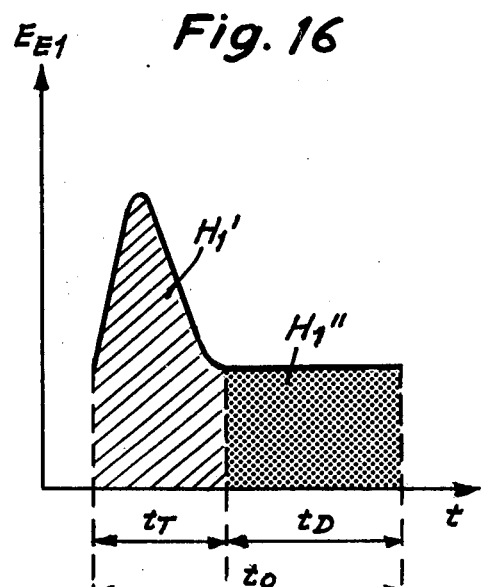
Fig. 16
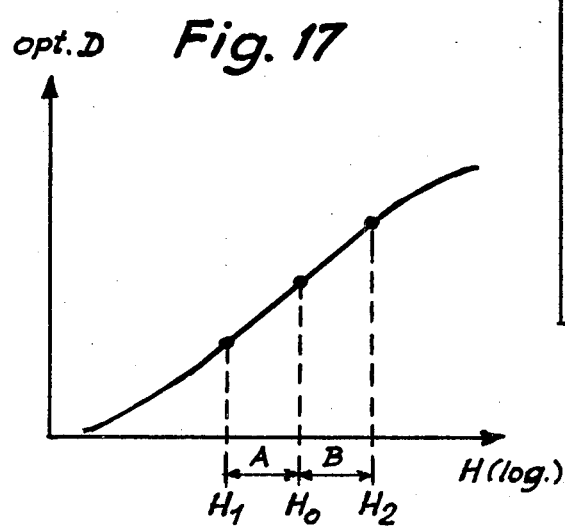
Fig. 17
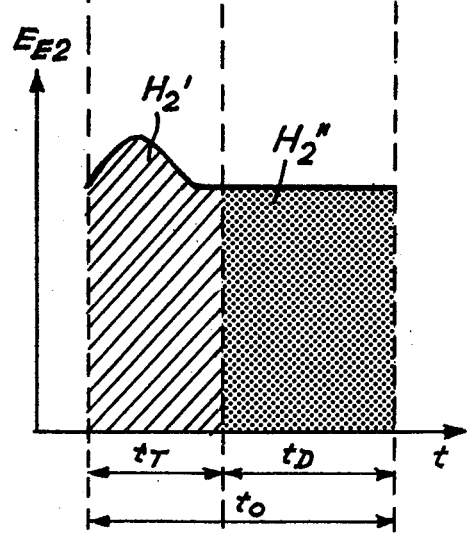

APPARATUS FOR CALCULATING AND DISPLAYING AND/OR CONTROLLING EXPOSURE PARAMETERS FOR PHOTOGRAPHIC PICTURES

The present invention relates to an apparatus for calculating and displaying and/or controlling the values of exposure parameters and particularly the values of exposure time and aperture, in order to take properly exposed photographs, taking into account the data which are characteristic of the particular photographic picture material.

In contrast to device of known construction of this type, the apparatus embodying the principles of the invention is intended to be more universal in use and to permit either a manual or an automatic input of the film data and/or other exposure parameter values. Moreover, the apparatus is intended to continually take account of changes in the data that have been read in, regardless of the time and sequence of such changes. The invention is further designed to determine, as a result of a single test flash measurement, the number of flashes needed for the exact exposure of a shooting and/or to adapt the flash output of at least one flash unit automatically to the other exposure parameter values. Finally, the apparatus of the invention is capable of determining the exposure time needed for an exact exposure at a selected relative aperture even if the light is mixed, that is, if the subject is illuminated with flashlight and with continuous light.

Other objects and advantages, as well as the characteristic features of the invention, will be better understood from the following description taken in connection with the accompanying drawings in which a preferred embodiment and some variations of the subject of the invention have been set forth for purposes of illustration. In the drawings:

FIG. 2 is a rear view of a previously known part of a universal box camera, the front part containing one of the modular units of the apparatus in FIG. 1, carrying a lens provided with an iris stop, and having a camera shutter, a device for setting the iris stop of the lens, as well as display devices for indicating exposure times and stop settings;

FIG. 3 is a view of an exposure-computer module containing another modular unit of the apparatus of FIG. 1;

FIG. 15 is a time/brightness diagram explaining the operation of the apparatus for single-point brightness measurements of a subject illuminated both with flash and with continuous light;

FIG. 16 shows two associated time/illumination diagrams explaining the operation of the apparatus for two-point brightness measurements of a subject illuminated both with flash and with continuous light;

FIG. 17 is a photographic exposure/optical density diagram explaining the operation of the apparatus for brightness measurements.

Figure 1:
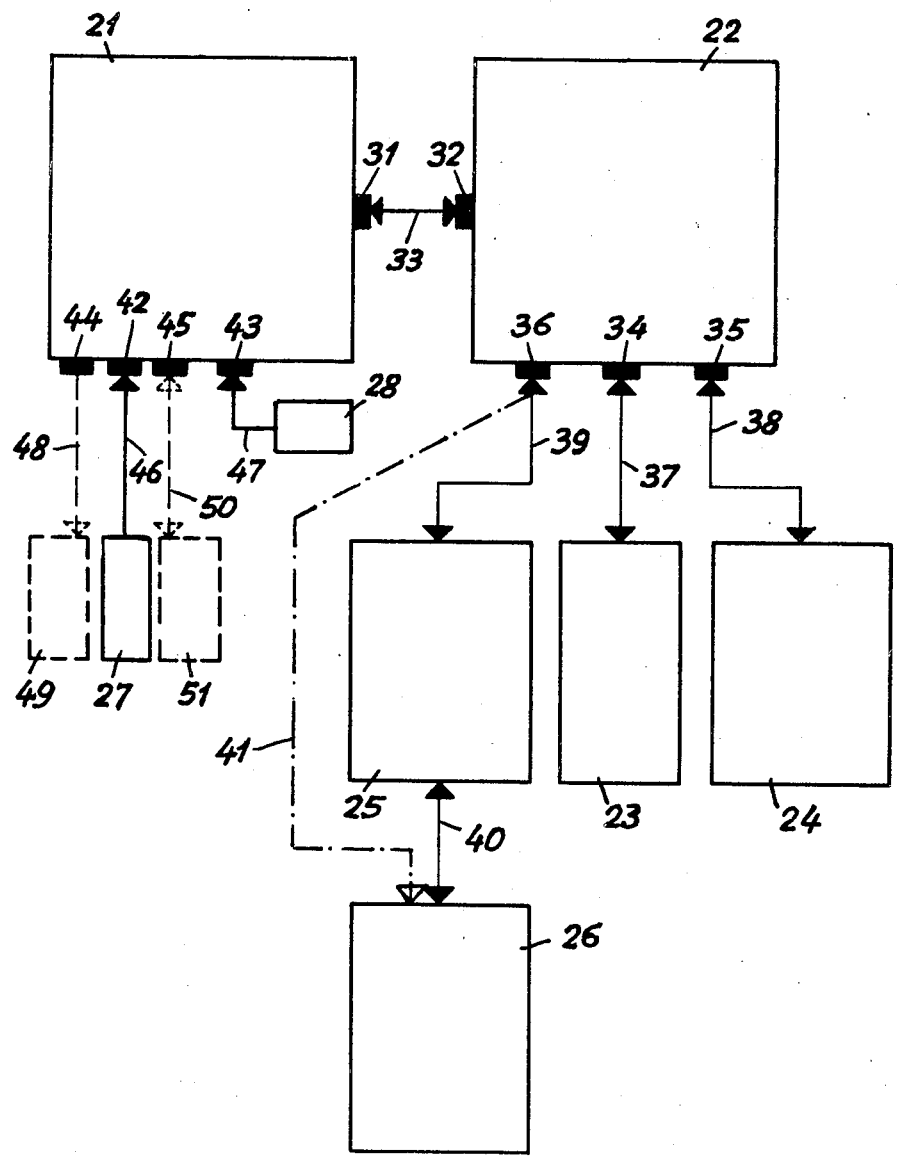
FIG. 1 is a schematic representation of an apparatus according to the invention and consisting of several modular units.

The apparatus shown schematically in FIG. 1 for controlling the exposure of a photographic universal box camera comprises various modular units, namely a camera control unit 21, an exposure computer 22, a photoelectric brightness sensor 23, an electronic flash unit 24 with automatically controlled flash output, a film cassette holder 25, a film cassette 26, a shutter release and automatic cassette controlled shutter closing and reopening control device 27, and a power pack 28 serving as a current source for the electric supply of the whole apparatus. The camera control unit 21 and the exposure computer 22 each have a multipole connector 31 and 32, respectively, which are detachably connected by a multiwire electrical connecting cable for the electrical data transmission in either direction and for supplying electrical power. Advantageously, both connectors 31 and 32 are so constructed that they can also be plugged together directly, so that connecting cable 33 may be dispensed with.

Exposure computer 22 is further provided with three multipole connectors 34, 35 and 36, to which are detachably connected: brightness sensor 23, flash unit 24, or film cassette holder 25, each over a multicore electrical cable 37, 38 or 39 for the electric data transmission in either direction. Another multipole electrical connection 40 for the data transmission is provided automatically between film cassette holder 25 and film cassette 26 if the latter is inserted into the cassette holder. However, instead of via cable 39, cassette holder 25 and cable 40, the film cassette 56 may also be connected directly to connector 36 of exposure computer 22 by means of a multicore cable 41 indicated in FIG. 1 by the broken line.

Camera control unit 21 is likewise provided with some multipole connectors 42-45. The shutter control device 27 is detachably connected to connector 42 by means of a multicore cable 46, while connector 43 is connected to power pack 28 via cable 47. The connector 44 enables the connection of synchronization cable 48 of a flash unit 49. Finally, connector 45 serves to connect a multicore connecting cable 50 leading to a film cassette 51 provided with units for the motor-driven film transport.

If the above-mentioned film cassette 26 has devices for the motor-driven film transport, the film cassette 51, indicated by the broken line, is dispensed with and connecting cable 50 is replaced by connecting cables 39, 40 and 41.

Control unit 21 has electrical circuitries to control the shutter and the lens diaphragm of a photographic camera in which the shutter and the diaphragm can be operated or adjusted by electric signals. Devices for indicating the exposure time and the lens aperture are also provided in control unit 21. Advantageously, control unit 21 can be integrated in a front part of a universal box camera containing the shutter and a stop-setting mechanism, as exemplified by the camera shutter of Sinar AG Schaffhausen, Feuerthalen (Switzerland) sold under the name "SINAR DIGITAL". A camera front part of the above type is illustrated in FIG. 2 and will be described below for a more complete understanding of the invention.

Front part 60 of the camera illustrated in FIG. 2 is shown in a rear view, that is, viewed from the side on which are located holding means 61 and 62 to attach a camera bellows (not shown). Camera front part 60 has a light-admitting aperture 63 through which is visible in FIG. 2 the iris stop 64 of a camera lens 65, which is detachably and interchangeably mounted to the front side. In the interior of camera front part 90 there is provided a shutter 66-69, by means of which light-admitting aperture 63 can be closed to exclude light. Preferably, the shutter is of the type described in German Pat. No. 2 358 929 (U.S. Pat. No. 3,956,761 to Koch et al.) and in German Pat. No. 2 504 912 (U.S. Pat. No. 3,973,269 to Koch et al.). Such shutter has two shutter blades 67, each of which is essentially in the shape of a circular sector and rotating about a common axis 66, and each of which is capable of closing the light-admitting aperture 63 completely. Each shutter blade 67 has two drive mechanisms 68 and 69, by means of which the particular shutter blade can be moved to the open or closed position shown in FIG. 2. An electromotor-driven drive mechanism 70 is further accommodated in the interior of camera front part 60 to adjust iris diaphragm 64 of camera lens 65.

Two manually operated disk-shaped setting mechanisms 71 and 72 for the selection of a desired exposure time for shutter 66-69 or of a desired relative aperture of iris diaphragm 64 are rotatably mounted on the upper part of camera front part 60. The exposure time which is set in each case can be read out from an electrooptical readout panel 73, while the relative aperture selected in each case can be read out in a second electrooptical readout panel 74. Also mounted on the upper part of camera front portion 60 are three manually operated sliding handles 75, 76 or 77 to operate electric switches, which will be described further below. The first sliding handle 75 serves to close and open the shutter; the second sliding handle 76 serves to switch on and off a double exposure lock; the third sliding handle 77 is used to selectively shift the time of the flashlight ignition at the start or shortly before the end of the exposure time set in each case.

Finally, FIG. 2 shows the connectors 31 and 42-45 mentioned earlier with reference to FIG. 1. The details of control unit 21 (FIG. 1) contained in camera front part 60 will be described later.

Exposure computer 22 (FIG. 1) is an essential component of an exposure computer module 80, which in FIG. 3 is shown as viewed from the operating side. Module 80 has five manually operated disk-shaped setting mechanisms 81-85, which are rotatably mounted. The first setting mechanism 81 is coupled to a rotatable dial 86 surrounded by a stationary scale 87. This setting element enables the manual input of the speed of the film material employed.

The second setting mechanism 82 is coupled to a rotating dial 88 surrounded by a stationary scale 89. This setting mechanism 82 enables a code digit to be input in order to take into consideration the so-called Schwarzschild behavior of the film material utilized, that is, the nonlinear correlation between brightness and exposure time for photographic shots with fairly long exposure times.

The third setting mechanism 83 is coupled to a rotating dial 90 surrounded by a stationary scale 91. This setting mechanism 83 permits the selecting setting of exposure computer 22 for different types of brightness measurement, namely, "single-point measurement", "two-point measurement", or "multiple-point measurement", each of the illumination of the subject to be photographed, either with continuous light or with flashlight, as well as "single-point measurement", "two-point measurement", or additional "information measurement" for illumination of the subject with mixed light, i.e., both with continuous light and with flashlight.

The fourth setting mechanism 84 is coupled to a rotating dial 92 surrounded by a stationary scale 93. This setting mechanism 94 permits the photographer to correct, as required, the exposure parameter in ⅓ exposure value steps calculated by exposure computer 22 within a range of, say, +/−3 exposure value steps.

The fifth setting mechanism 85 is coupled by means of an internal gear unit (not shown) to a rotating dial 94. A stationary scale 95 surrounding dial 94 is placed on a transparent carrier, through which dial 94 is visible. The transparent carrier of scale 95 is mounted on a removable and replaceable plate 96. Setting mechanism 85 is used for the manual input of a brightness value which has been determined by means of any photoelectric exposure meter, to which scale 95 has to be adapted. Plate 96 can be replaced by scale 95 in order to be able to match exposure computer 22 to various commonly used exposure meters. As an example, scale 95 can have two sets of values: one set for flashlight and another set for continuous light.

In the upper portion of exposure meter module 80 are placed two electrooptical display panels 97 and 98, which give useful hints to the photographer for flash photography. The first display panel 97 indicates to him the number of identical consecutive flashes needed for a given shot and indicates after each flash how many additional flashes are still necessary. The second indicator panel 98 alerts him on any correction that may be necessary for the flash illumination provided or for the preselected exposure values, which will be explained in more detail below.

Four push buttons 101, 102, 103 and 104 are further provided on exposure computer 80 to actuate electrical contacts, which will be described later. When the first push button 101 is depressed, the data set by means of setting mechanism 85 are stored in exposure computer 22. As soon as the second push button 102 is depressed, the difference between the exposure values resulting from two previous brightness measurements is shown in display panel 83, if for these brightness measurements exposure computer 22 has been prepared for a two-point or multiple-point measurement by means of setting measurement 83. By depressing the third push button 103, the result of checking or information brightness measurements is indicated by exposure computer 22, if the latter is set by means of setting mechanism 83 for the "mixed light" and "information measurement" mode. The result of such checking or information measurement is shown in display panel 73 in the form of an exposure value differential in relation to the previously performed single-point or two-point brightness measurement and does not affect the measuring results obtained previously. The fourth push button 104 serves to switch off the power supply of the whole apparatus.

A sliding handle 105 for operating an electrical switch serves for the selective programming of exposure computer 22 for brightness measurements in the image plane of the camera with the lens diaphragm fully open ("open diaphragm") or with a preselected relative aperture ("working aperture"). At the same time, on account of the position of sliding handle 105, drive mechanism 70 (FIG. 2) for adjusting iris diaphragm 64 is controlled automatically in such a way that the iris diaphragm is fully opened during the brightness measurements or is stopped down to the preselected aperture value.

Finally, FIG. 3 also shows the plug connectors 32, 34, 35 and 36 mentioned above with reference to FIG. 1. The details of the electric circuitry of exposure computer 22 will be described later.

Figure 4:
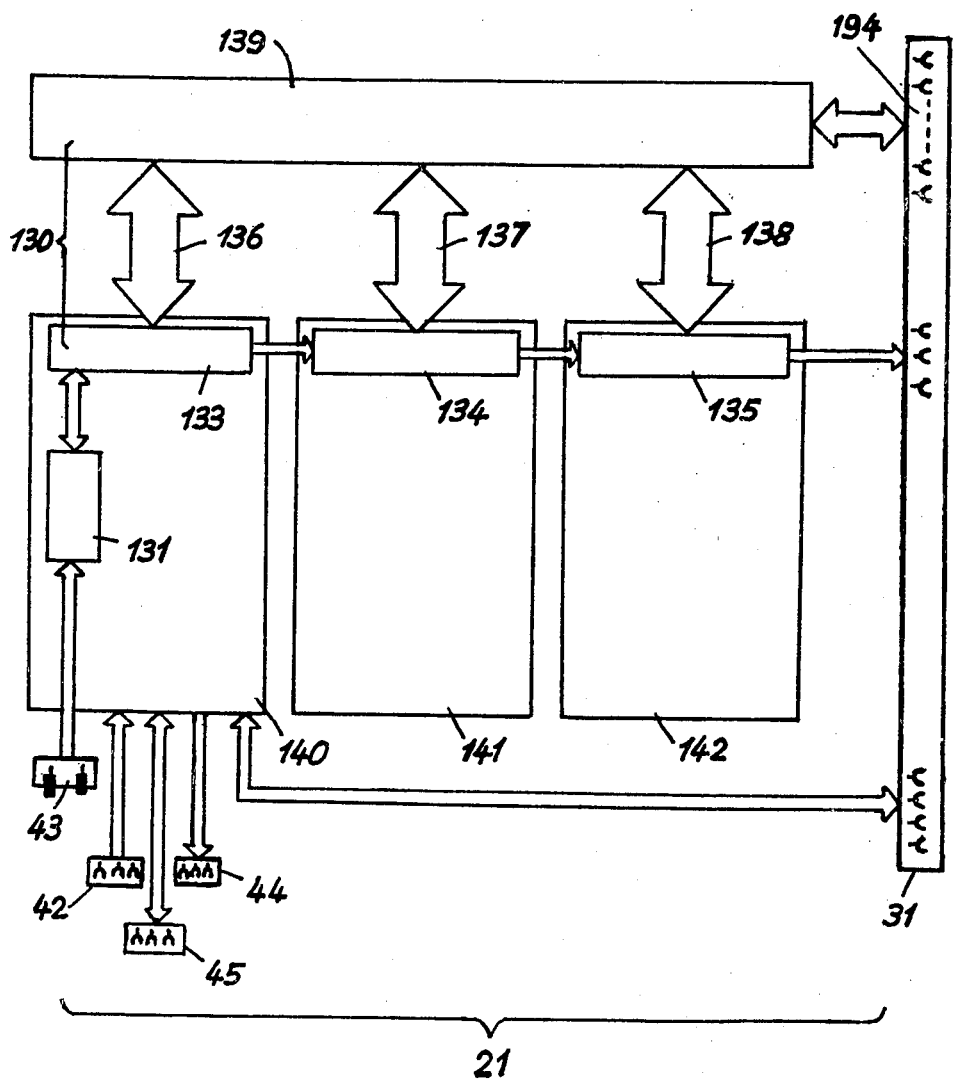
FIG. 4 is a block diagram of the electrical circuitry contained in the camera front part of FIG. 2.

The description of the electric circuitries of the control unit 21 contained in the front part 60 of the camera will be given below. As apparent from the block diagram in FIG. 4, the camera control unit 21 has an electronic logic element 130 in the form of a microprocessor with various signal inputs and outputs, as well as a circuitry 131 for the electric supply. Logic element 130, in turn, comprises a first microprocessor module 133, e.g., of the commonly used type CPU F 3850 of Fairchild Camera & Instrument Corporation, San Jose, Calif. (U.S.A.), a second microprocessor module 134, e.g., of the PIO F 3861 type of the same manufacturer, and a third microprocessor module 135, e.g., of the PSU F 3851 type of the same firm. Each of these microprocessor modules 133-135 is connected via an individual bidirectional data transmission path 136, 137 or 138 to a power line 139 for bidirectional data transmission. The blocks designated in FIG. 4 by the reference numerals 140, 141 and 142 symbolize electrical circuitries, which are shown individually and in greater detail in FIG. 5, 6 or 7. FIG. 4 also shows the plug connectors 31 and 42-25 mentioned above.

Figure 5:
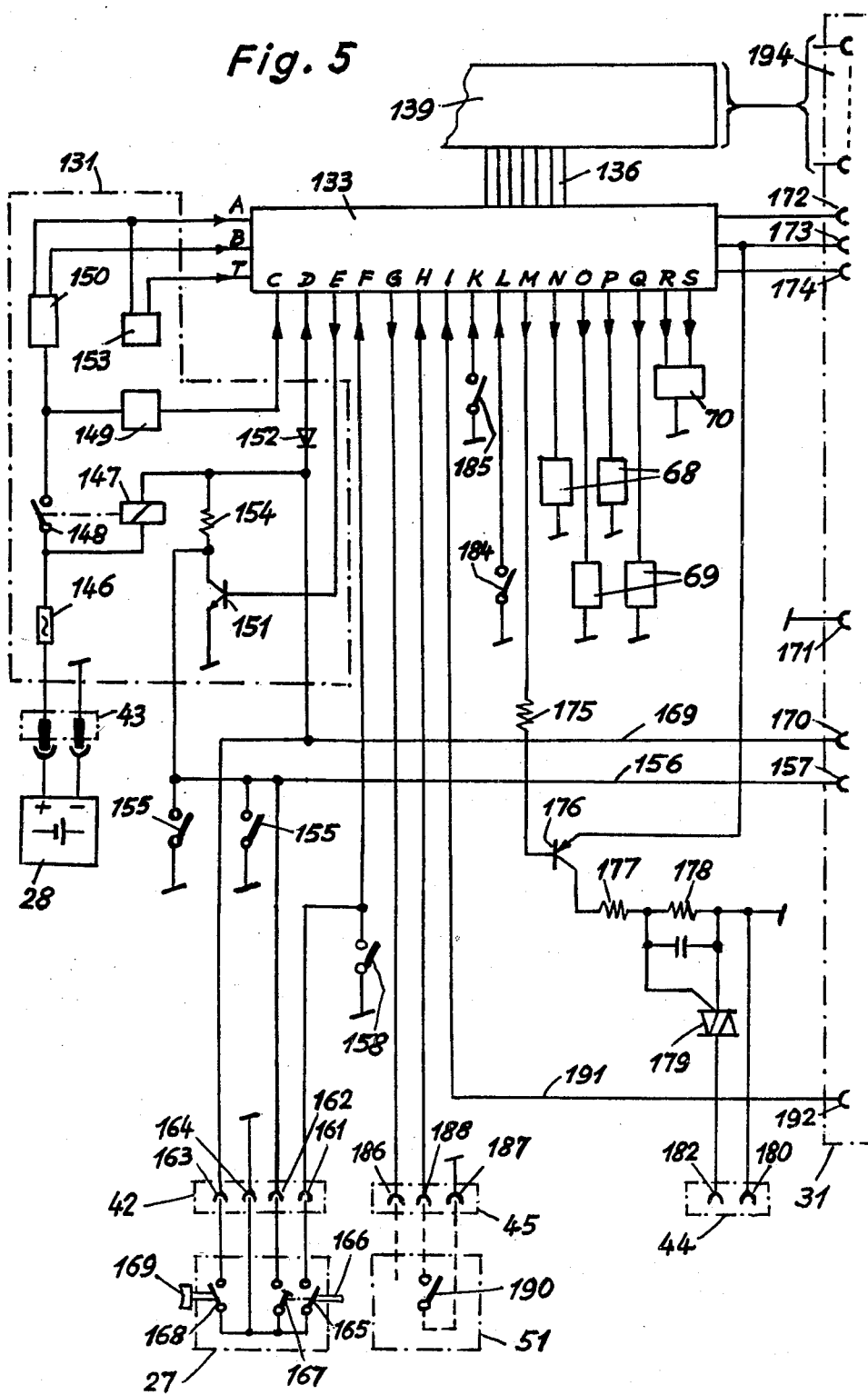
FIGS. 5-7 show the details of the electrical circuitries of the various blocks in FIG. 4.

FIG. 5, which shows the details of block 140 (FIG. 4), again illustrates the first microprocessor module 133 and the circuitry 131 provided for the electrical supply. Circuitry 131 is connected to power pack 28 by means of connector 43 and has a fuse 146, a relay 147 with an associated normally-open contact 148, a voltage monitoring unit 149, a voltage regulator 150, a switching transistor 151, a diode 152, a resistor 154, and a clock generator 153 to control the timing of microprocessor modules 133-135. Voltage regulator 150 delivers a positive supply voltage of 12 V to an input A of microprocessor module 133 and positive supply voltage of 5 V to an input B of module 133. Clock generator 153 supplies the clock pulses to a signal input T of microprocessor module 133. An input C of the latter is connected to voltage monitor 149 and an input D is connected to the collector of transistor 151 over diode 152 and resistor 154. An output E of microprocessor module 133 is connected to the base of transistor 151, while the emitter of transistor 151 is connected to ground. The excitation coil of relay 147 is connected between resistor 154 and the fuse 146 connected to the positive pole of power pack 28. Normally-open contact 148 of relay 147 is located between fuse 146 on one side and voltage monitor 149 and voltage regulator 150 on the other side. To activate the supply circuitry 131 mentioned earlier, various impulse contacts 155 are provided, each of which is connected on one side to the ground conductor and on the other side to the collector of switching transistor 151. By temporarily closing one of contacts 155, the collector-emitter junction of the initially still blocking transistor 151 is bridged, thereby closing the excitation circuit of relay 147. Normally-open contact 148 of relay 147 thereupon closes the supply circuit to microprocessor modules 133-135 and to the other power consumers of the apparatus. In the program memory of microprocessor 133-135 there is provided a command which drives switching transistor 151 immediately into the on-state via signal output E of microprocessor module 133. Thus, relay 147 continues to be energized when contact 155 is no longer operated and opens.

Impulse contacts 155 are each assigned to one of the setting elements 71 and 72 shown in FIG. 2 for the selection of the aperture and the exposure time in such a way that each time one of the setting mechanisms is actuated the associated impulse contact 155 is also closed temporarily, thereby activating supply circuitry 131. Advantageously, other such impulse contacts 155 are assigned to all the setting mechanisms of exposure computer module 80, brightness sensor 103, and flashgun 104. To this end, a conductor 156 connected to the collector of switching transistor 151 is led to a contact member 157 of the above-mentioned connector 31 provided for the connection of exposure computer module 80.

Supply circuitry 131 is turned off by an appropriate signal from output E of microprocessor module 133, thereby driving switching transistor 151 to the off-state, so that excitation coil of relay 147 is deenergized and relay contact 148 opens. Advantageously, microprocessor 133-135 is programmed in such a way that the turn-off mentioned above occurs automatically after a certain time has lapsed since the last closing of one of impulse contacts 155, or since the last operation of one of the various adjusting devices. It will be understood that an extra quiescent-current impulse contact (not shown) may also be provided, the temporary operation of which can break the circuit of relay 147 in order to turn off the supply circuitry 131.

A signal input F of microprocessor module 133 is connected to a switch 158 which can be actuated by means of sliding handle 75. This swtich 158, in turn, is connected to the ground conductor. When switch 158 is closed, input F is at ground potential. This is interpreted by microprocessor module 133 as a "close shutter" command, whereupon microprocessor 133-135 drives one of shutter blades 67 into the closed position, provided the shutter was open previously. Conversely, if switch 158 is open, this will be interpreted by the microprocessor as an "open shutter" command, and the shutter will be driven into the open position, provided it was closed previously. The drive mechanisms 68 and 69 mentioned earlier with reference to FIG. 2 and assigned to each shutter leaf 67 are likewise shown in FIG. 5. It is apparent from this Figure that these drive mechanisms 68 and 69 are connected between the ground conductor on one side and signal outputs N and O or P an Q of microprocessor module 133 on the other side. Drive mechanisms 70 likewise mentioned with reference to FIG. 2 for the setting of iris diaphragm 64 is shown in FIG. 5 as being connected between the ground conductor on one side and two signal outputs R and S on the other side. Microprocessor 133-135 is programmed in such a way that each time shutter 66-69 is closed, iris diaphragm 64 is simultaneously closed down by means of drive mechanism 70 to the preselected relative aperture, and that each time the shutter is opened by operating sliding handle 75 and switch 158, iris diaphragm 64 is completely opened by means of drive mechanism 70.

FIG. 5 also shows details of the above-mentioned connector 42 and of shutter control device 27. A contact member 161 of connector 42 is connected to signal input F of microprocessor module 133. A second contact member of the same connector is connected to the collector of transistor 151. A third contact member 163 of connector 42 is connected to the cathode of diode 152, and a fourth contact member 164 of the same connector is connected to ground. The shutter control device 27 includes a contact 165 provided between contact member 161 and ground terminal 164 and which can be closed by means of an actuating pin 166. Control device 27 is mechanically and detachably connected to film cassette holder 25 in such fashion that actuating pin 166 is automatically actuated by inserting a film cassette into the cassette holder. Hence, contact 165 is open as long as no film cassette is inserted into the cassette holder, but is closed if a film cassette is inserted. It is readily apparent that, from the electrical point of view, contact 165 is parallel to switch 158 used to open and close the shutter. Thus, inserting a film cassette into the cassette holder will automatically drive the shutter into its closed position, while removing it therefrom will automatically drive it into its open position and stopping down iris diaphragm 64 to the preselected relative aperture. Mechanically coupled to contact 165 is an instantaneous or impulse contact 167 located between contact member 162 and ground terminal 164 and, electrically speaking, it is connected in parallel to impulse contacts 155 for activating supply circuitry 131. Thus, inserting a film cassette into the cassette holder, as well as removing it therefrom, will automatically activate supply circuitry 131, if the latter has been turned off previously.

Finally, control device 27 has an impulse contact 168 located between contact member 163 and ground terminal 164 and which can be closed by means of push button 169 used to release the shutter to take a picture, this being the reason why push button 169 will be hereinafter referred to as a "shutter release".

It is apparent from FIG. 5 that by actuating shutter release 169, one end of the excitation coil of relay 147 as well as the cathode of diode 152 are connected directly to ground. This will, on the one hand, close the excitation circuit of relay 147, thereby activating supply circuitry 131, if this has not been done previously. On the other hand, ground potential is applied to signal input D of microprocessor module 133 over diode 152. This status of signal input D is interpreted by the microprocessor as a trigger command, if signal input F is also at ground potential, that is, if the shutter is in the closed position and iris diaphragm 64 of camera lens 65 is stopped down to the preselected relative aperture. Thereupon, microprocessor module 133 drives the shutter into its open position and, after expiration of the set exposure time, again to its closed position.

Microprocessor 133-135 is programmed in such a way that by actuating shutter release 169 when the shutter is in its open state, that is, if no film cassette has been inserted and, hence, the camera permits focusing screen observation, drive mechanism 70 is switched on to adjust iris diaphragm 64 and, by means of setting element 72, the latter is stopped down to the preselected relative aperture. Contact 168 opens after release 169 is set free and iris diaphragm 64 is again driven to its fully opened position by means of drive mechanism 70.

It should especially be noted that upon activation of supply circuitry 131 by closing one of contacts 155 and 167, the shutter cannot be released and the diaphragm cannot be closed to the preselected relative aperture, because resistor 154 in the excitation circuit of relay 147 would then cause the potential across the cathode of diode 152 and, hence, across signal input D of microprocessor module 133, to be sufficiently high above ground potential so as not to be interpreted as a command for releasing the shutter or for stopping the iris diaphragm down to the preselected relative aperture.

The contact member 163 of connector 42 connected to trigger contact 168 is also connected to a contact member 170 of connector 31 via a conductor 169 for the connection of exposure computer module 80. This connector 31 also has a contact member 171, which is connected to ground, and other contact members 172, 173 and 174, which are connected to inputs A, B or T of microprocessor module 133. A signal input M of microprocessor module 133 is connected to the base of a switching transistor 175 via a resistor 175, the emitter of said switching transistor 176 being connected to the supply voltage +5 V and its collector being connected to the ground conductor via two parallel-connected resistors 177 and 178.

The connection between the two resistors 177 and 178 is connected to the control electrode of a triac 179. One main electrode of triac 179 is connected to the ground conductor and to a contact member 180 of the above-mentioned connector 44, while the other main electrode of the triac is connected to a second contact member 182 of the same connector 44, which is provided for the connection of the synchronization cord of flash unit 49 (FIG. 1). As long as no ignition signal is applied to output M of microprocessor module 133, transistor 176 is in the off-state, with no current flowing through resistors 177 and 178, and the control electrode of triac 179 is at ground potential. In this case, triac 179 acts as a blocking element. If, on the other hand, an ignition signal appears at output M, transistor 165 is switched to the on-state, causing current to flow through resistors 177 and 178. This results in a positive voltage across the control electrode of the triac, by which the triac is ignited, that is, it is switched to the on-state, causing the flash unit, which is connected to connector 44, to be ignited.

A signal input L of microprocessor 133 is connected to a changeover switch 184 which can be operated by means of sliding handle 77 (FIG. 2) and, in one of its switching positions, applies ground potential to signal input L, but leaving it open in its other switching position. By means of this changeover switch 184, it is possible to switch the flashlight-synchronization time either at the start or toward the end of the exposure time.

Another signal input K of microprocessor module 133 is also connected to a changeover switch 185, which can be operated by means of sliding handle 76 (FIG. 2) and which in one of its switching positions brings signal input K to ground potential, but leaves it open in the other switching position. The first-mentioned switching position of this changeover switch 185 causes a double exposure lock, while the other switching position enables two or more consecutive exposures to be taken.

A signal output G of microprocessor module 133 is connected to a contact member 186 of connector 45 also mentioned earlier and designed to connect the electric circuitry of film cassette 51 provided with devices for the electromotor-driven film transport. Connector 45 also has a contact member 187, which is connected to the ground conductor and another contact member 188, which is connected to a signal input H of microprocessor module 133. When the double exposure lock is turned on by means of changeover switch 185, there appears after each exposure at outlet G of module 133 a signal which causes, via contact member 186 of connector 45, the film feed devices of the connected film cassette 51 to make one film-feed step corresponding to the exposed footage. It goes without saying that as long as the film feed is not completed, there shall be no other exposure. This is ensured by an electric contact 190 provided in the film cassette which, as shown by the dashed lines in FIG. 5, connects terminal 188 to ground terminal 187 until the film feed is terminated. By means of contact 190, signal input H of microprocessor module 133 is brought to ground potential, so that the release of the camera shutter is blocked. By opening contact 190, the "readiness to shoot" status of the connected film cassette for another photographic picture is reported to microprocessor module 133 and the double exposure lock for another shot is released. In addition, contact 190 may also be operated, say, by means of the dark slide in order to block the release, as long as the dark slide is not open. Another signal input I of microprocessor module 133 has the same release/blocking function as signal input H and is connected to a conductor 191, which leads to a connection 192 of plug connector 31 for the closing of exposure computer module 80. If and as long as ground potential is applied to conductor 191 and, thus, to signal input I, release of the shutter is impossible.

It should also be mentioned that also the bidirectional collecting line 139 is connected to a group of contact members 194 of connector 31, as illustrated in FIGS. 4 and 5.

Figure 6:
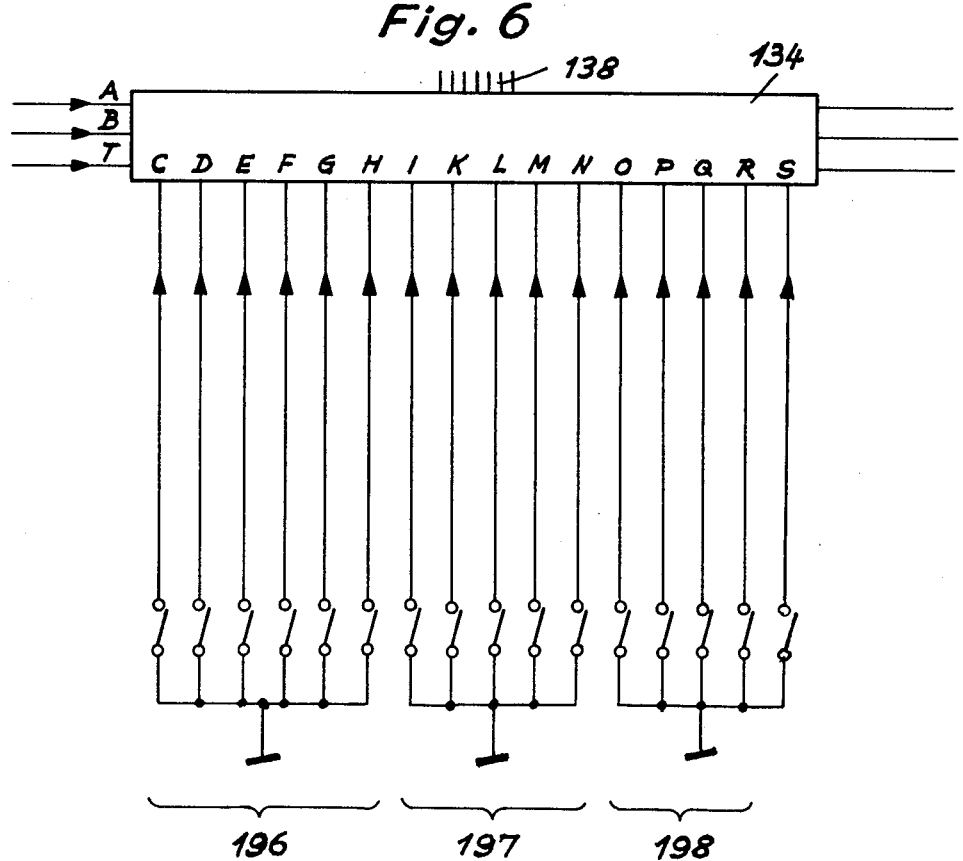

FIG. 6, which shows details of block 141 (FIG. 4), again illustrates the second microprocessor module 134. Its inputs A, B and T are connected in parallel to the inputs of the first microprocessor module 133 which carry like signs. Connections C, D, E, F, G and H of the second microprocessor module 134 are also programmed as signal inputs, each of which is connected to a contact of a 6-bit coder 196 in order to input the exposure time of the shutter required in each case. Similarly, other signal inputs I, K, L, M and N of microprocessor module 134 are each connected to a contact of a 5-bit coder 197 in order to preselect the relative aperture of iris diaphragm 64 of camera lens 65 (FIG. 2) required in each case. The two coders 196 and 197 can be manually operated independently of each other by setting mechanisms 71 and 72 (FIG. 2). Finally, the microprocessor module has other signal inputs O, P, Q, R and S which are each connected to a contact of a 5-bit coder 198. The latter is coupled mechanically to iris diaphragm 64 or to its drive mechanism 70 and serves to input signals which reproduce the actual working aperture.

Figure 7:
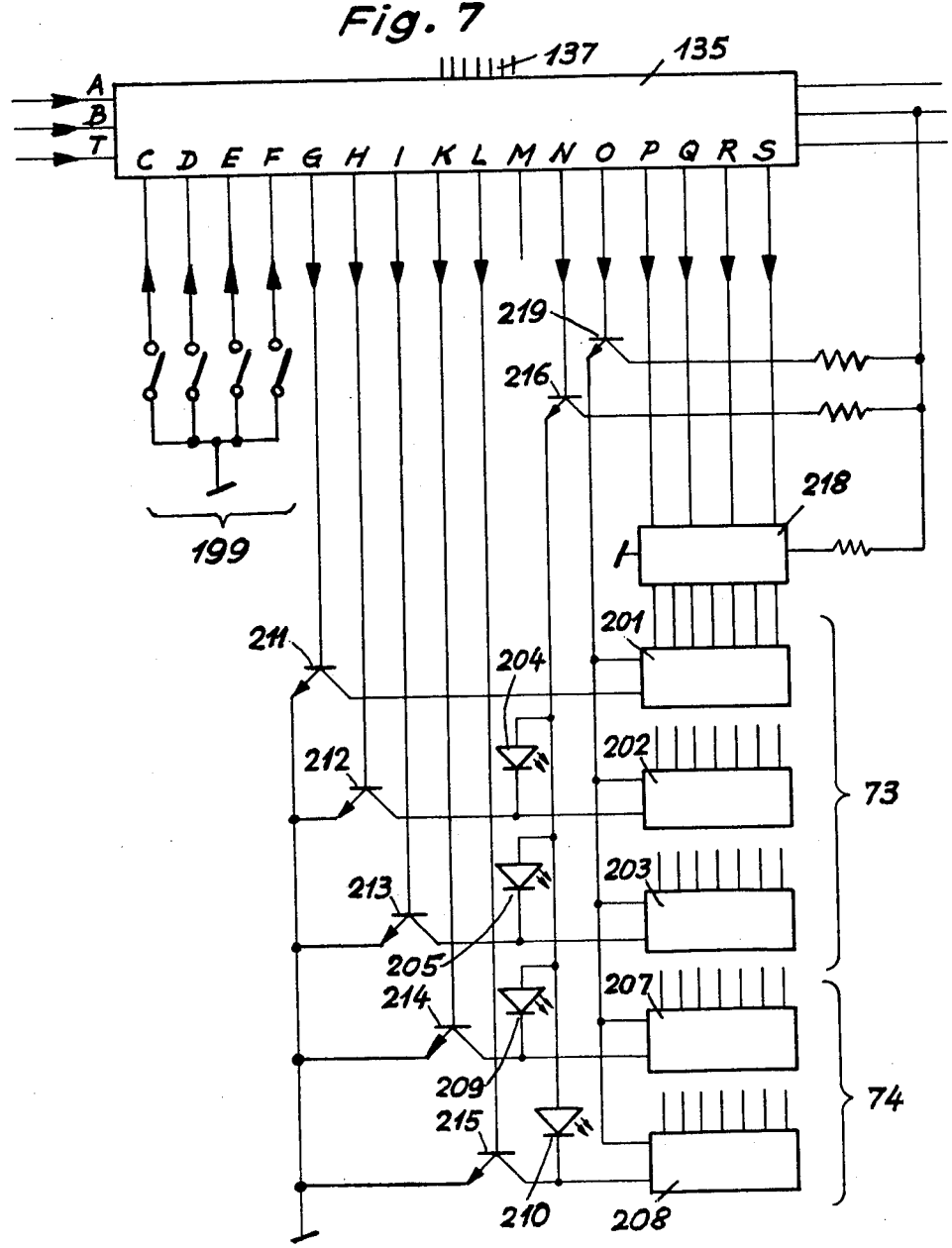

FIG. 7, which shows details of block 142 (FIG. 4), again illustrates the third microprocessor module 135. Its inputs A, B and T are connected to the inputs of the first and second microprocessor module 133 and 134 with like signs. Microprocessor module 135 has signal inputs C, D, E and F, which are each connected to a contact of a 4-bit coder 199. It is practical to connect the latter in such a way that it is operated automatically by the interchangeable lens 65 mounted on the camera, during which operation the relative f-number of the lens concerned and, thereby, the maximum practicable relative aperture is input into the microprocessor.

FIG. 7 also shows three 7-segment digital displays 201, 202 and 203 and two LEDs 204 and 205 which are both located in the display panel 73 mentioned earlier to indicate the preselected exposure time. One of the internationally adopted exposure time values is shown by means of digital displays 201–203, and by means of the 2 LEDs the intermediate values ⅓ and ⅔ exposure time steps are indicated as well. The same display panel 73 also indicates results of exposure computer 22 and, as required, measuring results of brightness sensor 23 can also be indicated. This will be described later.

FIG. 7 also shows two other 7-segment digital displays 207 and 208, which are provided together with two LEDs 209 and 210 in the second display panel 74 mentioned earlier to indicate the relative aperture preselected in each instance. By means of digital displays 207 and 208 one of the internationally adopted stop values is indicated and by means of the 2 LEDs also the intermediate values ⅓ or ⅔ f-stop. To activate the digital displays 201, 202, 203, 207 and 208, switching transistors 211–215 are provided, the base of which is controlled by a signal from a signal output G, H, I, K or L of microprocessor module 135. To activate LEDs 204, 205, 209 and 210 there is also provided, besides the switching transistors 211–215 mentioned earlier, another switching transistor 216, the base of which is controlled by a signal output N of microprocessor module 135. The five digital displays 201, 202, 203, 207 and 208 as well as the four LEDs 204, 205, 209 and 210 are activated individually and consecutively at brief intervals, the time sequence being selected so that the impression of a standing display is created for the human eye. Further signal outputs P, Q, R and S of microprocessor module 135 are connected to the inputs of a decoder 218, the outputs of which are connected to the individual luminous segments of the 7-segment digital displays 201, 202, 203, 207 and 208 so as to define which segments of the digital displays controlled in each case shall be activated. Finally, a signal output O of microprocessor module 135 is connected to the base of another switching transistor 219, which serves to control the decimal points of digital displays 201, 202, 203, 207 and 208.

In order to have to allocate fewer terminals of microprocessor module 135, in a modified embodiment not shown herein the switching transistors 211–215 could be controlled by means of a decoder.

The essential circuitries of exposure computer 22 will now be described with reference to FIGS. 8–11.

Figure 8:
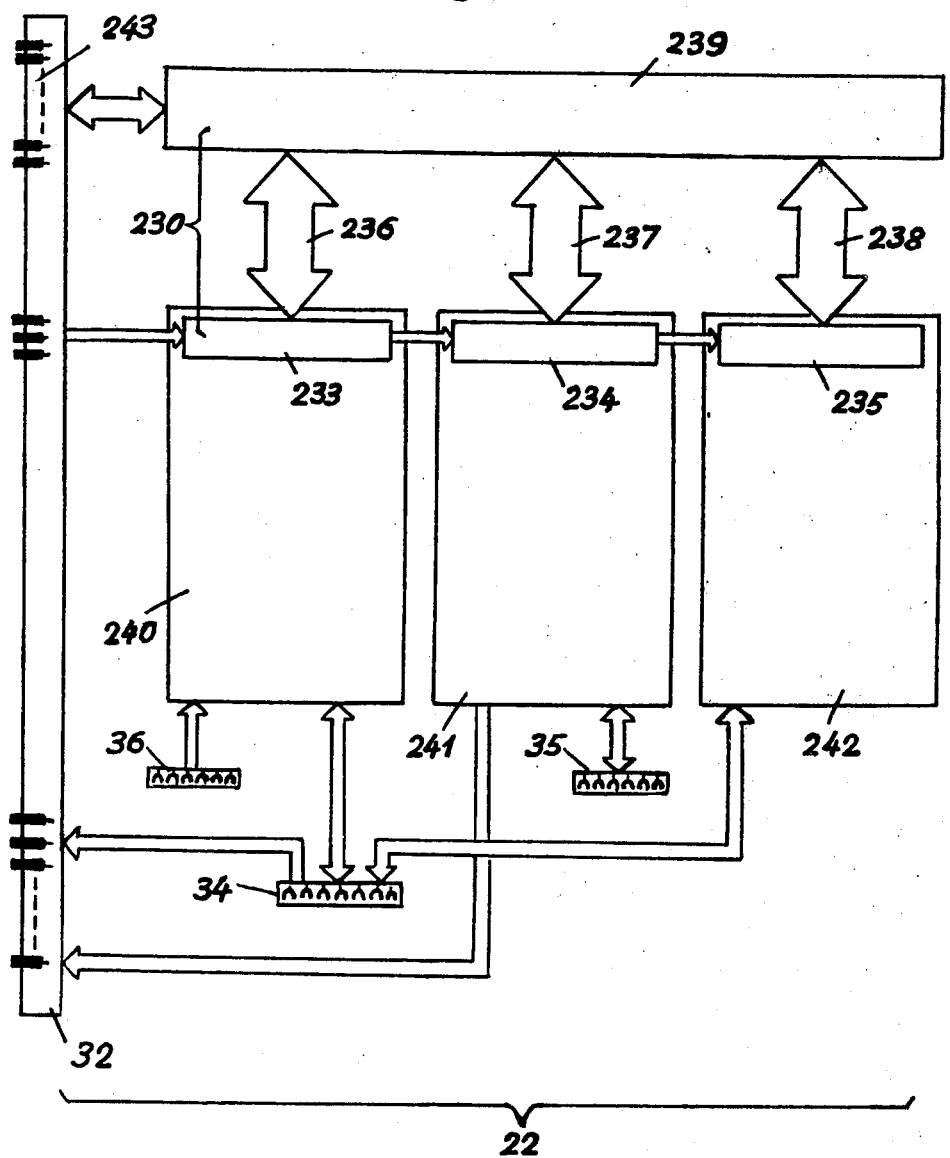
FIG. 8 is a block diagram of the electrical circuitry contained of the exposure-computer module in FIG. 3.

As apparent from the block diagram in FIG. 8, exposure computer 22 contains an electronic logic element 230 in the form of a microprocessor having three identical microprocessor modules 233, 234 and 235, e.g., of the commonly used type PSU F 3851 manufactured by Fairchild Camera & Instrument Corporation, San Jose, Calif. (USA). Each of these microprocessor modules 233–235 is connected via an individual bidirectional data transmission path 236, 237 or 238 to collecting mains 239 for bidirectional data transmission. The blocks designated in FIG. 8 by reference numerals 240, 241 and 242 symbolize electric circuitries which are shown in greater detail in FIGS. 9, 10 and 11. The connectors 32, 34, 35 and 36 already shown in FIG. 1 are also illustrated in FIG. 8. It is also apparent that collecting mains 239 is connected to a group of contact members 243 of connector 32. If both connectors 31 and 32 of control unit 21 or of exposure computer 22 are connected with each other directly or via connecting line 33 (FIG. 1), collecting mains 139 (FIG. 4) and collecting mains 239 (FIG. 8) are coupled together.

Figure 9:
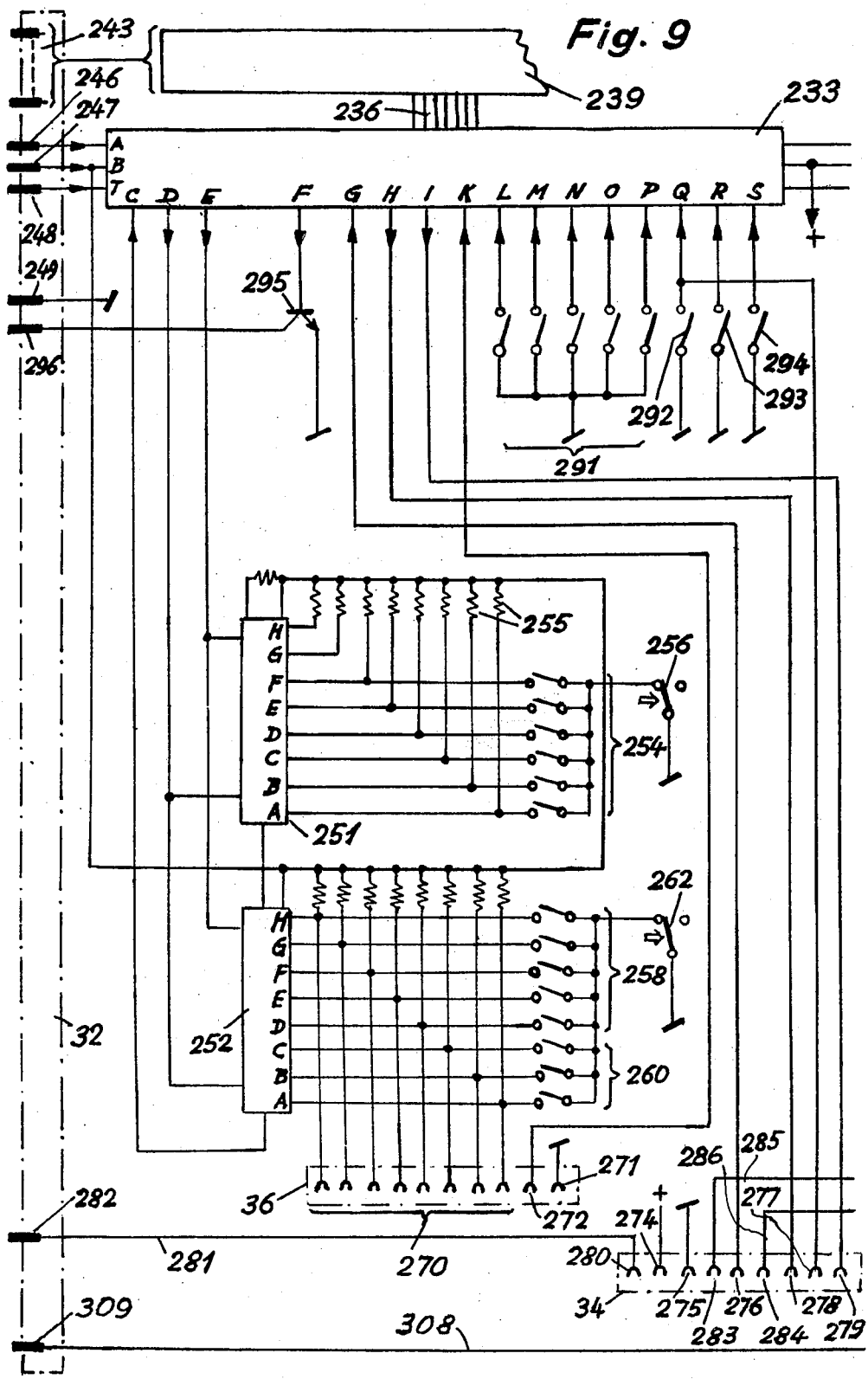
FIGS. 9-11 show the details of the electrical circuitries of the various blocks in FIG. 8.

FIG. 9, which shows details of block 240 (FIG. 8), again shows first microprocessor module 233 and connectors 32, 34 and 36. Inputs A, B and T of microprocessor module 233 are connected to contact members 246, 247 and 248 of connector 32 and, when connecting line 33 (FIG. 1) is inserted on both sides of connectors 31 and 32 are inserted together directly, they are coupled with the inputs of microprocessor modules 133–135 of control unit 21 which carry like signs. Accordingly, a supply voltage of 12 V is fed to input A of microprocessor module 233, a supply voltage of 5 V is fed to input B, and a clock signal from clock generator 153 (FIG. 5) is routed to input T. Another contact member 249 of connector 32 is connected to the frame of exposure computer 22 and is connected to the ground conductor of control unit 31.

The circuit arrangement of FIG. 9 further has two shift registers 251 and 252, each with 8 control inputs A to H. Each of inputs A, B, C, D, E and F of the first shift register 251 is provided with a contact of a 6-bit coder 254 coupled to the setting mechanism 85 shown in FIG. 3 and serving to manually input a value which reproduces the brightness of the subject to be photographed or, if flashlight is used, reproduces the luminous energy fed to the subject to be photographed.

With the coding contact open, a potential of +5 V is fed to the relevant control input of shift register 251 via a resistor 255. When a coding contact is closed at any one time, the control input concerned is at ground potential via a switch 256. The two unused inputs G and H of shift register 251 are each constantly at a positive potential via a resistor.

Control inputs D, E, F, G and H of the second shift register 252 are each connected to a control of a 5-bit coder 258 which is coupled to the setting mechanism 81 already shown in FIG. 3 serving to manually input a photographic film which reproduces the photosensitivity of the photographic film used. The other control inputs A, B and C of second shift register 252 are each connected to a contact of a 3-bit coder 260 which, as apparent from FIG. 3, is coupled to a setting mechanism 82 which serves to input a value for correcting the Schwarzschild effect during long-time exposures and/or for correcting the additive behavior of the photosensitive material during flash exposures with several consecutively fired flashes. As in the first shift register 251, also in the second shift register 252 all control inputs A to H are each connected via a resistor 261 to the +5 V supply voltage. When a coding contact is closed at any one time, the control input concerned is at ground potential via a switch 262.

When the light and film data defined by the various contact combinations of code 254, 258 and 260 shall be read in parallel into the two shift registers 251 and 252, a signal output D of microprocessor module 233 transmits to the shift register a signal as a "parallel load" command. Thereafter, the data read into shift registers 251 and 252 are entered serially via signal input C of microprocessor module 233 as a function of a clock signal delivered to both shift registers by output E of microprocessor module 233.

Control inputs A to H of second shift register 252 are likewise connected to a group of contact members 270 of connector 36 designed to connect film cassette holder 25 or film cassette 26 (FIG. 1). The film cassette 26 to be inserted into cassette holder 25 has a 5-bit holder (not shown) similar to coder 258, as well as a 3-bit coder (likewise not shown) similar to coder 260. Each of these two coders in film cassette 26 is set when the cassette is loaded with unexposed photographic film material, depending on the speed and on the individual Schwarzschild and/or additive behavior of the film material concerned. When film cassette 26 thusly prepared is inserted into cassette holder 25, the two coders of the film cassette are connected to control inputs A to H of shift register 252 either via multicore connecting lines 40 and 39 (FIG. 1) or via the direct connecting line 41 indicated by the broken line in FIG. 1.

In a modification of the construction described above, film cassette 26 may be provided with either insertable or engageable and disengageable coding pins, which enable the coded film data to be transmitted mechanically to corresponding electrical coding contacts in cassette holder 25 when the film cassette is inserted into the cassette holder.

Connector 36 further has a contact member 271, which is connected to the ground conductor, as well as another contact member which is connected to a signal input K of microprocessor module 233. These contact members 271 and 272 are also connected to film cassette 26 either via connecting lines 39 and 40 or via direct connecting line 41. Ground terminal 271 ensures the ground connection to the coding contacts placed in film cassette 26 so that they are parallel to the contacts of coders 258 and 260.

The switch 262 mentioned earlier can be operated against the resilience of a resetting spring by means of an actuating pin positioned near connector 36 in such a way that in each instance, by connecting the connecting line 39 (FIG. 1) leading to cassette holder 25 or the connecting line 41 (FIG. 1) leading directly to film cassette 26, switch 262 is automatically opened at connector 36, thereby disabling the coders 258 and 260 to be operated manually, so that only the film data defined by the coders of film cassette 26 can be read into shift register 252. To prevent, during the insertion of film cassette 26 into cassette holder 25, indeterminate and random combinations of coding contacts from being read into shift register 252 like film data, a disabling signal is delivered to signal input K of microprocessor module 233 via contact member 272 of connector 36, as long as film cassette 26 is not inserted completely and properly into cassette holder 25, which signal inhibits the reading of the film data into shift register 252. This disabling signal is controlled by means of a break contact, which is built into cassette holder 25. This break contact is opened only if the film cassette has been properly inserted into film cassette 26.

The switch 256 mentioned earlier can also be operated against the thrust of a resetting spring by means of an actuating pin. The latter is positioned near connector 34 designed to connect brightness sensor 23 (FIG. 1) so that in each instance, as a result of the connection of the connecting line 37 (FIG. 1) leading to the brightness sensor, the switch 256 is automatically opened at connector 34, thereby disabling the coder 254.

In a modified embodiment not shown herein, the two switches 256 and 262 may be replaced by switching transistors which can be driven into the off-state via contact members of connectors 34 and 36 and of the corresponding counterparts of the connecting lines 39, 37 and 41.

As can be seen in FIG. 9, connector 34 has a contact member 274, which is connected to the supply voltage conductor carrying +12 V, a contact member 275, which is connected to the ground conductor, two contact members 276 and 277 which are each connected to a signal input G or Q of microprocessor components 233, as well as two contact members 278 and 279, which are each connected to a signal output H or I of microprocessor component 233. Another contact member 280 of connector 34 is connected to a contact member 282 of connector 32 by means of a conductor 281 so as to be connected to conductor 156 of control unit 21 via the corresponding contact member 157 (FIG. 5) of connector 31. Finally, connector 34 is provided with two other contact members 283 and 284, which are each connected to a conductor 285 or 286 leading to the circuitry of FIG. 11.

Each of signal inputs L, M, N, O and P of microprocessor component 233 is connected to a contact of a 5-bit coder 291, which contacts are connected on the other side to the ground conductor. Coder 291 9s coupled to the setting element 83 of FIG. 3, which enables the selection of the brightness measurement concerned, namely "single-point measurement", "two-point measurement", or "multipoint measurement," and the programming of exposure computer 22 in accordance with the type of light for the illumination of the subject provided for the intended photographic exposure, namely, either for "continuous light", "flashlight", or "mixed light", i.e., both for continuous light and flashlight simultaneously.

Signal input Q of microprocessor component 233 can be connected to the ground conductor by means of an impulse contact 292 that can be operated through push button 101 (FIG. 3) to initiate the input of the data preset at coder 254 by means of setting mechanism 85 of exposure computer 22 and their processing with the other preset exposure parameter values.

Still another signal input R of microprocessor module 233 can be connected to the ground conductor by means of an impulse contact 293 that can be operated by depressing push button 102 (FIG. 3) in order to display a difference in brightness or contrast, i.e., to indicate the exposure value difference derived from two previous results of brightness measurements for the measuring mode "two-point measurement" or from the lowest and highest result of the brightness measurements for the measuring mode "multipoint measurement" in display panel 73 of camera front part 60 (FIG. 2). Finally, a signal input S of microprocessor component 233 can be connected to the ground conductor by means of an impulse contact 294 that can be operated through push button 103 (FIG. 3) in order, when setting the setting mechanism 83 "mixed light" and "information measurement", to indicate the results of additional checking or information brightness measurements in display panel 73 of camera front part 60 (FIG. 2) without requiring these additional results to be processed with the other exposure parameter values by means of exposure meter 22.

When describing the shutter control device 27 shown in FIG. 27, it was mentioned that shutter 67 and iris diaphragm 64 of camera lens 65 are automatically driven to their fully opened position if switch 158 is open and no film cartridge has been inserted into the cartridge holder, so that contact 165 is also open. It was also described that in this instance, by operating release 169 the drive mechanism 70 of iris diaphragm 64 can be caused to close the latter down to the relative aperture preselected by means of setting element 72 (FIG. 2). In this way, it is possible not only to observe the focusing screen either with a fully opened iris diaphragm or with an iris diaphragm which is closed down to the preselected aperture value, but also to take brightness measurements in the image plane either in one or in the other position of the iris diaphragm.

It is a known fact that brightness measurements for photographic purposes can be taken either by means of a photoelectric converter located outside the camera or by means of a photoelectric converter located in the image plane of the camera. In the first instance, it is termed "external measurement", in the second case "internal measurement". According to what has been stated above, the "internal measurement" can be performed either with a fully opened iris diaphragm ("open aperture") or with an iris diaphragm ("working aperture") which is closed down to the preselected relative aperture. Now, in order that for "internal measurements" with "working aperture" release 169 must not be pressed continuously (FIG. 5), a switching transistor 295 is provided in FIG. i, the base of which is connected to a signal input F of microprocessor module 233, while the collector-emitter junction of this transistor 295 is located between the ground conductor and a contact member 296 of connector 32. This contact member 296 is designed to be connected to the corresponding contact member 170 of connector 31 of control unit 21, so that the collector-emitter junction of transistor 295 is connected electrically parallel to release contact 168. Transistor 295 is driven to the on-state by a signal delivered from output F of microprocessor module 233 if, in a manner to be described later, exposure computer 22 is programmed for "internal measurement" with "working aperture".

Figure 10:
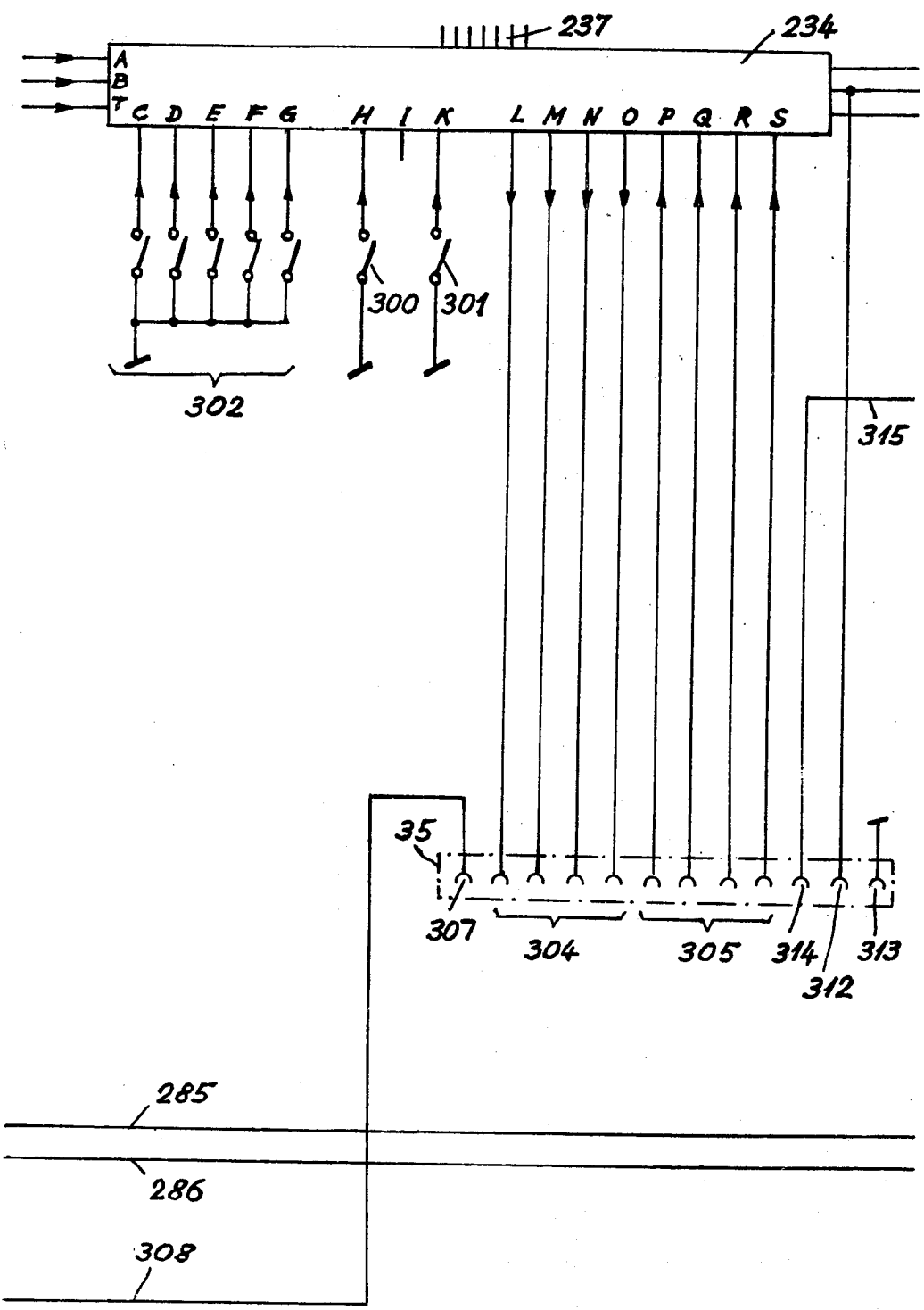

FIG. 10, which shows details of block 241 (FIG. 8), again shows the second microprocessor module 234 and the connector 35. Inputs A, B and T of microprocessor module 234 are connected to the inputs of the first microprocessor module 233 bearing like signs. Ground potential can be applied to a signal input H of microprocessor module 234 by means of a contact 300. In one position of switch 300, exposure computer 22 is programmed for "internal measurement" and in the other position for "external measurement" of the brightness, if brightness sensor 23 (FIG. 1) is not connected to connector 34 (FIG. 9), so that the brightness values have to be input manually by means of coder 254 (FIG. 4) to be operated by means of focusing means 85 (FIG. 3). Contact 300 can be connected by a cam (not shown in the drawing) on the rear side of plate 96 (FIG. 3) carrying the scale 95. In the absence of such a cam on plate 96, contact 300 remains open. Depending on whether scale 95 is graduated in brightness values of "external measurements" or for brightness values of "internal measurements", plate 96 has or has not the cam mentioned above. In this manner it is possible, when exchanging plate 96 together with scale 95, to bring contact 300 automatically to the switching position corresponding to the scale 95 concerned, so that the changeover of exposure computer 22 to "external measurement" or "internal measurement" occurs automatically.

Ground potential can be applied to another signal input K of microprocessor module 234 by means if a changeover switch 301 that can be operated through sliding handle 105 (FIG. 3). In one position of switch 301, exposure computer 22 is programmed for exposure measurements with "open aperture" and in the other position for exposure measurements with "working aperture", assuming that the exposure computer is also programmed for "internal measurements". At any one time when contact 300 is set to "internal measurement" and switch 301 to "working aperture" and if, in addition, an interchangeable lens 65 is mounted on camera front part 60 and brightness sensor 23 is not connected to connector 34, there appears at output F of the first microprocessor module 233 (FIG. 9) the signal mentioned above, through which, by means of switching transistor 295, iris diaphragm 64 of lens 65 is closed down to the relative aperture preselected with the aid setting mechanism 72.

A contact of a 5-bit coder 302 is connected at each of signal inputs C, D, E, F and G of microprocessor module 234, which contacts are connected on the other side to the ground conductor. Coder 302 is coupled to the setting mechanism 84 shown in FIG. 3. This permits the photographer to correct the exposure parameter value calculated automatically by exposure computer 22 selectively in ⅓ stop value steps upward or downward, e.g., within a range of from −3 to +3 exposure value steps.

Microprocessor module 234 also has four signal outputs L, M, N and O, which are connected to a group of contact members 304 of connector 35, which is designed to connect flash unit 24. Another group of contact members 305 of the same connector is connected to signal inputs P, Q, R and S of microprocessor module 234. Another contact member 307 of connector 35 is connected via a conductor 308 to a contact member 309 of connector 32 (FIG. 9) for connection to signal input I of microprocessor module 133 via the corresponding contact member 192 of connector 31 (FIG. 5). Two other contact members 312 and 313 of connector 35 (FIG. 10) are connected to supply voltage conductor carrying +5 V or to the ground conductor. Finally, connector 35 also has a contact member 314 which is connected to a conductor 315 leading to the circuitry shown in FIG. 11.

Figure 11:
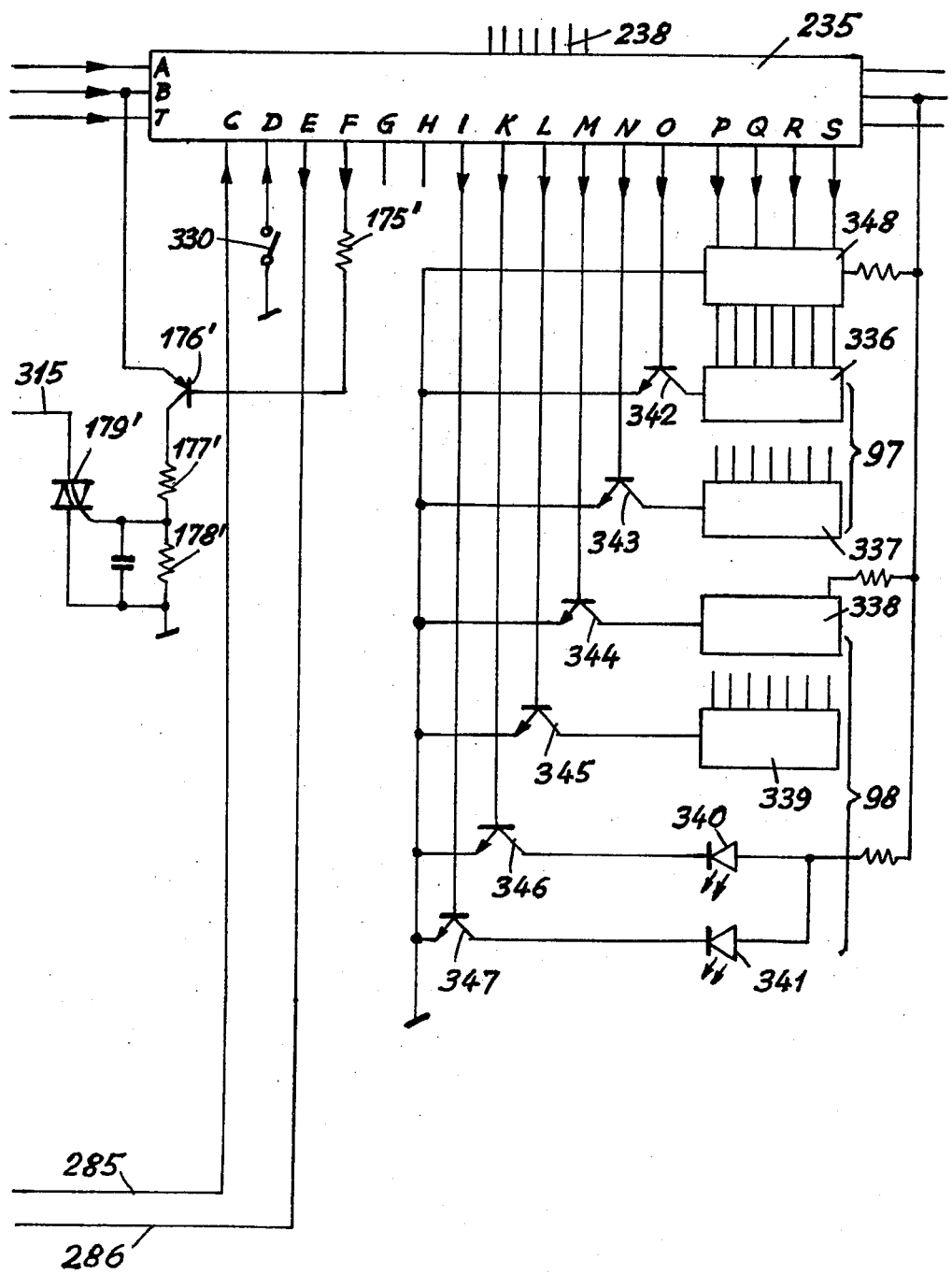

FIG. 11, which gives details of block 242 (FIG. 8) again shows the third microprocessor component (235) whose inputs A, B and T are connected to the inputs bearing like signs of the other microprocessor components 233 and 234. FIG. 11 also shows the conductors 285 and 286 mentioned earlier which, starting out from contact members 283 and 284 of connector 34 (FIG. 9), lead to a signal input C or a single output E of microprocessor component 235.

There is connected to a signal input D of microprocessor component 235 an impulse contact 330, which can be operated by means of push button 104 (FIG. 3) and through which ground potential can be applied to input D in order thereby to initiate the turn-off of supply circuitry 131 (FIG. 5). The electrical supply is, however, switched off after all the necessary mechanical functional sequences, e.g., of the camera shutter, of the diaphragm drive mechanism and, if necessary, of the film transport unit have been carried out properly. The turn-off signal proper appears at output E of microprocessor module 133 (FIG. 5).

In addition to the circuit arrangement 175–179 provided in camera control unit 21 (FIG. 1) for the flash synchronization, there is also provided in exposure computer 22 a similar circuit arrangement 175′–179′, as shown in FIG. 11. The ignition signal is delivered from output F of microprocessor component 235 via resistor 175′ to the base of switching transistor 176′ which, in turn, drives the triac 179′ into the on-state by means of voltage divider 177′, 178′. One main electrode of triac 179′ is connected to the ground conductor and the other main electrode to the conductor 315 mentioned earlier, which leads to contact member 314 of connector 35 (FIG. 10). As a result of the additional flash synchronization circuit arrangement 175′ to 179′ described above, it is avoided that the flash synchronization line must be connected in parallel to the electric data lines via connecting line 33 (FIG. 1).

FIG. 11 also shows that the display panel 97 mentioned with reference to FIG. 3 has two 7-segment digital displays 336 and 337 to indicate a one- or two-digit number which signals to the photographer how many identical flashes are required consecutively for a given photographic exposure. In the same display panel he can also read off after each flash how many additional flashes are still needed for the shot concerned. FIG. 11 also shows that the second display panel 98 mentioned with reference to FIG. 3 has two 7-segment digital indicators 338 and 339, as well as two LEDs 340 and 341, to signal to the photographer any necessary correction of the flash illumination or of the controlled exposure values. The digital indicator 338 positioned on the left side of display panel 98 only indicates whether a positive or negative correction is required. To accomplish this, only the central horizontal segment of digital display 338 is activated if too little light is available for the exposure. The digital display 339 positioned on the right side of display panel 98 signals through a one-digit number the amount of correction needed in whole exposure value intervals. Moreover, LEDs 340 and 341 also enable the indication of intermediate values ⅓ or ⅔ exposure value step.

To set digital display 336–339 as well as LEDs 340 and 341, switching transistors 342–347 are provided, the base of which is in each instance connected to a signal output I, K, L, M, N or O of microprocessor module 235. All four digital displays 336–339 as well as the two LEDs 340 and 341 are set individually, briefly one after the other, the time sequence being selected in such a way that a standing display is created for the human eye. Other signal outputs P, Q, R and S of microprocessor module 235 are connected to the inputs of a decoder 348, the outputs of which are connected to the individual luminous segments of 7-segment digital display 336, 337 and 339 in order to define which segments of the digital display set in each case shall be activated.

Figure 12:
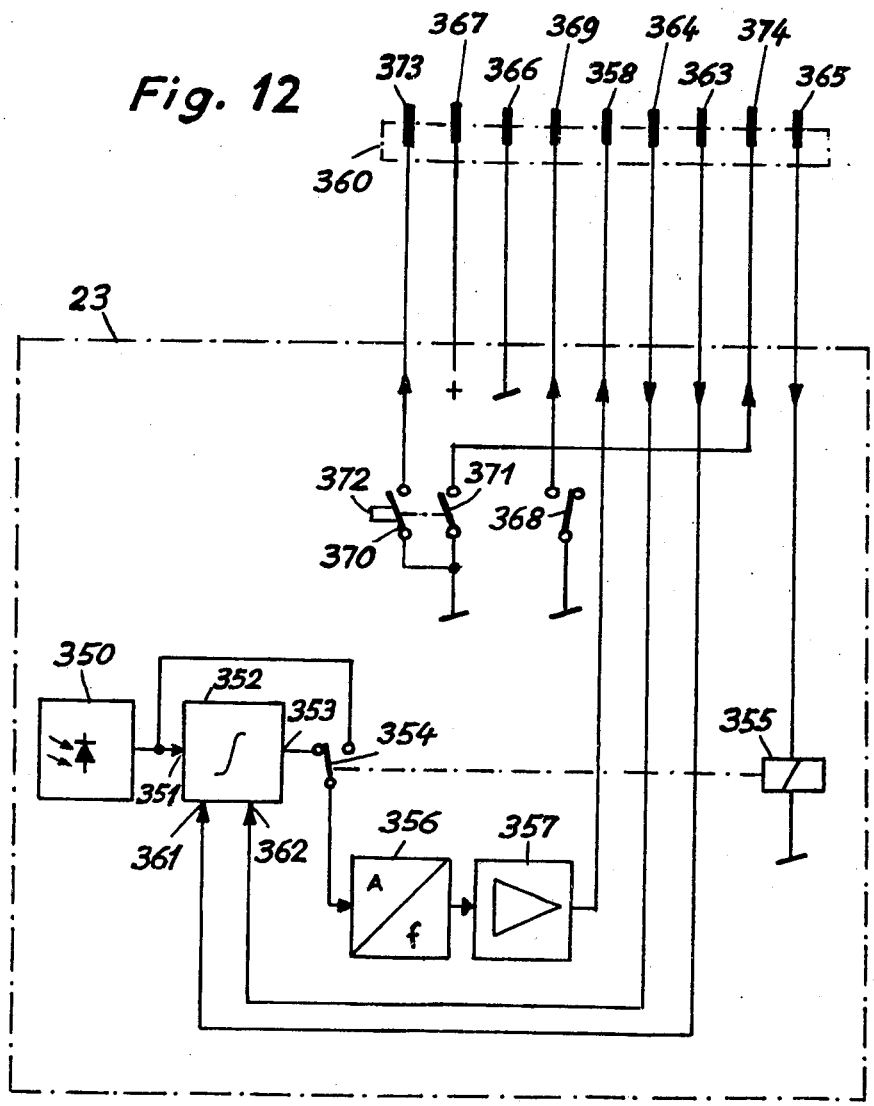
FIG. 12 shows the electrical circuitry of a photoelectric brightness sensor, which is one of the modular units of the apparatus of FIG. 1.

As mentioned earlier, connector 34 of exposure computer 22 illustrated in FIGS. 1, 3, 8 and 9 is designed to connect photoelectric brightness sensor 23. In FIG. 12, only one example of the electric circuitry of this brightness sensor is represented schematically.

In FIG. 12, a photoelectric converter 350 is connected to analog signal input 351 of an integrator and storage circuitry 352. Signal output 353 of circuitry 352 on one side and converter 350 on the other side are connected to a changeover contact 354 of a relay 355. The switching tongue of changeover contact 354 is connected to the input of an analog frequency converter 356, which is connected after a pulse amplifier 357. The output of amplifier 357 is connected to a contact member 358 of a connector 360, which fits into connector 34 of exposure computer 22. When both connectors 360 and 34 are plugged together, which is assumed to be the case here and in the following sections, the output of pulse amplifier 357 is connected to signal input G of microprocessor module 233 (FIG. 3) via contact members 358 and 276. Integrator and storage circuitry 352 has two control signal inputs 361 and 362, which are each connected to a contact member 363 or 364 of connector 360 for connection to signal output H of microprocessor module 233 (FIG. 9) or to signal output E of microprocessor module 235 (FIG. 11) via contact member 278 or 284 of connector 34 (FIG. 9). The signal fed to control input 361 controls the gate time of the integrator of circuitry 352, while the signal fed to the other control input 362 serves to clear the storage of circuitry 352.

The excitation coil of relay 355 is on one side connected to the ground conductor and on the other side to a contact member 365 of connector 360 for connection to signal output I of microprocessor module 233 via contact member 279 of connector 34 (FIG. 3). By means of relay 355 and its changeover contact 354, brightness sensor 23 can be switched for brightness measurements either with flashlight or with continuous light. The ground conductor of brightness sensor 23 is connected to a contact member 366 of connector 360 for connection to the ground conductor of exposure computer 22 via contact member 275 of connector 34. The +12 V supply voltage is fed to brightness sensor 23 via contact member 274 of connector 34 and via contact member 367 of connector 360. To simplify the drawing, the internal conductors for the power supply of the various modules 350, 352, 356 and 357 are not shown in FIG. 12.

A changeover control 368 is connected to another contact member 369 of connector 360 for connection to signal input C of microprocessor modules 235 (FIG. 11) via contact member 283 of connector 34 and by means of conductor 285. In one position of changeover switch 368, ground potential is applied to this signal input E, but is open in the other position of control 368. Switch 368 enables the photographer to program exposure computer 22 either for "internal measurement" or for "external measurement" of the brightness.

Finally, brightness sensor 23 has two impulse contacts 370 and 371, which are coupled mechanically to each other and to a push button 372. These contacts 370 and 371 are connected on one side to the ground conductor and on the other side to, respectively, contact members 373 and 374 of connector 360 for connection to respectively, contact members 280 and 277 of connector 34 (FIG. 9) of exposure computer 22. Both contacts 370 and 371 are closed by pressing push button 372. The result of the closing of contact 370 is that—via contact members 373 and 280 of connectors 360 and 34, conductor 281 and contact members 282 of connector 32 (FIG. 9), as well as via the corresponding contact members 157 of connector 31 (FIG. 5) and conductor 156—the collector-emitter junction of transistor 154 is bridged, thereby closing the excitation circuit relay 147 of supply circuitry 131, so that the power supply to all power-consuming units of the whole apparatus is switched on, if supply circuitry 131 has not already been activated previously. The closing of the second impulse contact 371 causes ground potential to be applied to signal input Q of microprocessor module 233 (FIG. 9) via contact members 374 and 277 of connectors 360 and 34, so that exposure computer 22 is caused to read into signal input G of microprocessor component 233 (FIG. 9) the impulses generated by means of analog frequency converter 356, whose frequency is proportional to the light intensity of light energy striking the photoelectric converter 350, and to process the brightness value with the other data thus read in automatically. It should be borne in mind that as a result of the plugging together of the two connectors 34 and 360, the switch 256 (FIG. 9) has been opened automatically, thereby turning off coder 254 (FIG. 9) which can be operated by means of setting mechanisms 85 (FIG. 3).

Figure 13:
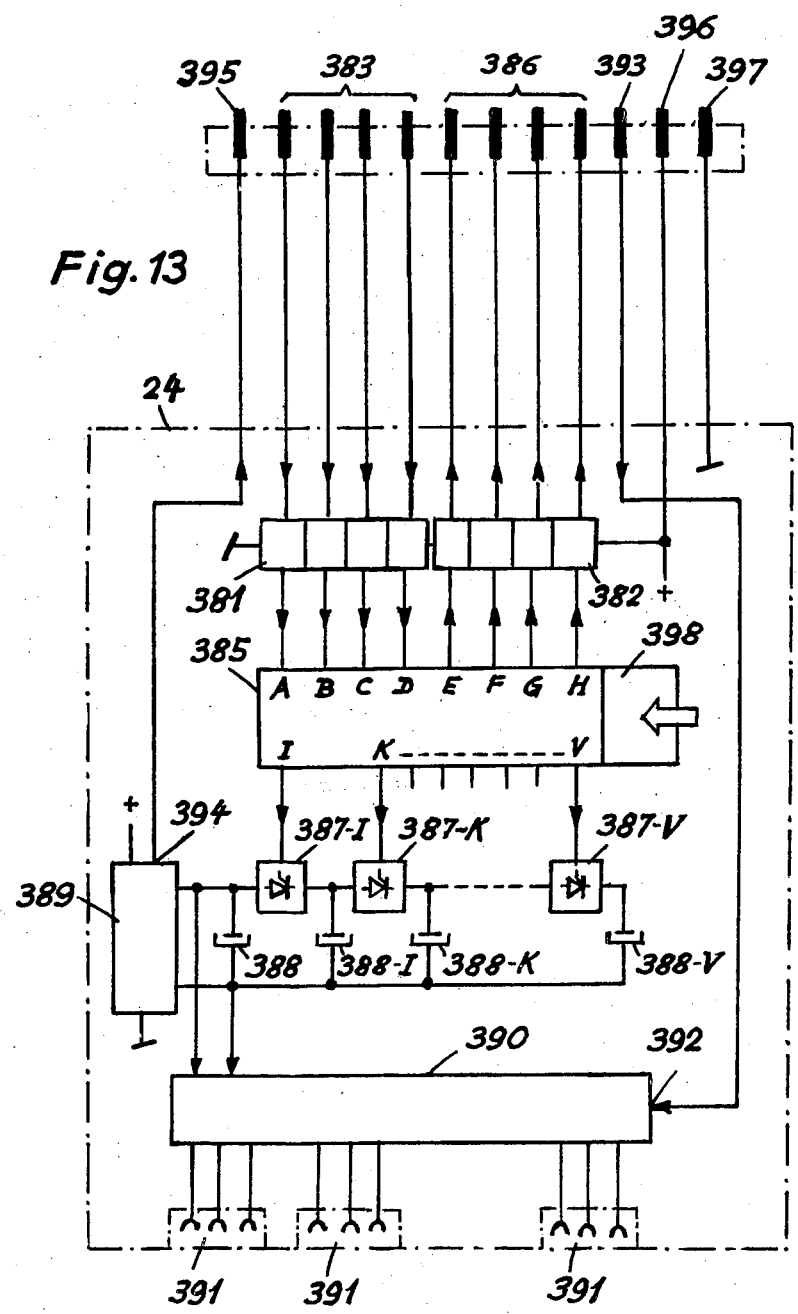
FIG. 13 shows the electrical circuitry of an electronic flash gun with controlled flash output and constituting one of the modular units of the apparatus of FIG. 1.

FIG. 13 illustrates schematically an example of the electrical circuitry of electronic flash unit 24 (FIG. 1) designed to be connected to connector 35 (FIGS. 1, 3, 8 and 10) of exposure computer 22. FIG. 13 shows a multipole connector 380, which fits into connector 35 of the exposure computer 22 mentioned earlier. The circuitry of electronic flash unit 24 has two groups of optical isolators 381 and 382 in order to physically separate the microprocessor components of camera control unit 21 and of exposure computer 22 from the control electronics of flash unit 24 to be described later. The signal inputs of one group of optical isolators 381 are connected to a group of contact members 383 of connector 380 for connection to signal outputs L, M, N and O of microprocessor component 234 (FIG. 10) via the corresponding contact members 304 of connector 35. The outputs of the first group of optical isolators 381 are each connected to a signal input A, B, C or D of generator electronics 385. The latter has signal outputs E, F, G and H, which are each connected to an input of the second group of optical isolators 382. The output of this second group of optical isolators 382 are connected to a group of contact members 386 of connector 380 for connection via the corresponding contact members 305 of connector 35 to signal inputs P, Q, R and S of microprocessor module 234 (FIG. 10).

Generator control electronics 385 further has a number of signal outputs I, K . . . V, which are each connected to the control electrode of a semiconductor switch 387-I to 387-V. These semiconductor switches are, for example, thyristors and serve to separately connect other charge capacitors (381-I to 388-V individually and in parallel to a first charge capacitor 388 in order to be able to vary the total capacitance in predetermined stages for the purpose of a corresponding change in the flash output of flash unit 24. Capacitor 388 and the other capacitors 388-I to 388-V, which may be connected in parallel therewith, can be charged by means of a charging device 389 and are also connected to a firing and flash-output splitting device 390. This device 390 is connected to a plurality of connectors 391, which are each designed to connect an electronic flash tube (not shown in FIG. 13). The firing and flash-output splitting device 390 has a control input 392 for the feeding of the firing signal. This control input 392 is connected to a contact member 393 of connector 380 for connection to the flash synchronization circuitry 175'–179' (FIG. 11) via the corresponding contact member 314 of connector 35 (FIG. 10) and via conductor 315 (FIGS. 10 and 11).

The charging unit 389 has a signal output 394, which is connected to another contact member 395 of connector 380. If both connectors 380 and 35 are plugged together, signal output 394 is connected to signal input I of microprocessor module 133 fof camera control unit 21 via contact members 395 and 307, conductor 308 (FIGS. 10 and 9), contact members 309 and 192 of connectors 32 and 31, and conductor 191 (FIG. 5). With reference to FIG. 5, it was described earlier that the release of the camera shutter is blocked each time if and as long as signal input I of microprocessor component 133 is at ground potential. Charging unit 389 in flash unit 24 (FIG. 13) is designed in such fashion that signal output 394 is at ground potential as long as capacitor 388 and, possibly, other connected capacitors 388-I to 388-V are not charged sufficiently. This prevents, during the charging process, the release of the shutter as well as measurement of the flash brightness. The potential at signal output 394 can, for example, be controlled by means of a current transformer, which measures the intensity of the charging current concerned and applies ground potential if the charging current intensity exceeds a predetermined threshold value.

Finally, plug connector 380 has two other connections 396 and 397 in order to be able, in cooperation with the corresponding connections 312 and 313 of plug connector 35, to establish a connection for the purpose of feeding the +5 V supply voltage to flash unit 24 or to establish a ground connection between exposure computer 22 and flash unit 24.

If the above described flash unit 24 is connected to exposure computer 22 by means of plug connectors 380 and 35, the flash power of flash unit 24 can be controlled through signals from outputs L, M, N and O of microprocessor component 234 (FIG. 10) via the first group of optical isolators 381 and the signal inputs A, B, C and D of control electronics 385 as a function of the incoming control signals more or less of the supplementary charging capacitors 388-I to 388-V, said electronics 385 being connected in parallel with the first charge capacitor 388 by means of semiconductor switches 387-I to 387-V. If all the capacitors are connected in parallel, the flash output is 100%. By switching off each individual capacitor of the chain, the flash power is reduced by ⅓ exposure-value step. The correlation between the control signals at signal inputs A, B, C and D of control electronics 385 and the resultant flash output is shown by way of illustrative example in the Table below:

TABLE I

| Signal at input | | | | Flash output |
|---|---|---|---|---|
| A | B | C | D | % |
| 1 | 1 | 1 | 0 | 100 |
| 1 | 1 | 0 | 1 | 79 |
| 1 | 1 | 0 | 0 | 63 |
| 1 | 0 | 1 | 1 | 50 |
| 1 | 0 | 1 | 0 | 40 |
| 1 | 0 | 0 | 1 | 32 |
| 1 | 0 | 0 | 0 | 25 |
| 0 | 1 | 1 | 1 | 20 |
| 0 | 1 | 1 | 0 | 16 |
| 0 | 1 | 0 | 1 | 12.5 |
| 0 | 1 | 0 | 0 | 9.9 |
| 0 | 0 | 1 | 1 | 7.9 |
| 0 | 0 | 1 | 0 | 6.3 |
| 0 | 0 | 0 | 1 | 5.0 |

The flash output range of adjustment of flash unit 24 need not in all cases extend from 100% to 5%—as indicated in Table I. In practice, an adjustment range from 100% down to 16% or 12.5% is adequate, but with the gradation always provided in ⅓ exposure-value steps, as shown in Table I. Through signals at signal outputs E, F, G and H of control electronics 385 it is reported to inputs P, Q, R and S of microprocessor component 234 (FIG. 10) via the group of optical isolators 382 how large the particular flash-output range of adjustment of the flash unit is. The information defining the adjustment range is formed either by a permanently set combination of "high" and "low" potentials at signal outputs E to H or generated electronically by means of control electronics 385, the correlation between the signals and the adjustment range being similar to that shown in Table I.

FIG. 13 also indicates a data input unit 398 assigned to control electronics 385 and containing, for example, a 4-bit coder to program control electronics 385, e.g., manually or via remote control, selectively in such a way that the maximum flash output of flash unit 24 is either 100% or 79% or 63% or 50%, etc., with the gradation being the same as that indicated in the last column of Table I. Such a preselected reduction of the maximum flash output of course diminishes the power adjustment range of flash unit 24 and the resulting range of adjustment is signaled to the exposure computer 22 by the signals to signal outputs E, F, G and H of control electronics 385.

The overall equipment is utilized and operated as follows:

COMPUTATION OF EXPOSURE VALUES FOR CONTINUOUS LIGHT FOR BRIGHTNESS MEASUREMENT OUTSIDE OF CAMERA

Let if first be assumed that both connectors 31 and 32 of camera control unit 21 or of exposure computer 22 are interconnected directly or via connecting line 33, that shutter control device 27 and power pack 28 are connected to connectors 42 and 43 of control unit 21, and that none of the components 23 to 26 are connected to connectors 34 to 36 of exposure computer 22 (FIG. 1). In this case, the apparatus is prepared for the manual input of all the exposure parameters, that is, switches 256 and 262 are closed in FIG. 9, therefore coders 254, 258 and 160 in exposure computer 22 are operative.

For the computation of the exposure time t by means of a brightness measurement outside the camera with continuous light, the following known equations apply:

$$t = t_o + t_K \quad \text{(I)}$$

$$t_o = \frac{\text{constant} \cdot A_E^2}{B \cdot 10^{\frac{S}{10}}} \cdot C \quad \text{(II)}$$

in which:
t = exposure time for correct exposure;
$t_o$ = exposure time without taking account of the Schwarzschild behavior of the photographic film;
$t_K$ = additional exposure time for taking account of the Schwarzschild behavior of the photographic film;
$A_E$ = relative aperture of camera lens during the photographic exposure
B = brightness (luminous density) of subject;
S = photosensitivity of the photographic film;
C = exposure correction factor, if required.

The known APEX-value equation (III) can be formed by taking the logarithm and further transformation of the equation (II):

$$T_v = S_v + B_v - A_{Ev} + C_v \quad \text{(III)}$$

wherein:
T = APEX value of the reciprocal exposure time $t_o$;
$S_v$ = APEX value of the photosensitivity of the film;

$B_v$ = APEX value of the brightness (luminous density) of the subject;

$A_{ev}$ = APEX value of the relative aperture of the camera lens during the photographic exposure;

$C_v$ = APEX value of an exposure correction factor, if required.

All APEX values are proportional to the logarithm of the exposure parameter value concerned and conveniently quantified in ⅓ exposure-value steps.

Exposure computer 22 is programmed for consecutive calculations in accordance with equations (III) and (I) if, by means of setting element 83 (FIG. 3) coder 291 (FIG. 9) is set for the type of light "continuous light" and one of the types of brightness measurements "single-point measurement", "two-point measurement" or "multiple point measurement," and if a plate 96 is used on exposure computer module 80 (FIG. 3) which carries a scale 95 for so-called "external measurements" of the brightness and is adapted to the brightness meter to be used. When using the plate 96 in question, the contact 300 connected to signal input H of microprocessor component 234 (FIG. 10) is automatically switched to the position where exposure computer 22 is programmed for external measurements of the brightness. Let it first be assumed in the following section that setting element 83 (FIG. 3) has been set to "continuous light" and "single-point measurement":

By means of setting mechanism 81 (FIG. 3) the photographer sets the photosensitivity S of the film material used so that, by means of coder 258 (FIG. 9), the APEX value $S_v$ is made available in digital, binary coded form. In addition, the photographer can, by means of setting mechanism 82 (FIG. 3), set the coder 260 (FIG. 9) in accordance with a code K, which indicates the Schwarzschild behavior of the film material concerned if the work has to be done with fairly long exposure times, e.g., longer than ¼ second. Furthermore, if necessary, an exposure correction can be set on setting mechanism 84 (FIG. 3), e.g., +⅔ stop value if a negative film is used, or −⅓ stop value if a positive film is used, with the coder 302 (FIG. 2) providing the corresponding APEX value $C_v$ in digital, binary-coded fomr. With setting element 72 on camera front part 60 (FIG. 2) the photographer chooses the relative aperture A of iris diaphragm 64 of camera lens 65 which he considers appropriate for the intended shot, so that by means of coder 197 (FIG. 6) the corresponding APEX value $A_{Ev}$ is formed in binary coded form. The selected relative aperture A is indicated digitally in display panel 74 of camera front part 60 (FIG. 2). The sequence of the settings described above is of no importance, and settings that have already been carried out can be changed subsequently.

Any commonly used light meter may be used, provided that scale 95 of plate 96 used on exposure computer module 80 is adapted to this light meter. Using the brightness meter, the photographer measures in the usual manner the brightness (luminance) B of an essential part of the subject to be photographed or the brightness of a grey chart held in lieu of the subject. The measured brightness value indicated on a logarithmic scale must be set by means of setting mechanism 85 of exposure computer module 80 with the aid of scale 95 and dial 94 and transferred to coder 354 (FIG. 9), with the latter providing the corresponding APEX value $B_v$ in binary coded form.

After the last-described setting has been performed, the photographer presses pushbutton 101 on exposure computer module 80 (FIG. 3) in order to close contact 292 (FIG. 9) temporarily. This causes the preset data to be read into microprocessor 133, 134, 135, 233, 234, 235 and immediately to be processed with each other, with the microprocessor first computing the APEX value $T_v$ according to equation (III). The corresponding exposure time $t_o$ is read by the microprocessor from a binary coded "table" or "list" stored therein, which contains the corresponding APEX value $T_v$ for each customary exposure time $t_o$. Immediately thereafter the microprocessor computes the exposure time t in accordance with equation (I). It should be noted that in the microprocessor for each adjustable Schwarzschild code K (e.g., K=0, 2 ... 7) a binary coded "table" or "list" is stored, from which the microprocessor can read out for the computed exposure time $t_o$ the corresponding additional exposure time $t_K$ to take account of the Schwarzschild behavior of the film material concerned. When adjusting setting mechanism 82 (FIG. 3) to code 0, $t_K = 0$ and, hence, $t = t_o$. If, on the other hand, another Schwarzschild code is set, $t_K$ becomes greater than 0.

As soon as pushbutton 101 (FIG. 3) is released, the computed exposure time t is indicated digitally in display panel 73 of camera front part 60 (FIG. 2). At the same time the displayed exposure time is input automatically in binary coded form into the device contained in camera front part 60 for controlling the exposure time of the shutter 66–69.

When the photographer slides a film cassette into the cassette holder of the camera, contact 165 (FIG. 5) is closed by means of pin actuator 166 (FIG. 5), so that ground potential is applied to signal input F of microprocessor component 133 and, hence the shutter is driven into its closed position and iris diaphragm 64 of the camera lens brought to its preselected relative aperture. Thereupon, after pulling out the light-protection slide of the film cartridge, the photographer need only press release 169 (FIG. 5) to make a properly exposed picture of the sighted subject.

However, prior to pressing the release 169, the photographer has the option of preselecting another relative aperture by means of actuator mechanism 72 on camera front part 60 (FIG. 2), with exposure computer 22 instantly recalculating the exposure time t adapted thereto, displaying it, and entering it into the shutter. Likewise, it is possible, prior to pressing release 169 to read into the microprocessor by means of setting mechanism 84 of exposure module 80 (FIG. 3) another exposure correction via coder 302 (FIG. 10) example, to bring about a fairly long or short exposure. In similar fashion, the photographer, prior to depressing the release 169, can also adjust setting mechanism 82 in order to read in a correction to take into consideration the Schwarzschild behavior of the film material or to make an adjustment of setting mechanism 81 to read in another film speed, if he decides to use another film material. After each adjustment of one of the setting mechanisms 72, 81, 82 anc 84, the corresponding new exposure time t is calculated instantly and automatically by exposure computer 22, indicated in display panel 73, and read into the shutter. The sequence of the changes in adjustment is unimportant. The microprocessor continuously interrogates all ruling coders in successive cycles.

As long as exposure computer 22 processes in each situation the data entered and still has not input the applicable exposure time into the shutter, depressing the release 169 remains without effect. The same applies also in the case where, by means of setting mechanism 72 on camera front part 60 (FIG. 2), a relative aperture is set which lies outside the range of adjustment of iris diaphragm 64 of lens 65, and in the case where the exposure time t calculated by exposure computer 22 shall lie outside the range of adjustment of the exposure time of the shutter.

When the photographer has adjusted the setting mechanism 83 of exposure computer module 80 (FIG. 3) and the coder 291 (FIG. 9) coupled thereto for the type of light "continuous light" and the type of measurement "two-point measurement", the operation of the apparatus differs from the above description only in the following:

First, brightness $B_1$, e.g., of a bright part of the subject, is measured outside the camera. This bright part shall just be traced photographically. The measured value of brightness thus obtained in a logarithmic scale is transferred manually by means of setting mechanism 85 to coder 254 of exposure computer 22 by means of scale 95 and dial 94, so that the corresponding APEX value $B_{1v}$ is formed and made available. By pressing pushbutton 101 (FIG. 3), impulse contact 292 (FIG. 9) is closed briefly, so that this APEX value is stored into the microprocessor. Thereupon, using the brightness meter the photographer measures the brightness $B_2$ of a dark portion of the subject which shall be just defined photographically. The second measured value of brightness obtained is likewise transferred to exposure computer 22 by means of setting mechanism 85 (FIG. 3) and made available in the form of the corresponding APEX value $B_{2v}$. Thereupon, by pressing the pushbutton 101, the second APEX value is also read into the microprocessor. As long as only the first APEX value $B_{1v}$ is stored, display panel 73 on camera front part 60 remains dark, thus signalling to the photographer that a second measured value is still to be input. The shutter release is then blocked. As soon as the second APEX value $B_{2v}$ is also stored into memory, the mean value $B_v=(B_{1v}+B_{2v})/2$ is calculated automatically by exposure computer 22 on the basis of the 2 stored APEX values whereupon, on the basis of this mean value and of the other set exposure parameter values the exposure time t is calculated in accordance with the above equations (III) and (I). The resulting exposure time t is indicated in display panel 73 of camera front part 60 and read into the device for controlling the exposure time of the shutter. At the same time, exposure computer 22 also calculates the difference between the two stored APEX values $B_{1v}$ and $B_{2v}$. The absolute value of this difference $B_{1v}-B_{2v}$ can be displayed digitally in full and in $\frac{1}{3}$ exposure-value steps in display panel 73 of camera front part 60 in that, by pressing pushbutton 102 (FIG. 3) impulse contact 293 is closed, so that ground potential is applied to signal input R of microprocessor component 233. The calculated difference $B_{1v}-B_{2v}$, which remains visible in display panel 73 as long as pushbutton 102 is depressed, supplies information to the photographer regarding the brightness contrast on the subject and permits him to judge whether this contrast of the film material coming into use is to be processed. After pushbutton 102 is released, there reappears instantly in display panel 73 the calculated exposure time t, and the photographic shooting can take place. The sequence of the two brightness measurements may also be reversed, that is, first a dark, then a bright part of the subject to be photographed can be measured.

Prior to depressing release 169, it is again possible to change the preselected relative aperture by means of setting mechanism 72 on camera front part 60, or by adjusting one of setting mechanisms 81, 82 and 84 on exposure computer module 80, to read into exposure computer 22 other data for the film speed, the Schwarzschild behavior, or another necessary adjustment of the exposure, during which process in each instance the corresponding exposure time t is instantly recalculated, indicated digitally in display panel 73 of camera front part 60, and read in binary coded form into the device for controlling the exposure time.

As soon as a third measured brightness value is read into the exposure computer, the preceding two measured brightness values are erased and a new sequence of the two-point measurung commences.

If, by means of setting mechanism 83 (FIG. 3) the coder 291 (FIG. 9) is set to the type of light "continuous light" and the measuring mode "multiple-point measuring", exposure computer 22 is programmed for inputting any number of measured brightness values, and it is also possible to input only one measured value, or two measured values. The individual measured brightness values (on a logarithmic scale) are again ascertained outside the camera by means of a brightness meter and then transferred manually by means of setting mechanism 85 to exposure computer 22. The reading and storing of the corresponding APEX values $B_{1v}, B_{2v} \ldots B_{nv}$ into the microprocessor occurs in each instance by pressing pushbutton 101 on exposure computer module 80 (FIG. 3). After every input of an APEX brightness value, exposure computer 22 calculates from all preceding APEX brightness values stored the mean value $B_v=(B_{1v}+B_{2v}\ldots B_{nv})/n$ and from this mean value and the other parameter values stored in accordance with equations (III) and (I) the exposure time t which is indicated digitally in display panel 73 of camera front part 60 and is automatically input in binary coded form into the device for controlling the exposure time of the shutter. The picture taking can commence after any number of measured brightness values have been read in.

The erasing of all stored APEX brightness values and the new start of a multiple-point measuring sequence occurs when, after the closing and opening of the shutter or after a temporary adjustment of the setting mechanism 83, pushbutton 101 is pressed again. The maximum number of measured brightness values that can be input for the type of metering "multiple point measurement" is limited by the storage capacity in the microprocessor and exceeds 100 in a preferred embodiment of the apparatus of the invention.

If connecting line 39 to cassette holder 25 or connecting line 41 to film cassette 26 is connected to plug connector 36 of exposure computer 22 (FIG. 1), both coders 258 and 260 (FIG. 9) in exposure computer 22 are inoperative because in this case switch 262—as described above—is open. The exposure computer is then prepared for the automatic input of the characteristic data, such as sensitivity and Schwarzschild behavior of the film material used in film cassette 26. In this case, the photographer need not pay attention to setting mechanisms 81 and 82 of exposure computer module 80 (FIG. 3). The corresponding coders in film cassette 26 is operative instead of coders 258 and 260 (FIG. 8) in exposure computer 22. Moreover, nothing has changed in the above-described mode of operation of the apparatus.

If connecting line 37 to brightness sensor 23 is connected to plug connector 34 of exposure computer 22 shown in FIG. 1, coder 254 (FIG. 9) is inoperative in the exposure computer, because switch 256—as mentioned earlier—is then open. In this case exposure computer 22 is prepared for the automatic input of the measured brightness values which are obtained by means of brightness sensor 23. Therefore, the photographer need not pay attention to setting mechanism 85 of exposure computer module 80 (FIG. 3). In this case, it is also unimportant whether the photographic plate 96 inserted in exposure computer module 80 carries a scale 95 for internal or external measurement of the brightness, because the photographer can now program the microprocessor either for internal or for external measurement of the brightness by means of the changeover control 368 on brightness sensor 23 (FIG. 12). It is practical and preferable to design changeover control 368 in such fashion that it is automatically actuated each time a light diffuser is removed or put on in front of photoelectric converter 350. It is assumed that changeover switch 368 is set for external measurement of the brightness.

It is further assumed that the photographer has adjusted setting mechanism 83 of exposure computer module 80 (FIG. 3) and, thereby, code4 291 (FIG. 9) for the type of light "continuous light" and the type of measurement "single-point measurement". At signal output I of microprocessor component 233 (FIG. 9) an electrical voltage is then created which is fed to relay 355 in brightness sensor 23 via contact members 279 and 375 of connectors 34 and 360 (FIG. 12). Hence, relay 355 is energized and its contact 354 is switched from the position shown in FIG. 12 to the other position in which the output of photoelectric converter 350 is connected directly to the input of analog frequency converter 356 via relay contact 354. The latter has generated electrical pulses, the frequency of which is proportional to the logarithm of the luminance B of the subject ascertained by photoelectric converter 350. These pulses are reinforced by amplifier 357 and are fed to signal input G of microprocessor component 233 (FIG. 9) via connector contact members 358 and 276.

To perform a brightness measurement, the photographer aims photoelectric converter 350 at a center of interest of the subject to be photographed and presses pushbutton 372 on brightness sensor 23 (FIG. 12). This activates supply circuit 131 (FIGS. 4 and 5) through contact 371 if this has not yet taken place, and ground potential is applied to signal input Q of microprocessor component 233 (FIG. 9) via connector contact members 374 and 277, causing the pulses fed to input G of microprocessor component 233 to be read into the microprocessor. The frequency of the pulses read in is determined in the microprocessor by periodically counting the pulses arriving at predetermined constant time intervals. On the basis of the number of pulses thus ascertained, exposure computer 22 calculates the APEX brightness value $B_v$ which is indicated digitally in display panel 73 of camera front part 60 (FIG. 2), as long as the photographer holds down pushbutton 372 on brightness sensor 23. By releasing pushbutton 372, the microprocessor is caused to process the APEX value $B_v$ with the other exposure parameters set at the active coders in accordance with the equations (III) and (I) in order to determine the proper exposure time t. The latter is indicated digitally in display panel 73 of camera front part 60 (FIG. 2) and input automatically in binary coded form into the device for controlling the exposure time of the shutter. The rest is the same as in the case described earlier with manual input of the measured brightness value.

In order to prevent that upon release of pushbutton 372 of brightness sensor 23 (FIG. 12) at an instant within a period for the counting of the pulses a counting error occurs and, as a result, an improperly exposed photograph, the microprocessor computes the APEX value $B_v$ in each instance on the basis of the number of pulses ascertained within the last but one, always complete, time interval.

If setting mechanism 83 of exposure computer module 80 (FIG. 3) and coder 291 (FIG. 9) coupled thereto are set for the type of light "continuous light" and the measuring mode "two-point measurement", the photographer has in each instance to carry out two brightness measurements by means of brightness sensor 23 before shooting is possible. For each of these brightness measurements the photographer presses the pushbutton 372 of the brightness sensor, so that in each case exposure computer 22 is caused to calculate, on the basis of the frequency of the pulses supplied by analog frequency converter 356 of the brightness sensor, first an APEX brightness value $B_{1v}$ which is indicated digitally in display panel 73 of camera front part 60 (FIG. 2), as long as the photographer holds down pushbutton 372 on brightness sensor 23. At the same time this APEX value $B_{1v}$ is read into the microprocessor. As long as only one APEX value is stored, display panel 73 remains dark and the shutter release is blocked after the release of pushbutton 372 of brightness sensor 23. As soon as the second APEX brightness value $B_{2v}$ is also read in, exposure computer 22 calculates from the two stored APEX values the mean value $B_v = (B_{1v} + B_{2v})/2$ and thereafter from this mean value and the other exposure parameters the exposure time t in accordance with the equations (III) and (I), as well as the difference $B_{1v} - B_{2v}$. All the rest is the same as for the two-point measurement with manual input of the measured brightness values described earlier.

If the photographer has adjusted setting mechanism 83 of exposure computer module 80 (FIG. 3) and, thereby, coder 291 (FIG. 9) for the type of light "continuous light" and the measuring mode "multiple point measurement" prior to each picture taking, any number of brightness measurements can be made one after the other by means of brightness sensor 23, during which each time pushbutton 372 on brightness sensor must be pressed in order to make exposure computer 22 calculate the particular APEX brightness value $B_{1v}, B_{2v} \ldots$ or $B_{nv}$, indicate it digitally in display panel 73 of camera front part 60 (FIG. 2), and store it in the microprocessor. All the rest is the same as in the multiple point measurement with manual input of the measured brightness values described earlier.

COMPUTATION OF THE EXPOSURE VALUES FOR CONTINUOUS LIGHT FOR BRIGHTNESS MEASUREMENT IN THE IMAGE PLANE OF THE CAMERA

Let it be assumed that both connectors 31 and 32 of camera control device 21 or of exposure computer 22 are connected directly to each other or via connecting line 33, that shutter control device 27 and power pack 28 are connected to connectors 42 and 43 of control units 21, and that none of the components 23–26 are connected to connectors 34–36 of exposure computer 22 (FIG. 1). The unit is thus prepared for the manual input of all the exposure parameters.

By means of setting mechanism 81 on exposure computer module 80 (FIG. 3), coder 258 (FIG. 9) is adjusted to the speed of the film material to be utilized. In addition, coder 260 (FIG. 9) can be adjusted so as to adapt to the Schwarzschild behavior of the film material concerned in case fairly long exposure times are to be employed. In addition, using setting mechanism 83 (FIG. 3), the photographer has to set the coder 291 (FIG. 9) for the type of light "continuous light" and the required mode of measurement "single-point measurement", "two-point measurement" or "multiple point measurement". By means of setting mechanism 72 on camera front part 60 (FIG. 2), the photographer can preselect the relative aperture of iris diaphragm 64 he deems appropriate, so that coder 197 (FIG. 6) is set properly and thereafter the preselected relative aperture is indicated digitally in display panel 74.

To program exposure computer 22 for brightness measurements in the image plane of the camera, that is, for so-called "internal measurements" of the brightness, a photographic plate 96 is inserted in exposure computer module 80 (FIG. 3), a scale 95 for internal measurements and adapted to the brightness meter to be used being provided for internal measurements. Upon insertion of said plate 96, contact 300 connected to signal input H of microprocessor component 234 (FIG. 10) is automatically switched to the position where exposure computer 22 is programmed for internal measurements of the brightness. Preferably to be used as a brightness meter for internal measurements is the apparatus marketed by Sinar AG Schaffhausen, Feuerthalen (Switzerland) under the name SINARSIX, which consists of a brightness probe substantially in the form of a bar and having a photoelectric converter and an electric display device connected thereto. A brightness meter of this type is, for instance, described in Swiss Patent No. 440 747. Such a brightness meter permits the measurement of a selected portion of the image of the subject to be photographed which is optically produced in the image plane of the camera either with iris diaphragm 64 fully open, hereinafter termed "open aperture", or with iris diaphragm set to the preselected relative aperture, hereinafter called "working aperture". The control 301 (FIG. 10) operable by means of sliding handle 105 (FIG. 3) is provided to switch iris diaphragm 64 from "open aperture" to "working aperture", and vice versa.

If exposure computer 22 is programmed for internal measurement of the brightness, the known equations for the computation of the exposure time t apply:

$$t = t_o + t_K \tag{I}$$

$$t_o = \frac{\text{constant}}{E_E \cdot 10^{\frac{S}{10}}} \cdot C \tag{IV}$$

in which:

t = exposure time for proper exposure
$t_o$ = exposure time without taking account of the Schwarzschild behavior of the photographic film
$t_K$ = Additional exposure time for taking account of the Schwarzschild behavior of the photographic film
$E_E$ = image brightness (illumination) in the image plane of the camera during the shooting
S = photosensitivity of the photographic film C = exposure correction factor, if required If the brightness measurement is effected in the image plane of the camera with a relative aperture, which is different from that during the shooting, the following equation applies:

$$E_E = E_M \cdot \frac{A_M^2}{A_E^2} \tag{V}$$

in which:

$E_E$ = image brightness (illumination) in the image plane of the camera during the shooting
$E_M$ = image brightness (illumination) in the image plane of the camera during the brightness measurement
$A_E$ = relative aperture of the camera lens during the shooting
$A_M$ = relative aperture of the camera lens during the brightness measurement in the image plane of the camera By taking the logarithm and transforming the equations (IV) and (V) the following APEX-value equations can be formed:

$$T_v = S_v + E_{Ev} + C_v \tag{VI}$$

$$E_{Ev} = E_{Mv} - (A_{Ev} - A_{Mv}) \tag{VII}$$

in which:

$T_v$ = APEX value of the reciprocal exposure time $t_o$
$S_v$ = APEX value of the photosensitivity of the film
$E_{Ev}$ = APEX value of the image brightness (illumination) in the image plane of the camera during the shooting with the relative aperture $A_E$
$E_{Mv}$ = APEX value of the image brightness (illumination) in the image plane of the camera during the brightness measurement with the relative aperture $A_M$
$A_{Ev}$ = APEX value of the relative aperture of the camera lens during the shooting
$A_{Mv}$ = APEX value of the relative aperture of the camera lens during the brightness measurement in the image plane of the camera
$C_v$ = APEX value of an exposure correction factor, if required All APEX values are proportional to the logarithm of the exposure parameter value concerned and conveniently quantified in ⅓ exposure value steps.

Let it first be assumed that the photographer has adjusted setting mechanism 83 (FIG. 3) to the type of measurement "single-point measurement". Now, by means of the brightness meter mentioned above, the photographer measures the brightness (illumination) $E_M$ of a selected part of the image of the subject produced in the image plane of the camera either with "open aperture" or with "working aperture". The measured brightness value indicated on the brightness meter on a logarithmic scale must subsequently be transferred by means of setting mechanism 85 of exposure computer module 80 (FIG. 3) through scale 95 and the dial 94 manually to coder 254 (FIG. 9), which provides the corresponding APEX value $E_{Mv}$ in binary coded form. By briefly pressing pushbutton 101 on exposure computer module 80 (FIG. 3), impulse contact 292 (FIG. 9) is closed temporarily, thus causing the APEX value $E_{Mv}$ and the other preselected exposure parameters to be read into microprocessor 133, 134, 135, 233, 234, 235 and the immediately following processing of the stored data in accordance with the equations (VII), (VI) and (I).

It does not matter whether the brightness measurement is in each instance carried out with "open aperture" or with "working aperture", assuming that changeover control 105, 301 assumes the same position both during the brightness measurement and during the pressing of pushbutton 101. It stands to reason that the brightness measurement with "working aperture" generally results in a lower measured brightness value than the brightness measurement with "open aperture". This difference between the measured brightness values, however, is automatically taken into consideration in exposure computer 22 by the first arithmetical operation in accordance with equation (VII). Therefore, $A_{Ev}$ is the APEX value of the relative aperture of the camera lens in the position "working aperture". This APEX value $A_{Ev}$ is produced by coder 197 (FIG. 6) in binary coded form. The APEX value $A_{Mv}$ of the relative aperture during the brightness measurement could be formed by the coder 198 which reproduces the actual aperture of iris diaphragm 64. In this case, the brightness measurement with "working aperture" would at once result in $A_{Mv}=A_{Ev}$ so that, in accordance with equation (VII), $E_{Mv}=E_{Ev}$. It is, however, more practical to design the microprocessor in such fashion that when switch 301 (FIG. 10), which can be actuated by means of sliding handle 105 (FIG. 3), is set to "working aperture" in the calculation program in accordance with equation (VII), the subtrahend $(A_{Ev}-A_{Mv})$ is completely suppressed and that, when setting said switch 310 to "open aperture", the APEX value $A_{Mv}$ is produced in binary coded form by the coder 199 (FIG. 9) which reproduces the speed of the camera lens used.

After the photographer has carried out the above described "single-point measurement" of the brightness and has pressed and again released pushbutton 101 (FIG. 3), the exposure time t determined by exposure computer 22 is immediately indicated digitally in display panel 73 of camera front part 60 (FIG. 2) and at the same time input automatically in binary coded form into the device for controlling the exposure time of the shutter. Thereupon, by means of the microprocessor the release lock of the shutter, which thus far has been active, is canceled so that a picture can be taken.

If the photographer has chosen the type of measurement "two-point measurement", two measured brightness values obtained through internal measurement must be transmitted to coder 254 (FIG. 9) one after the other by means of setting mechanism 85 (FIG. 3) and input into exposure computer 22 in the form of corresponding APEX values $E_{M1v}$ and $E_{M2v}$ by pressing pushbutton 101 (FIG. 3) before a picture can be taken.

In each instance, immediately after pressing pushbutton 101, the corresponding APEX brightness value $E_{E1v}$ or $E_{E2v}$ is calculated with the aid of the APEX brightness value $E_{M1v}$ or $E_{M2v}$ read into exposure computer 22 in accordance with equation (VII) and stored in the microprocessor in binary coded form. As described with reference to "single-point measurement", the two required brightness measurements can be carried out either with position "open aperture" or "working aperture" of changeover switch 105, 301, and it is also possible to take the two brightness measurements with different working apertures or to take one brightness measurement with "open aperture" and the other with "working aperture". Immediately after storing the second APEX value $E_{E2v}$ into memory, the microprocessor calculates on the basis of the two rolled-in APEX values the mean value $E_{Ev}=(E_{E1v}+E_{E2v})/2$ and immediately thereafter the exposure time t on the basis of this mean value and of the other exposure parameter values in accordance with equations (VI) and (I). The calculated exposure time t is indicated digitally in display panel 73 of camera front part 60 (FIG. 2) and at the same time input automatically in binary coded form into the device for controlling the exposure time of the shutter. As soon as this is done, the microprocessor cancels the release lock which has thus far been active, so that a picture can now be taken. However, prior to actuating the shutter release 169 (FIG. 5), the photographer, by pressing pushbutton 102 on exposure computer module 80 (FIG. 3), has the possibility of indicating digitally the contrast $E_{E1v}-E_{E2v}$ resulting from the two brightness measurements in whole and ⅓ exposure-value steps in display panel 73 of camera front part 60 (FIG. 2), as long as pushbutton 102 is depressed.

If the photographer has selected the type of measurement "multiple point measurement", any number of brightness measurements can be carried out one after the other and the APEX values $E_{M1v}, E_{M2v} \ldots E_{Mnv}$ resulting therefrom can be input into the microprocessor before shooting is possible. Each of these brightness measurements can be effected either with "open aperture" or with "working aperture", assuming that in each situation during the measuring of the brightness and during the pressing of pushbutton 101 changeover control 105, 301 assumes the same position. All brightness APEX values $E_{M1v} \ldots E_{Mnv}$ read in are converted in the microprocessor in accordance with equation (VII) in corresponding APEX values $E_{E1v} \ldots E_{Env}$, which are rolled in at once. After each roll-in of such APEX value, exposure computer 22 calculates automatically from all the rolled-in APEX values the mean value $E_{Ev}=(E_{E1v}+ \ldots E_{Env})/n$ and then, on the basis of this mean value and of the other exposure parameter values the exposure time t is input immediately in accordance with equations (VI) and (I). The resulting exposure time t is indicated digitally in display panel 73 of camera front part 60 (FIG. 2) and at the same time entered in binary coded form into the device for controlling the exposure time of the shutter. As soon as this is done, a picture can be taken.

If at connector 36 of exposure computer 22 connecting line 39 (FIG. 1) to cassette holder 25 or connecting line 41 to film cassette 26 is connected, both coders 258 and 260 (FIG. 9) in exposure computer 22 is inoperative, because, as described above, switch 262 is then opened. The exposure computer is then prepared for the automatic input of the characteristic film data with respect to sensitivity and Schwarzschild behavior. Instead of coders 258 and 260 (FIG. 9) in exposure computer 22, the corresponding coders in film cassette 26 are then operative and the photographer need no longer be concerned with setting mechanisms 81 and 82 of exposure computer module 80 (FIG. 3). Moreover, the operation of the apparatus remains unaltered.

If at connector 34 of exposure computer 22 connecting line 37 (FIG. 1) to brightness sensor 23 is connected, coder 254 (FIG. 9) in the exposure computer is inoperative, because, as described above, switch 256 is then opened. Exposure computer 22 is in this case prepared for the automatic input of the brightness values which are obtained by means of brightness sensor 23 in accordance with FIG. 12. Therefore, the photographer no longer need to pay attention to setting mechanism 85 of exposure computer module 80 (FIG. 3). By means of changeover control 368 (FIG. 12) on brightness sensor 23, the microprocessor of exposure computer 22 is programmed for "internal measurement" of the brightness and the computation of the exposure time t in accordance with equations (VII), (VI) and (V). By means of setting mechanism 83 (FIG. 3) the photographer sets the coder 291 (FIG. 9) coupled thereto for the type of light "continuous light" and the required type of brightness measurement "single-point measurement", "two-point measurement" or "multiple point measurement". As a result of the programming of the microprocessor for measuring the continuous-light brightness, relay 355 in brightness sensor 23 (FIG. 12) is energized, so that photoelectric converter 350 is connected to the input of analog frequency converter 356 by means of relay contact 354.

In order to perform a brightness measurement in the image plane of the camera, the photographer brings the photoelectric converter 350 to the point of the part of the image of the subject chosen by the photographer, e.g., immediately before or behind the focusing screen on which said image is visible. By pressing pushbutton 372 on brightness sensor exposure computer 22 is caused to read into the microprocessor the pulses generated by means of analog frequency converter 356, the frequency of which is proportional to the logarithm of illumination $E_M$ of the light striking photoelectric converter 350, to produce therefrom the corresponding APEX value $E_{Mv}$ and to calculate the APEX value $E_{Ev}$ in accordance with equation (VII) and to indicate digitally in display panel 73 (FIG. 2). The brightness measurement can be effected either with "open aperture" or with "working aperture" of lens 65, during which the resulting difference between the illuminations and between the corresponding APEX values $E_{Mv}$ is automatically taken into consideration by the microprocessor during the first computing operation in accordance with equation (VII). The programming for "open aperture" or "working aperture" can be effected by the photographer by means of sliding handle 105 on exposure computer module 80 (FIG. 3), during which electrical contact 301 (FIG. 10) is set accordingly. When changeover switch 368 (FIG. 12)—as is assumed—takes the position for "internal measurement" and as long as pushbutton 372 of brightness sensor 23 is not depressed, iris diaphragm 64 assumes its open position, even if sliding handle 105 (FIG. 3) is set at the "working aperture" position. Only if the photographer presses pushbutton 372 in order to perform a brightness measurement, does there appear at signal output F of microprocessor component 233 a signal which, by means of transistor 295, causes signal input D of microprocessor component 133 to close the iris diaphragm down to the preselected working diaphragm, if sliding handle 105 is in the "working aperture" position. Otherwise, the iris diaphragm remains in the open position. The APEX value $E_{Ev}$ $E_{Ev}$ resulting from the brightness measurement is automatically rolled into the microprocessor, so that it is available for the calculation of the exposure time.

Depending on whether setting mechanism 83 is set to the measuring mode "single-point measurement", "two-point measurement", or "multiple point measurement", a photographic exposure can be triggered after storing into memory one APEX brightness value $E_{E1v}...E_{Env}$. For the "two-point measurement" and "multiple point measurement", the photographer can, at will, change from "working aperture" to "open aperture", and vice versa, between the individual brightness measurements, or perform the brightness measurements with different relative apertures $A_E$ of the working aperture, during which process the measured values are in each case properly interpreted by exposure computer 22.

As in the operating mode "external measurement" of the brightness, also in the "internal measurement" mode in all the instances described above, any parameter governing the exposure can be varied prior to actuating the shutter release 169 (FIG. 5), during which the exposure time t is instantly recalculated automatically by exposure computer 22 and the resulting new exposure time is immediately indicated digitally in display panel 73 of camera front part 60 (FIG. 2) and read in binary coded form into the device for controlling the exposure of the shutter. In practice, the photographer will take advantage of this possibility, for example, if he wishes to make the photographic exposure with a relative aperture which differs from the preselected working aperture or deliberately wants to take the picture with an exposure which is different from the theoretical nominal exposure, or if he decides to use a film material with a different speed and/or different Schwarzschild effect. A different relative aperture is set by means of setting mechanism 72 on camera front part 60 (FIG. 2) and indicated immediately in display panel 74. Individual corrections of the exposure are possible in ⅓ exposure value steps by means of setting mechanism 84 (FIG. 3). Different film speeds or different Schwarzschild code digits can be set by means of setting mechanisms 81 and 82, provided the corresponding data are not automatically input into exposure computer 22 by coders within film cassette 26 via the connecting line 40, 30 or 41 (FIG. 1).

COMPUTATION OF THE EXPOSURE VALUES FOR FLASHLIGHT WITH FLASH OUTPUT

Let it be assumed that both plug units 31 and 32 of camera control unit 21 or of exposure computer 22 are connected directly or via connecting line 33, and that the shutter control device 27 and power pack 28 are connected to connectors 42 and 43 of control unit 21 (FIG. 1). Let it further be assumed that for the illumination of the subject to be photographed one or more flash units are utilized, the flash energy of which cannot be varied, at least not automatically. FIG. 1 shows in broken lines such flash unit 49 and its connecting cable 48 for the flash synchronization. Flash cable 48 is connected to connector 44 of control unit 21.

It is further assumed that brightness sensor 23 (FIG. 12) is connected to connector 34 of exposure computer 22, while the automatically controlled flash unit 24 (FIG. 1) is at first not connected to connector 35 of the exposure computer. When the brightness sensor 23 is connected, coder 254 (FIG. 9) in the exposure computer is inoperative, because—as explained above—switch 256 is then opened. Therefore, the photographer need not pay any attention to setting mechanism 85 of exposure computer module 80 (FIG. 3). The photosensitivity S of the film material used is set by means of setting mechanism 81 (FIG. 3) or, if film cassette 26 (FIG. 1) is used with built-in coders, it is read automatically into exposure computer 22. For flash exposures with short exposure times no corrections are required with respect to the Schwarzschild effect of the film material. In contrast, the setting of an exposure correction factor C may be required at setting mechanism 84.

It will be described below how the exposure values are determined on the basis of one or more exposure measurements with test flash illumination, with the measurements being performed with brightness sensor 23 in accordance with FIG. 12. This brightness sensor 23 causes an automatic input of the measured values in exposure computer 22.

The photographer sets, by means of setting mechanism 83 on exposure computer module 80 (FIG. 3), the coder 291 (FIG. 9) coupled thereto for the type of light "flashlight" and for the required measuring mode "single-point measurement", "two-point measurement" or "multiple-point measurement", whereby for each of these three measuring modes the photographer can also choose between two settings "1×flash" and "multiple flashes". "1×flash" means that the intended photographic exposure with flash illumination is provided with a single firing of a flash bulb or several flash bulbs. In contrast, "multiple flashes" means that for the intended exposure provision is made to fire one flash bulb or various flash bulbs twice, three times or n-times, although the test flash illumination serving the exposure measurement is performed only with a single firing of the flash bulb(s). As a consequence of the setting for the type of light "flash", relay 355 in brightness sensor 23 (FIG. 12) remains deenergized and relay contact 354 connects the input of analog frequency converter 356 to output 353 of integrator and storage device 352.

After the photographer has adjusted the camera to the subject to be photographed and has aligned the flash bulb or bulbs with the subject to be photographed, a test flash illumination can be performed with simultaneous light metering. To do this, it is necessary that the photographer sets at setting mechanism 71 of camera front part 60 (FIG. 2) an exposure time which is suitable for flash shots, e.g., 1/30 and ½ second, with this exposure time being indicated digitally in the display panel 73 (FIG. 2). The exposure measurement can be effected either as "external measurement" or as "internal measurement", with changeover control 368 of brightness sensor 23 (FIG. 12) being set accordingly or automatically placing or removing a light diffuser in front of photoelectric converter 350 in order to program the exposure computer 22 for calculating the proper exposure parameter values either as a result of external measurements or of internal measurements for test flash illuminations. The "internal measurement" can be effected either with "open aperture" or with a preselected "working aperture". The preselection of the relative aperture of lens 65 occurs by means of setting mechanism 72 on camera front part 60 (FIG. 2), with the selected aperture value being indicated digitally in display panel 74. The programming of the exposure computer for exposure measurements with "open aperture" or with "working aperture" is effected by means of sliding handle 105 (FIG. 3) and by means of the electrical switch 301 (FIG. 10) coupled therewith.

It is a known fact that when the subject is illuminated with flash, the luminous density thereof is not constant, but is variable as a function of time. At the start of the flash, the luminous density rises rapidly to a maximum and generally drops somewhat less rapidly. The curve is dependent upon the properties of the flash bulb used. The resulting exposure of the photographic film is therefore proportional to the integral of the luminous density over the time during which the shutter is open.

Therefore, for the test flash illumination a similar integration of the light intensity striking the photoelectric converter 350 must also be effected.

The following equations apply:

$$\int_0^{t_1} B \cdot dt = H \qquad \text{(VIII)}$$

$$H_E = \frac{H}{A_E^2} \qquad \text{(IX)}$$

$$\int_0^{t_1} E_M \cdot dt = H_M \qquad \text{(X)}$$

$$H_E = H_M \cdot \frac{A_M^2}{A_E^2} \qquad \text{(XI)}$$

$$H_o = \frac{\text{constant}}{10^{\frac{S}{10}}} \cdot C \qquad \text{(XII)}$$

in which:
$t_1$ = opening period of shutter during photographic exposure (identical to the gate time for the integration during the exposure measurement)
B = variable luminous density of the subject
H = resultant exposure during "external measurement"
$A_E$ = preselected relative aperture of camera lens
$H_E$ = resultant exposure in image plane of camera with preselected relative aperture $A_E$
$A_M$ = relative aperture of camera lens during "internal measurement" in image plane of camera
$E_M$ = variable intensity of illumination in image plane of camera during "internal measurement" with relative aperture $A_M$
$H_M$ = resultant exposure during "internal measurement" in image plane of camera with relative aperture $A_M$
$H_o$ = nominal exposure of photographic film during shooting
S = speed of photographic film
C = exposure correction factor, if required By taking the logarithm and transforming the equations (IX), (XI) and (XII) the following APEX value equations result:

$$H_{Ev} = H_v - A_{Ev} \qquad \text{(XIII)}$$

$$H_{Ev} = H_{Mv} - (A_{Ev} - A_{Mv}) \qquad \text{(XIV)}$$

$$H_{ov} = C_v - S_v \qquad \text{(XV)}$$

$$\Delta_v = H_{Ev} - H_{ov} \qquad \text{(XVI)}$$

in which:
$A_{Ev}$ = APEX value of the preselected relative aperture $A_E$ of the camera lens
$H_v$ = APEX value of the resultant exposure during "external measurement"
$H_{Ev}$ = APEX value of the resultant exposure in image plane of camera with relative aperture $A_E$
$A_{Mv}$ = APEX value of the relative aperture of the camera lens during "internal measurement" in image plane of camera
$H_{Mv}$ = APEX value of resultant exposure with relative aperture $A_M$ during "internal measurement" in image plane of camera $H_{ov}$ = APEX value of nominal exposure of photographic film $S_v$ = APEX value of speed of photographic film $C_v$ = APEX value of an exposure correction, if required $\Delta_v$ = APEX value of the different between the resultant exposure in the image plane of the camera with relative aperture $A_E$, on the one hand, and the nominal exposure of the photographic film on the other.

All APEX values are proportional to the logarithm of the exposure parameter value concerned and conveniently quantified in ⅓ stop steps.

In the following section, it is first assumed that setting element 83 of exposure computer module 80 (FIG. 3) is in the position for "single-point measurement" and "1×flash" and that changeover control 368 of brightness sensor 23 (FIG. 12) has been switched to the position for "external measurement".

To perform an exposure measurement the photographer presses pushbutton 372 on brightness sensor 23 (FIG. 12). As a result, by means of a clearing signal supplied from signal output E of microprocessor component 235 (FIG. 11) and conducted via conductor 286 and connections 284 and 364 of plug connectors 34 and 360, respectively, to control input 362 of integrator and storage unit 352, the storage of this unit is cleared and immediately thereafter a test flash is fired by a firing signal at outlet M of microprocessor component 133 (FIG. 5). By means of photoelectric converter 350 an electric signal, the strength of which corresponds to the actual momentary luminous density B of the subject, is generated and delivered to input 351 of integrator and storage unit 352 as a function of time. In unit 352 the electric signal is integrated and the resultant measured electrical value stored via a gate time $t_1$, which corresponds to the preselected exposure time. The control of the Torzeit$^{(e)}$ occurs by means of a control signal which is fed from signal output H of microprocessor component 233 via connections 278 and 363 of plug connectors 34 and 360 to signal input 361 of integrator and storage unit 352. The measured electrical value stored in unit 352 is a measure for the resultant exposure H in accordance with equation (VIII) and is routed to the input of analog frequency converter 356 via relay contact 354, which analog frequency converter 356 generates electric impulses, the frequency of which is proportional to the logarithm of the measured value suppied. The impulses are amplified in amplifier 357 and routed to signal input G of microprocessor component 233 (FIG. 9) via plug connector connecaions 358 and 276. By means of the frequency of the impulses delivered to signal input G the exposure computer determines the APEX value $H_v$ of the exposure H resulting from the test flash illumination. A "measured value" proportional to this APEX value $H_v$, quantified in ⅓ exposure value steps is indicated digitally in display panel 73 of camera front part 60 (FIG. 2), as long as the photographer depresses push button 372 on brightness sensor 23 (FIG. 12). Upon release of push button 372, the exposure computer calculates, in accordance with equation (XIII), the APEX value $H_{Ev}$ of the resultant exposure $H_E$ in the image plane of the camera with the preselected relative aperture $A_E$. The APEX value $H_{Ev}$ is stored in the microprocessor. Thereupon, the exposure computer calculates by means of the APEX values $S_v$ and $C_v$ of film speed S or of exposure correction factor C, if required, and in accordance with equation (XV) the APEX value $H_{ov}$ (which is likewise stored into memory) corresponding to the nominal exposure $H_o$ of the film utilized. The exposure meter then produces automatically, in accordance with equation (XVI), the algebraic difference $\Delta_v$ between the two APEX values of the resultant exposure $H_E$ during the test flash illumination and the nominal illumination $H_o$. The result is indicated in display panels 97 and 98 of exposure computer module 80 (FIG. 3).

If the calculated difference $\Delta_v$ happens to equal zero, the numeral 1 appears in display panel 97, while the other display panel 98 remains dark. In this way, the photographer is signaled that he can take the intended picture with a single firing of the flash bulb(s) utilized for the test flash illumination and a properly exposed image is obtained in the process. If, on the other hand, the difference $\Delta_v$ calculated by the exposure computer is not equal to zero, this difference is indicated in display panel 98 in whole exposure value intervals and, if necessary, ⅓ or ⅔ exposure value interval, including algebraic sign. A minus sign before the differential indication points to the fact that too little light would be available, while the absence of the minus sign means that there would be too much light. As long as a difference is indicated in display panel 98, the shutter is prevented from being activated.

The photographer now has to ensure the disappearance of the differential indication in display panel 98. That can, for example, be done by varying the preselected relative aperture $A_E$ of lens 65 by means of setting mechanism 72 on camera front part 60 (FIG. 2), with the aperture value set in each instance being indicated digitally in display panel 74 of camera front part 60. Each change in the preselected aperture value results immediately in an automatic recalculation of the APEX value $H_{Ev}$ in accordance with equation (XIII) and of the difference $\Delta_v$ from the APEX value $H_{ov}$ of the nominal exposure in accordance with equations (XV) and (XVI), whereupon any remaining difference is again indicated digitally in display panel 98 of exposure computer module 80. Not until no more indication is visible in display panel 97 and the numeral 1 appears in the other display panel 97 is the difference $\Delta_v$ equal to zero and an accurately exposed photographic picture can be made with a single firing of the flash bulb(s) used for the test flash illumination. The release lock of the shutter is cancelled automatically, as soon as the difference $\Delta_v = 0$.

If the photographer does not want to alter the preselected stop value, or if the range of adjustment of iris stop 64 is not sufficient to bring about the disappearance of the differential indication in display panel 98 of exposure computer module 80, the photographer has the option of using another film material with a different speed or changing the position of the flash bulb(s) or varying, as required, the light output of the flash bulb(s). If the photographer decides to change the bulb position or the flash output, he must, after taking this step, again perform a light meter reading during a test flash illumination in order to check with the aid of display panels 97 and 98 of exposure computer module 80 if a properly exposed shot is now possible. Finally, the simplest way for the photographer to eliminate any remaining differential indication in display panel 98 is an appropriate modification of the preselected relative aperture.

As soon as no more difference is indicated in display panel 98 of exposure computer module 80, the photographer can insert into the camera a film cassette loaded with unexposed film material, so that automatically by means of actuating pin 166 (FIG. 5) contact 165 is closed, causing the shutter to be driven to its closed position and simultaneously iris stop 64 of the camera lens is closed down to the preselected relative aperture. Subsequently, the photographer presses release button 169 (FIG. 5), causing the microprocessor, by means of contact 168, to release the shutter and to fire the flash.

If, after performing an exposure measurement during a test flash illumination, a negative difference of from 1 to 9 exposure value intervals is indicated in display panel 98 of exposure computer module 80 (FIG. 3), this means that far too little light is available for a properly exposed photographic picture. In this case, the photographer can switch setting mechanism 83 (FIG. 3) from the "1×flash" position to the "multiple flash" position, whereup immediately a whole number 2, 3, 4, 5 . . . 99 appears in display panel 97. This whole number signals how many flashes are required one after the other using the same flash energy as for the test flash illumination in order to properly exposure the film. Any remaining small difference of ⅓ or ⅔ exposure value step is indicated in display panel 98, if the number of required flashes indicated in display panel 97 is less than 4. As long as such differential indication remains visible, the release of the shutter is blocked. The photographer must then attend to the disappearance of the differential indication, e.g., through a corresponding change in the preselected relative aperture, as described earlier, before a picture can be taken. For photography with multiple flash the double exposure lock must be canceled by means of sliding handle 76 on camera front part 60 (FIG. 2).

By inserting a film cassette into the camera, the shutter is automatically driven to its closed position and iris stop 64 of the camera lens is stopped down to its preselected relative aperture, as explained above. Immediately thereafter, the photographer presses release 169 (FIG. 5), causing the microprocessor to release the shutter and bringing about the first firing of the flash bulb(s). After expiration of the exposure time set at setting mechanism 71 (FIG. 2), the shutter returns to its closed position and the indicator in display panel 97 of exposure computer module 80 (FIG. 3) is stepped down by one, thus indicating the number of further flashes that are still necessary. Now, by again pressing release button 169, the photographer can once again trigger the opening and closing of the shutter and trigger the firing of a flash, whereupon the indicator in display panel 97 is again stepped down by 1. These operations must be repeated until the numeral 0 appears in display panel 97. The photographic picture is than properly exposed and the shutter release is blocked automatically so that no further flash can be fired inadvertently. Now, when the film cassette is taken out and is replaced by one containing unexposed film material, the original number reappears in display panel 97 and the blocking of the shutter is cancelled automatically so that the photographer can at once take a second shot under the same lighting conditions, if he so desires.

If setting mechanism 83 on exposure computer module 80 (FIG. 3) is adjusted for the type of light "flash" and the measuring mode "two-point measurement", the photographer must perform two exposure measurements under test flash illumination conditions before he can take a picture. Each of these measurements is initiated by pressing pushbutton 372 on brightness sensor 23 (FIG. 12), during which a test flash is also fired in each situation. After each test flash, brightness sensor 23 delivers electric impulses, from the frequency of which the exposure computer calculates the APEX value $H_{1\nu}$ and $H_{2\nu}$ of exposure $H_1$ and $H_2$, respectively. A "measured value" proportional to APEX value $H_{1\nu}$ and $H_{2\nu}$ is indicated in display panel 73 of camera front part 60 (FIG. 2), as long as the photographer presses pushbutton 372. After releasing pushbutton 372 the exposure computer automatically calculates in accordance with equation (XIII) the resultant APEX value $H_{E1\nu}$ or $H_{E2\nu}$, which is stored in the microprocessor. Not until a single APEX value $H_{E1\nu}$ is stored, does display panel 73 remain dark after release of push button 372, thereby signalling to him that a second exposure measurement is necessary. As soon as the second APEX value $H_{E2\nu}$ is also stored into memory, exposure computer 22 calculates with the aid of both stored APEX values the mean value $H_{E\nu}=(H_{E1\nu}+H_{E2\nu})/2$ and the difference $H_{E1\nu}-H_{E2\nu}$. This difference can be indicated digitally by pressing push button 102 of exposure computer module 80 (FIG. 3) in display panel 73 (FIG. 2) in order to be able to perceive the contrast between the two test flash illuminations. Exposure computer 22 also calculates in accordance with equation (XV) the APEX value $H_{o\nu}$ of nominal exposure $H_o$, which is likewise stored into memory. Thereupon, the exposure computer produces in accordance with equation (XVI) the difference $\Delta_\nu$ between said mean value and the APEX value of the nominal exposure. The result is indicated digitally in display panels 97 and 98 of exposure computer module 80 (FIG. 3), as in the case of the previously described "single-point measurement". The remaining procedure is the same as in "single-point measurement".

If setting mechanism 83 on exposure computer module 80 (FIG. 3) is adjusted for the type of light "flash" and the measuring mode "multiple-point measurement", the photographer can perform any number of exposure measurements under test flash illumination conditions, with the APEX values $H_{E1\nu}$, $H_{E2\nu}$ . . . $H_{En\nu}$ being stored into memory and the average $H_{E\nu}=(H_{E1\nu}+H_{E2\nu}+ \ldots H_{En\nu})$ being calculated from the APEX values stored until then. Thereupon the exposure computer produces in accordance with equation (XVI) the difference $\Delta_\nu$ between said average and the APEX value $H_{o\nu}$ of the nominal exposure which has been calculated in accordance with equation (XV). The resultant difference $\Delta_\nu$ is indicated in display panels 97 and 98 of exposure computer module 80 (FIG. 3) and in the case of the "single-point measurement" described above. The remaining procedure is the same as for "single-point measurement".

For "internal measurement", that is, if the photoelectric converter 350 of brightness sensor 23 (FIG. 12) is in the image plane of the camera during the test flash illumination, e.g., directly in front of or behind the ground glass screen, changeover control 368 of brightness sensor (FIG. 12) must be switched to the position for "internal measurement". Setting mechanism 83 of exposure computer module 80 (FIG. 3) shall again be adjusted for the type of light "flash" ("1×flash" or "multiple flash") and the measuring mode "single-point measurement", "two-point measurement" and for the measuring mode "single-point measurement", "two-point measurement", or "multiple point measurement". The photographer must also set at camera front part 60 (FIG. 2), by means of setting mechanism 71, an exposure time suitable for flash photography, e.g., in the range of from 1/30 to ⅛ second, whereupon the set exposure time is instantly indicated digitally in display panel 73. Likewise on camera front part 60 the relative aperture $A_E$ provided for the shooting must be set by means of setting mechanism 72, which aperture is immediately indicated digitally in display panel 74. As mentioned earlier, the exposure measurements under test flash illumination conditions can likewise be performed either with "working aperture", i.e., with the preselected relative aperture $A_E$, or with "open aperture", i.e., with fully opened iris stop 64 of the camera lens. The changeover from "working aperture" to "open aperture", and vice versa, must be effected by means of sliding handle 105 (FIG. 3) and the electric switch 301 coupled thereto.

Let it first be assumed that an exposure measurement is performed with "open aperture". In this case, iris stop 64 is fully opened, with the relative aperture being $A_M$. The photographer presses pushbutton 372 on brightness sensor 23 (FIG. 12). As a result, by means of a clearing signal delivered from signal output E of microprocessor component 235 (FIG. 11) and routed via conductor 286 and connections 284 and 364 of, respectively, connectors 34 and 360 to control input 362 of integrator and storage unit 352, the storage of this unit is cleared and immediately thereafter a test flash illumination is triggered by a firing signal from output M of microprocessor component 133 (FIG. 5), while the shutter is open. By means of photoelectric converter 350 an electric signal is generated, the strength of which corresponds to the actual momentary illumination intensity $E_M$ at the particular point of the image plane of the camera. This illumination intensity $E_M$ varies as a function of time. The electric signal generated by converter 350 is delivered to input 351 of integrator and storage unit 352 and integrated in this unit via a gate time $t_1$, which corresponds to the preselected exposure time. The result of this integration is a measure for the exposure $H_M$ in accordance with equation (X) and is stored in unit 352. The control of the gate time occurs by means of a control signal which is routed via contact members 278 and 363 of connectors 34 and 360 to signal input 361 of integrator and storage unit 352. The measured electrical value stored in unit 352 is routed via relay contact 354 to the input of analog frequency converter 356, which generates impulses having a frequency which is proportional to the logarithm of the measured value $H_M$. The impulses are amplified in amplifier 357 and fed to signal input G of microprocessor component 233 (FIG. 9) via connector contact members 358 and 276. By means of the frequency of the impulses delivered to signal input G, the exposure computer determines the APEX value $H_{Mv}$ of the exposure $H_M$ resulting from the test flash illumination with the relative aperture $A_M$. A "measured value" proportional to the APEX value $H_{Mv}$ is indicated digitally in display panel 73 of camera front part 60 (FIG. 2), as long as the photographer presses push button 372 on brightness sensor 23 (FIG. 12). After releasing push button 372, the APEX value $H_{Ev}$ of the corresponding exposure $H_E$ with the preselected relative aperture $A_E$ is calculated in accordance with equation (XIV) by means of the exposure computer in accordance with equation (XIV). This APEX value $H_{Ev}$ is stored in the microprocessor.

The remaining procedure is the same as previously described with reference to the "external measurement". Summarizing briefly:

When setting mechanism 83 is set to measuring mode "single-point measurement", the exposure computer calculates upon release of push button 372 (FIG. 12), after a single test flash, the APEX value $H_{ov}$ of the nominal exposure in accordance with equation (XV) and thereafter the difference $\Delta_v$ in accordance with equation (XVI), whereupon the resultant difference, if it is not zero, is indicated digitally in display panels 97 and 98 of exposure computer module 80 (FIG. 3). Any displayed difference must, as explained above, be made to disappear before shooting is possible.

If setting mechanism 83 is adjusted to the measuring mode "two-point measurement", two exposure measurements are necessary with test flash illumination, during which in each situation after release of pushbutton 372 (FIG. 12), the exposure computer calculates the APEX value $H_{E1v}$ in accordance with equation (XIV) resulting from the particular measurement and stores it in the microprocessor. As soon as the second value is stored into memory, the difference between the two APEX values $H_{E1v}$ and $H_{E2v}$, as well as the mean value $H_{Ev}$ of these values, is calculated automatically. Also calculated automatically are the APEX value $H_{ov}$ of the nominal exposure in accordance with equation (XV) and the difference $\Delta_v$ in accordance with exposure (XVI). If the resultant difference $\Delta_v$ is does not equal zero, it is indicated digitally in display panels 97 and 98 of exposure computer module 80 (FIG. 3). An indicated difference $\Delta_v$ shall be made to disappear in the manner explained above before shooting is possible. Prior to the release of the shutter it is possible, by pressing pushbutton 102 on exposure computer module 80 (FIG. 3), to indicate digitally the absolute value of the difference between the two stored APEX values $H_{E1v}$ and $H_{E2v}$ in display panel 73 of camera front part 60 (FIG. 2) in order to obtain information concerning the contrast between the two exposure measurements.

If setting mechanism 83 is adjusted to measuring mode "multiple-point measurement", the photographer can perform any number of exposure measurements with test flash illumination before shooting. Each of these lightmeter readings must be initiated by pressing push button 372 on brightness sensor 23 (FIG. 12), during which process a test flash is also fired and thereafter the particular APEX value $H_{M1v}$, $H_{M2v}$ ... $H_{Mnv}$ of the exposure, which results in the image plane of the camera, is calculated. As long as push button 372 is depressed, a "measured value" proportional to the calculated APEX value $H_{M1v}$ ... $H_{Mnv}$ is calculated digitally in display panel 73 of camera front part 60 (FIG. 2). Upon release of push button 372, the exposure computer calculates in each situation, in accordance with equation (XIV), the corresponding APEX value $H_{E1v}$, $H_{E2v}$ ... $H_{Env}$, which is stored in the microprocessor. Thereupon, the mean value $H_{Ev}=(H_{E1v}+H_{E2v}+ \ldots H_{Env})/n$ is calculated of all the APEX values stored until then and, with the aid of this mean value in accordance with equations (XV) and (XVI), the algebraic difference $\Delta_v$ between said mean value and the APEX value $H_{ov}$ of the nominal exposure. If the resultant difference $\Delta_v$ is not zero, it is displayed digitally in display panels 97 and 98 of exposure computer module 80 (FIG. 2). Any displayed difference must be made to disappear in the manner described above before shooting is possible.

When the internal measurement is to be performed not with "open aperture" but with "working aperture", the sliding handle 105 on camera front part 60 (FIG. 2) is solely to be switched to the "working aperture" position. Otherwise, the apparatus is to be handled exactly in the same fashion as described above for the exposure measurement with "open aperture". However, the following differences occur in the internal sequence of operations:

When pushbutton 372 on brightness sensor 23 (FIG. 12) is pressed, iris stop 64 of the camera lens, which until then is fully opened, is first automatically closed until the relative aperture $A_E$ preselected by means of setting mechanism 72 and indicated digitally in display panel 74 is reached. Not until then is test flash automatically fired with the shutter open and the actual exposure measurement is initiated. During the test flash illumination, photoelectric converter 350 of brightness sensor 23 generates an electric signal, the strength of which is proportional to the momentary illumination intensity $E_E$ in the image plane of the camera, which varies with time. By integrating this electric signal via the gate time t in the integrator and storage unit 352 there results a measured electrical value which is a direct measure for the exposure $H_E$ which results in the image plane of the camera and is routed via relay contact 354 to the input of analog frequency converter 356. The latter generates electrical impulses with a frequency which is proportional to the logarithm of the measured value supplied. By means of the frequency of these impulses, the exposure computer determines the APEX value $H_{Ev}$ of the exposure $H_E$ resulting from the test flash illumination. A "measured value" proportional to said APEX value $H_{Ev}$ is displayed digitally in display panel 73 of camera front part 60 (FIG. 2), as long as the photographer presses push button 372 on brightness sensor 23. When push button 372 is released, the calculated APEX value $H_{Ev}$ is stored in the microprocessor. Since the exposure measurement with "working aperture", that is to say, since it occurred with the preselected relative aperture $A_E$, the arithmetical operation in accordance with equation (XIV) is dispensed with, because $A_{Ev} = A_{Mv}$ and, thus, $H_{Ev} = H_{Mv}$. During the programming of the exposure computer on "internal measurement", under flash illumination conditions, and with "working aperture", it is practical to suppress the subtrahend $(A_{Ev} - A_{Mv})$ in equation (XIV). The remaining procedure is exactly the same as for the exposure measurement with "open aperture".

It should also be mentioned that with flash illumination and the measuring modes "two-point measurement" and "multiple-point measurement" the photographer can switch between two consecutive "internal measurements" in the image plane of the camera from "open aperture" to "working aperture" and vice versa, if he so desires, without in any way affecting the final result of the exposure measurement.

In all cases described above the flash illumination of the subject, the photographer can, each time prior to pressing release button 169 (FIG. 5) make an (other) individual correction of the exposure to be expected by means of setting mechanism 84 in ⅓ exposure value steps if he wishes deliberately to bring about more or less exposure. Likewise, as required, he can set a different speed of the photographic film material by means of setting mechanism 81. In addition, he can change any number of times the position of setting mechanism 83 from "1×flash" to "multiple flash", and vice versa. Following each such change in the position of setting mechanisms 81, 83 and 84, the exposure computer recalculates immediately the corresponding APEX value $H_{ov}$ of the nominal illumination in accordance with equation (XV) and the difference $\Delta_v$ between the same APEX value $H_{Ev}$ and that resulting from the exposure measurements, whereupon said difference, if it is not zero, is indicated digitally in display panel 98 of exposure computer module 80. Prior to shooting, the photographer has to ensure that the displayed difference disappears, e.g., through a corresponding change in the preselected relative aperture, as described in detail for the case of "single-point measurement". The illumination of the subject may also include a portion of continuous light which is captured during the exposure measurement in addition to flash.

Instead of the brightness sensor 23 (FIG. 12) for the automatic transmission of the measurement data to the exposure computer 22, other commonly used exposure meters may also be employed, which are designed for measuring under flash illumination conditions. In this case, the photographer must transfer by hand to exposure computer 22 the measured value determined by means of the exposure meter, that is, by means of setting mechanism 85 on exposure computer module 80 (FIG. 3). A prerequisite for this is the use on exposure computer module 80 of a photographic plate 96 having a scale 95 which is adapted to the exposure meter used and to the measuring mode "flash". The operation of the apparatus of the invention remains basically the same as the one described above, the only difference being that, instead of the automatic input of the measuring data, the measured value determined in each situation is entered manually, during which process, following an appropriate adjustment of setting mechanism 85, the photographer must press pushbutton 101 (FIG. 3) in order to read in the measured value. The measured value entered is indicated digitally in display panel 74 of camera front part 60 (FIG. 2), as long as the photographer presses push button 101. Following the release of push button 101, the automatic arithmetical operations in the exposure meter are initiated as described above.

COMPUTATION OF THE EXPOSURE VALUES FOR FLASH WITH AUTOMATIC CONTROL OF THE FLASH OUTPUT

Let is be assumed that both plugs 31 and 32 of camera control unit 21 or of exposure computer 22 are connected directly to each other or via connecting line 33, that the shutter control device 27 and the power pack 28 are connected to connectors 42 and 43 of control unit 21, and that no flash unit is connected to connector 44 of control unit 21 (FIG. 1). Let it further be assumed that brightness sensor 23 (FIG. 12) is connected to connector 34 and the controlled flash unit 24 to connector 35 of exposure computer 22. It is recalled that when brightness sensor 23 is connected, the coder 254 (FIG. 9) in exposure computer is inoperative, because switch 256 is then opened. Therefore, the photographer need not pay attention to setting mechanism 85 of exposure computer module 80 (FIG. 3). The photosensitivity and the code digit for the Schwarzschild behavior of the film material to be used are set either by means of setting mechanisms 81 and 82 (FIG. 3) or, if film cassette 26 (FIG. 1) is used with built-in coders, read automatically into exposure computer 22.

By means of setting mechanism 83 on exposure computer module 80 (FIG. 3) the photographer sets coder 291 (FIG. 9) for the type of light "flash" with "1×flash" or "multiple flash" and for the required measuring mode "single-point measurement", "two-point measurement", or "multiple-point measurement". Setting for the type of light "flash" causes the relay 355 in brightness sensor 23 (FIG. 12) to remain deenergized, so that relay contact 354 connects the input of analog frequency converter 356 to output 353 of the integrator and storage unit 352. It is now assumed that the exposure computer is programmed for "single-point measurement" and "1×flash".

One or more flash bulbs for the illumination of the subject to be photographed are connected by the photographer to the connectors 391 of flash unit 24 (FIG. 13). After aligning the flash bulbs and the camera with the subject, a test flash illumination with simultaneous exposure measurement can be performed. To accomplish this, the photographer must set an exposure time which is suitable for flash photography. The selected exposure time is indicated in display panel 73 (FIG. 2). The exposure measurement can be effected either as "external measurement" or as "internal measurement", for which changeover control 368 for brightness sensor 23 (FIG. 12) must be set accordingly. Preferably, this occurs automatically by putting on or removing a light diffuser in front of photoelectric converter 350. The "internal measurement" can be effected either with "open aperture" or with a preselected "working aperture". The preselection of the relative aperture $A_E$ of lens 65 is effected by means of setting mechanism 72 on camera front part 60 (FIG. 2), with the selected aperture being indicated in display panel 74 (FIG. 2). The changeover of exposure computer for measurements with "open aperture" or with "working aperture" occurs by means of sliding handle 105 (FIG. 3) and the electric switch 301 (FIG. 10) coupled thereto. As already described above, exposure computer 22 is programmed automatically when setting for "external measurement" or "internal measurement" with "open aperture" or with "working aperture", respectively, so that the eventually calculated exposure values are correct in each case.

To carry out an exposure measurement, the photographer presses pushbutton 372 on brightness sensor 23 (FIG. 12), so that in the case of "internal measurement" with "working aperture" iris diaphragm 64 is stopped down to the preselected aperture, the storage in integrator and storage unit 352 is cleared, and a test flash is triggered, while the shutter is open. The firing signal is delivered from signal output F of microprocessor component 235 (FIG. 11) to circuit arrangement 175' to 179' for the flash synchronization which, in turn, applies ground potential to input 392 of firing and flash output distributing unit 390 via conductor 315 and connector contact members 314 (FIG. 10) and 393 (FIG. 13) in order to fire a flash. It is practical to carry out the test flash illumination with 100% flash output unit 24, that is, when input device 398 (FIG. 13) is set to maximum output. By means of photoelectric converter 350 an electrical signal is generated, having a strength which corresponds to the actual momentary illumination intensity of the light striking the converter 350, and delivered to input 351 of integrator and storage unit 352. In unit 352 the electrical signal is integrated over a gate time corresponding to the preselected exposure time and the result of this integration selected exposure time and the result of this integration stored. The control of the gate time occurs by means of a control signal which is routed from signal output H of microprocessor component 233 (FIG. 9) to signal output 361 of integrator and storage unit 352. The measured electrical value stored in unit 352 is routed to analog frequency converter 356 via relay contact 354. This analog frequency converter 356 generates electric impulses with a frequency which is proportional to the logarithm of the measured value supplied. The pulses are fed to signal input G of microprocessor component 233 (FIG. 9) via amplifier 357. On the basis of the frequency of the pulses supplied to signal input G exposure computer 22 calculates in accordance with equation (XIII) or (XIV) the APEX value $H_{Ev}$, which is stored in the microprocessor. The exposure computer also calculates in accordance with equation (XV) the APEX value $H_{ov}$ of the nominal exposure which is likewise stored. Thereupon the exposure computer produced in accordance with equation (XVI) the difference $\Delta_v$ between the APEX values of the resultant exposure and the nominal exposure. If the calculated difference $\Delta_v$ happens to equal zero, the numeral 1 appears in display panel 97 of exposure computer module 80 (FIG. 3), while the other display panel 98 remains dark. Thus, the photographer is signaled that he can make the intended shot by firing a single flash and obtain a correctly exposed picture in the process.

If the difference $\Delta_v$ calculated by exposure computer 22 is positive, there was too much light during the test flash illumination. In this case the output of flash unit 24 (FIG. 13) is automatically reduced by the number of flash output steps corresponding to the difference $\Delta_v$ by switching off from the chain of capacitors the number of charging capacitors 388-I to 388-V required therefor by means of semiconductor switches 387-I to 387-V. The control signals required therefor are routed from signal outputs L, M, N and O of microprocessor component 234 (FIG. 10) via contact members 304 and 383 of connectors 35 or 380 to opto-isolator assembly 381 and routed therefrom to signal inputs A, B, C and D of control electronics 385 which, in turn, delivers to signal outputs I-V control signals for semiconductor switches 387-I to 387-V. The resultant flash output reduction occurs in ⅓ exposure value intervals in accordance with Table I. As soon as capacitors 388, 388-I, etc., which are still parallel connected, are recharged by means of chargers 389, the release blocking signal applied at signal output 394 of the charger during the charging process is eliminated, so that the photographer can take the intended picture by firing a single flash.

If the range of output adjustment of flash unit 24 (FIG. 13) should not suffice to weaken the luminous energy for the illumination of the subject to an adequate degree, this is reported to signal inputs P, O, R and S of microprocessor component 234 (FIG. 10) by signals from signal outputs E, F, G and H of control electronics 385 via optoisolator assembly 382 and plug connector assembly 386 and 305. Thereupon, the exposure computer 22 calculates the remaining difference $\Delta_v$ and indicates it in display panel 98 of exposure computer module 80 (FIG. 3) in exposure value intervals and possibly ⅓ or ⅔ exposure value interval. The absence of a minus sign before the differential display signals that there is still too much light available. The photographer can cause the displayed difference disappear by changing the preselected relative aperture, that is, by a further closing of the iris stop 64 or by using a film material with slower speed or by changing the position of the flash bulb. It will be understood that a combination of these steps is also possible. If the photographer has decided to change the flash bulb position, he must then take a new exposure measurement during another test flash illumination to check and to obtain another residual correction that may still be necessary. Not until no more differential is visible in display panel 98 (FIG. 3) and the numeral 1 is indicated in the other display panel 96 is the shutter release blocking canceled and the intended shooting possible.

If, after the exposure measurement during a test flash illumination with 100% output of flash unit 24 (FIG. 13), exposure computer 22 a negative difference $\Delta_y$, the test flash had too little luminous energy. The photographer can then adjust setting mechanism 83 to "multiple flash", if this was not done at the start. Thereupon, there appears in display panel 97 of exposure computer module 80 (FIG. 3) a one or two-digit number which indicates how many flashes are required with identical flash energy in order to obtain a properly exposed picture. In some cases it is necessary to match the output of flash unit 24. This output matching is done automatically, as described earlier. If in the process the range of output adjustment of flash unit 24 would have to be exceeded and a number of flashes is indicated in display panel 97 of exposure computer module 80 (FIG. 3), the still remaining exposure difference is indicated in the other display panel 98 and the shutter release blocked. The photographer then has to ensure the removal of the indicated difference as described above. Not until display panel 98 indicates no more difference is the shutter release blocking canceled.

The photographer can now insert a film cassette loaded with film material into the camera, during which by means of an actuating pin 166 (FIG. 5) contact 165 is automatically closed so that the shutter is driven into its closed position and at the same time iris stop 64 of the camera lens is stopped down to the preselected relative aperture. Thereupon, the photographer presses release button 169 (FIG. 5), so that by means of contact 168 the microprocessor is caused to release the shutter and to fire the first flash. Following expiration of the exposure time preselected at setting mechanism 71 (FIG. 2), the shutter reassumes its closed position and the indicator in display panel 97 of exposure computer module 80 (FIG. 3) is lowered by 1, so that the number of additional flashes still necessary is indicated. By pressing release button 169 again, the photographer can once again trigger the opening and closing of the shutter and the firing of a flash, whereupon the indicator in display panel 97 is once again lowered by 1. These operations must be repeated until the numeral 0 appears in display panel 97. The photographic picture is then properly exposed and the shutter release is block automatically in order to prevent inadvertently fired flashes.

If setting mechanism 83 on exposure computer module 80 (FIG. 3) is set for the type of light "flash" and the measuring mode "two-point measurement", two exposure measurements must be taken for each situation during a test flash illumination before a picture can be taken. For each of these measurements the same procedure must be followed as detailed above for the "single-point measurement". Following each test flash, exposure computer 22 calculates in accordance with equation (XIII) or (XIV) the resultant APEX value $H_{E1v}$ or $H_{E2v}$, which is stored in the microprocessor. As soon as pushbutton 372 of brightness sensor 23 is pressed, a "measured value" proportional to the APEX value concerned is read off in display panel 73 (FIG. 2). Only after a single APEX value $H_{E1v}$ is stored does display panel 73 remain dark following release of pushbutton 372 in order to signal the photographer that a second measurement is still necessary. As soon as the second APEX value $H_{E2v}$ is stored, exposure computer 22 calculates the mean value $H_{Ev}$ from the two stored APEX values and the difference therebetween. The difference can be indicated in display panel 73 (FIG. 2) by pressing pushbutton 102 of exposure computer module 80 (FIG. 3). Exposure computer 22 further calculates in accordance with equation (XV) the APEX value $H_{ov}$ of the nominal exposure which is likewise stored. Thereupon the exposure computer automatically produces, in accordance with equation (XVI), the difference $\Delta_v$ between mean value $H_{Ev}$ and the APEX value of the nominal exposure. On the basis of the resultant difference, the flash output of flash generator 24 (FIG. 13) is changed automatically by the number of flash output steps corresponding to the difference $\Delta_v$. If, in the process, the range of output adjustment of flash unit 24 is to be exceeded, the residual exposure difference is displayed in display panel 98 of exposure computer module 80 (FIG. 3). The remaining procedure has to be the same as described above with reference to the "single-point measurement".

If setting mechanism 83 on exposure computer module 80 (FIG. 3) is set for the type of light "flash" and the measuring mode "multiple-point measurement", the photographer can make any desired number of exposure measurements during a test flash illumination, during which the APEX values $H_{E1v}, H_{E2v} \ldots H_{Env}$ resulting from all these measurements in accordance with equations (XIII) or (XIV) are stored in the microprocessor and, after each measurement, the mean value $H_{Ev}$ of the APEX values stored until then is computed. Following each measurement, exposure computer 22 calculates in accordance with equations (XV) and (XVI) the difference $\Delta_v$ between the calculated mean value $H_{Ev}$ and the APEX value $H_{ov}$ of the nominal exposure. On the basis of the result of this discrepancy computation the output of the flash unit 24 (FIG. 13) is controlled automatically, with any residual exposure difference being indicated in display panel 97 of exposure computer module 80 (FIG. 3). Everything else must be done in the same way as described earlier with reference to "single-point measuring".

Instead of brightness sensor 23 (FIG. 12), which ensures an automatic transmission of the measuring data to exposure computer module 80 (FIG. 3), other commercial exposure meters, which are designed for exposure measurements by means of flashlight, may likewise be utilized. In this case, however, the photographer must, after each test, transfer manually to exposure computer module 80 the measured value displayed on the exposure meter by means of setting mechanism 85 and read it into exposure computer 22 by pressing push button 101. To do this, it is necessary for exposure computer module 80 to have a plate 96 with a scale 95 adapted exposure meter employed. Otherwise, also after the manual transfer and input of the measured values, the automatic control of the output of flash unit 24 (FIG. 13) is effected in the same fashion as described above.

In contrast to FIG. 13, flash unit 24 may be so designed that its flash output is controlled not by switching on or off charging capacitors, but by varying the prevailing charging voltage in $\frac{1}{3}$ exposure value intervals.

Similar to the output control of flash unit 24, the brightness of one or more continuous light sources can be controlled automatically in $\frac{1}{3}$ exposure value steps on the basis of brightness measurements for continuous light at preselected values for the relative aperture and the exposure time.

COMPUTATION OF THE EXPOSURE VALUES FOR MIXED LIGHT (FLASH AND CONTINUOUS LIGHT TOGETHER)

It is again assumed that both plugs 31 and 32 of camera control unit 21 and of exposure computer 22 are connected directly or via connecting line 33 and that the reshutter control device 27 as well as the power pack 28 are connected to connectors 42 and 43 of the control unit 21 (FIG. 1). It is further assumed that brightness sensor 23 (FIG. 12) is connected to connector 34 of exposure computer 22. It is recalled that when brightness sensor 23 is connected, the coder 254 (FIG. 9) in the exposure computer 22 is inoperative, because switch 256 (FIG. 9) is then opened. Hence, the photographer need not pay attention to setting mechanism 85 of exposure computer module 60 (FIG. 3). The speed and the Schwarzschild code digit of the film material to be used are set either by means of setting mechanism 81 and 82 (FIG. 3) or, if film cassette 26 (FIG. 1) is used with built-in coders, read automatically into exposure computer 22.

The illumination of the subject to be photographed must now be effected both with continuous light and with flashlight, that is, with mixed light. For the description below the operation of the apparatus of the invention it is of minor importance whether the flash illumination occurs with constant or with controlled flash output. What is only necessary is to ensure a flash synchronization, e.g., via connector 44 of camera control 21 or via contact members 313 and 314 of connector 35 (FIG. 10) of exposure computer 22.

By means of setting mechanism 83 on exposure computer module 80 (FIG. 3) the photographer sets coder 291 (FIG. 9) for the type of light "mixed light" and for the required measuring mode "single-point measurement" or "two-point measurement". Let it first be assumed that the setting is for "single-point measurement". By means of setting mechanism 72 on camera front part 60 (FIG. 2) the photographer chooses the relative aperture he deems appropriate, with the selected stop value being indicated in display panel 74 (FIG. 2). The exposure measurement can be performed either as "external measurement" or as "internal measurement" with "open aperture" or with "working aperture". The following section describes first, by way of example, the "internal measurement" with "working aperture", reference being made to FIG. 15 for the technical explanation.

FIG. 15 shows the time history of the brightness $E_E$ in relation to the light striking the photosensitive film material during the exposure time $t_o$ to be determined by the exposure computer 22 (without taking into consideration the Schwarzschild behavior of the film material used). Exposure time $t_o$ is divided into two time intervals $t_T$ and $t_D$. Time interval $t_T$ is the interval during which the flashlight is superimposed on the continuous light. During the other time interval $t_D$ only the continuous light is available. The obliquely shaded surface represents the exposure H' of the film during the time interval $t_T$, while the surface occupied by a dotted screen represents the exposure H" of the film during time interval $t_D$. To achieve a correctly exposed photographic picture, the sum of exposures H' and H" must correspond to the nominal exposure $H_o$ of the film material. The duration of the time interval $t_D$ must therefore be chosen in such fashion that the above condition is met. Therefore, the following equations apply:

$$H' = \int_0^{t_T} E_E \cdot dt \quad \text{(XVII)}$$

$$H'' = E_E \cdot t_D \quad \text{(XVIII)}$$

$$H' + H'' = H_o \quad \text{(XIX)}$$

$$t_D = \frac{H_o - H'}{E_E} \quad \text{(XX)}$$

Equations (XII) and (XV) mentioned earlier apply to the nominal exposure $H_o$ and the APEX value $H_{oV}$ of the nominal exposure.

Similar to the illustration in FIG. 15, the exposure measurement is subdivided into a first partial exposure measurement with a test flash illumination, hereinafter referred to in short as flash measurement, and a second partial exposure measurement, hereinafter termed briefly as continuous light measurement, with the flash measurement and the continous light measurement being effected automatically immediately one after the other. The flash measurement is effected through integration of the brightness of the light striking the photoelectric converter 350 of the brightness sensor 23 (FIG. 12) over a specific, always constant, gate time $t_T$. For the subsequent continuous light measurement only the brightness of the light striking the photoelectric converter 350 and originating from the continuous light is measured.

After the camera and one or more flash bulbs have been aligned with the subject to be photographed, the photographer presses pushbutton 372 of brightness sensor 23 (FIG. 12). This causes exposure computer 22, through impulse contact 371, exposure computer 22 to perform automatically one after the other the flash measurement and the continuous light measurement. For the flash measurement the relay 355 in brightness sensor 23 (FIG. 12) remains deenergized, so that relay contact 354 connects signal output 353 of integrator and storage unit 352 to the input of analog frequency converter 356. By means of a clearing signal transmitted from output E of microprocessor component 235 (FIG. 11) to control input 362 of integrator and storage unit 352, the storage therein is cleared. Thereupon, by means of a firing signal from output M of microprocessor component 133 (FIG. 3) or from output F of microprocessor component 235 (FIG. 11) the firing of flash bulb(s) is triggered, during which process the shutter remains open. By means of photoelectric converter 350, an electric signal having a strength of the prevailing momentary brightness $E_M$ of the light striking converter 350 and being a function of the time, is generated and delivered to input 351 of integrator and storage unit 352. In unit 352 the fed electrical signal is integrated over the gate time $t_T$ which is controlled by means of a control signal delivered from signal output H of microprocessor component 233 (FIG. 9) to signal input 361 of integrator and storage unit 352. The position of setting mechanism 71 (FIG. 2) for choosing the exposure times has no influence on the gate time in this case. The result of the integration is a measured electrical value which is proportional to exposure $H_{M'}$, in accordance with the equation $$H_M{'} = \int_O^{tT} E_M \cdot dt \qquad (XXI)$$

and is stored in unit 352. The stored measured electrical value is fed via relay contact 354 to analog frequency converter 356, which generates electric impulses with a frequency which is proportional to the logarithm of the supplied measured value. These impulses are fed to signal input G of microprocessor component 233 (FIG. 9) via amplifier 357. On the basis of the frequency of the electrical pulses supplied to signal input G exposure computer 22 calculates first the APEX value $H_{Mv'}$ and from it, by taking the anti-logarithm, the first measured value $H_{M'}$, which is stored in the microprocessor.

For the subsequent continuous light measurement there appears at signal output I of microprocessor component 233 a voltage through which relay 355 in brightness sensor 23 is energized, so that relay contact 354 separates analog frequency converter 356 from integrator and storage unit 352 and connects directly to photoelectric converter 350. The latter now supplies to analog frequency converter 356 an electrical signal, the strength of which corresponds to the brightness $E_E$ on photoelectric converter 350 brought about by the continuous light. Analog frequency converter 356 now generates electric impulses, the frequency of which is proportional to the logarithm of the intensity of illumination $E_E$. These electric impulses are likewise fed to signal input G of microprocessor component 233 (FIG. 9) via amplifier 357. By means of the frequency of the impulses the exposure computer 22 calculates the APEX value $E_{Ev}$ and from it, by taking the anti-logarithm, the second measured value $E_E$, which is likewise stored in the microprocessor. As soon as this is accomplished, the exposure computer calculates in accordance with equation (XV) the APEX value $H_{ov}$ of the nominal exposure $H_o$ and from it, by taking the anti-logarithm, the corresponding nominal exposure $H_o$. This value is also stored in the microprocessor. Thereafter, by means of the exposure computer, the time interval $t_D$ is calculated in accordance with the above equation (XX) and from it the exposure time t required for a correct exposure of the intended photographic picture:

$$t_o = t_D + t_T \qquad (XXI)$$

$$t_o = t_o + t_K \qquad (I)$$

In equation (I), $t_K$ stands for the additional exposure time that may be required for taking into consideration the Schwarzschild behavior of the film material. As mentioned above, the photographer can set on exposure computer module 80 (FIG. 3), by means of setting mechanism 82, a Schwarzschild code digit K corresponding to the film material employed in case the exposure time exceeds ¼ second. The computed exposure time t is indicated in display panel 73 of camera front part 60 (FIG. 2) and at the same time read automatically into the device for controlling the exposure time of the shutter. As soon a film cassette 26 is inserted into cassette holder 25, the intended photographic picture can be taken by pressing release button 169 (FIG. 5), during which process the subject is illuminated both by flashlight and by continuous light.

As in the case of the other types of light and modes of measuring the exposure described above, the photographer can, prior to releasing the shutter, also in this case vary in any desired sequence the various exposure parameters, such as relative aperture, film speed, Schwarzschild code digit and deliberate individual exposure correction, after which every time a new arithmetical operation takes place and the resultant new exposure time is indicated in display panel 73 (FIG. 2) and read automatically into the device for exposure time control. Such changes of one or more exposure parameters may, for example, be desired to vary the difference between the resultant exposures H' and H" without having to vary the effective luminous energy of the flash bulbs and/or the brightness of the continuous light source.

In the event the photographer wishes to perform the light metering not with "working aperture" with the relative aperture $A_E$ provided for the shooting, but with "open aperture" with the "relative aperture" $A_M$, he sets the sliding handle 105 on exposure computer module 80 (FIG. 3) in the position "open aperture", so that the exposure computer is deprogrammed, such that the APEX values $H_{Mv'}$ and $E_{Mv}$ which results first during the light metering are converted immediately in accordance with the following equations:

$$H_{v'} = H_{Mv'} - (A_{Ev} - A_{Mv}) \qquad (XXII)$$

$$E_{Ev} = E_{Mv} - (A_{Ev} - A_{Mv}) \qquad (XXIII)$$

The APEX values $H_{v'}$ and $E_{Ev}$ calculated in accordance with these equations (XXII) and (XXIII) are converted into the measured values H' and $E_E$ by taking the anti-logarithm and are stored in the microprocessor, whereupon immediately the computation of the time interval $t_D$ in accordance with equation (XX) follows and everything else proceeds as described above with reference to the exposure measurement with "working aperture".

If the exposure is to be measured as an "external measurement", the electric switch 368 of brightness sensor (FIG. 12) is switched to the position "external measurement", which is preferably done automatically by placing a diffusor calotte in front of photoelectric converter 350. This causes the exposure computer to be programmed such that the APEX values $H_{Av'}$ and $E_{Av}$ which results initially during the exposure measurement are converted immediately in accordance with the equations:

$$H_{v'} = H_{Av'} - A_{Ev} \qquad (XXIV)$$

$$E_{Ev} = E_{Av} - A_{Ev} \qquad (XXV)$$

The APEX values $H_{v'}$ and $E_{Ev}$ computed in accordance with equations (XXIV) and (XXV) are converted into measured values H' and $E_E$ by taking the anti-logarithm H' and $E_E$ which are stored in the microprocessor, whereupon everything else proceeds as described above with reference to the "innal measurement" with "working aperture".

If the photographer has set the setting mechanism 83 on exposure computer module 80 (FIG. 3) and the coder 291 (FIG. 9) coupled thereto for the type of light "mixed light" and the exposure measuring mode "two-point measurement", two exposure measurements are to be performed with test flash and continuous light before shooting can take place. For the first exposure measurement photoelectric converter 350 of brightness sensor 23 (FIG. 12) is usually aligned with a bright portion of the subject and for the second exposure measurement on a dark part of the subject, or vice versa.

Each of these exposure measurements consists of a flash measurement and a continuous light measurement. For a better understanding, reference is made to FIG. 16, which consists of two associated diagrams of the type shown in FIG. 15. The upper diagram in FIG. 16 illustrates the time history of the brightness $E_{E1}$ of the light striking the photographic film material on a first part of the image where only relatively little continuous brightness is available and the flash will cause a substantial additional brightening up. The lower diagram, on the other hand, shows the time history of the brightness $E_{E2}$ of the light striking the film on a second part of the image where a relatively large amount of continuous-light brightness prevails and the flash will only cause relatively little additional brightening up. Both diagrams are subdivided into a first time interval $t_T$, in which both continuous light and flashlight are available, and a second time interval $t_D$ with continuous light alone. The exposure time $t_o = t_T + t_D$ is, of course, in both cases the same, since the exposure of both parts of the image occurs simultaneously. Also the time interval $t_T$ or $t_D$ is the same in both diagrams.

In the upper diagram the obliquely shaded surface represents the exposure $H_1'$ of the film during time interval $t_T$ and the surface occupied by a dotted screen represents the exposure $H_1''$ of the film during time interval $t_D$. Similarly, in the lower diagram the obliquely shaded surface represents the exposure $H_2'$ of the film during time interval $t_T$ and the surface occupied by a dotted screen the exposure $H_2''$ of the film during time interval $t_D$. The following equations apply:

$$H_1' = \int_O^{t_T} E_{E1} \cdot dt \qquad \text{(XXVI)}$$

$$H_1'' = E_{E1} \cdot t_D \qquad \text{(XXVII)}$$

$$H_1 = H_1' + E_{E1} \cdot t_D \qquad \text{(XXVIII)}$$

$$H_2' = \int_O^{t_T} E_{E2} \cdot dt \qquad \text{(XXIX)}$$

$$H_2'' = E_{E2} \cdot t_D \qquad \text{(XXX)}$$

$$H_2 = H_2' + E_{E2} \cdot t_D \qquad \text{(XXXI)}$$

To obtain a correctly exposed photographic picture, the exposure H resulting from an average luminous density of the subject (average grey) must be equal to the nominal exposure $H_o$ of the film material utilized. For further explanation, reference is made to FIG. 17, which represents schematically the so-called D log E curve of a negative film. This curve shows the correlation between the exposure H and the resulting optical density of the developed film. On the D log E curve 3 points are stressed which correspond to the nominal exposure $H_o$, the exposure resulting in the first image part, and the exposure $H_2$ resulting in the second image part. Generally, it is practical and advantageous to place the exposures $H_1$ and $H_2$, which results in the 2 image parts, symmetrically in relation to the nominal exposure $H_o$. For this purpose, the distances A and B in FIG. 17 must be equally large, namely:

$$\log H_o - \log H_1 = \log H_2 - \log H_o \qquad \text{(XXXII)}$$

Taking the anti-logarithm, yields the following equation:

$$(H_o/H_1) = (H_2/H_o) \qquad \text{(XXXIII)}$$

Through substitution in accordance with equations (XXVIII) and (XXXI) and transformation, the following equation results for the computation of the time interval $t_D$:

$$t_D = \frac{\sqrt{(H_2' \cdot E_{E1} - H_1' \cdot E_{E2})^2 + 4 E_{E1} \cdot E_{E2} \cdot H_o^2} - H_2' \cdot E_{E1} - H_1' \cdot E_{E2}}{2 E_{E1} \cdot E_{E2}} \qquad \text{(XXXIV)}$$

The earlier mentioned equations (XII) and (XV) apply for the nominal exposure $H_o$ and the APEX value $H_{ov}$ of the nominal exposure.

The two exposure measurements for the first and second image portion mentioned above are performed by the photographer, e.g., as "internal measurement" with "working aperture" as follows: When the photosensitive converter 350 of brightness sensor 23 (FIG. 12) is located at the site of the first image portion, the photographer presses the pushbutton 372 of the brightness sensor, so that a test flash is fired and automatically after one another a flashlight measurement and a continuous light measurement are made, as described in detail with reference to the "single-point measurement". During the flash measurement, the electrical signal produced on photoelectric converter 350 is integrated via gate time $t_T$ and a first measured value $H_1'$ is formed from the result of this integration and stored in the microprocessor. Through the subsequent continuous light measurement a second measured value $E_{E1}$ is produced and likewise stored in the micrprocessor. The photographer then brings the photoelectric converter at the site of the second image portion, whereupon he again presses pushbutton 372 of brightness sensor 23. This causes a second test flash to be triggered and a flash light measurement and a continuous light measurement are made automatically one after the other, as described above. During the flash measurement the electric signal generated on photoelectric converter 350 is again integrated over the gate time $t_T$ and a third measured value $H_2'$ is produced from the result of this integration and stored in the microprocessor. The following continuous light measurement results in a fourth measured value $E_{E2}$, which is likewise stored in the microprocessor. As soon as all four measured values are stored, the exposure meter calculates in accordance with equation (XV) the APEX value $H_{ov}$ of the nominal exposure in accordance with equation (XV) and from it, by taking the anti-logarithm, the nominal exposure $H_o$, which is also stored in the microprocessor. Subsequently, on the basis of the stored values in accordance with equation (XXXIV) the time interval $t_D$ and thereafter the desired exposure time $t = t_T + t_D + t_K$ is calculated, indicated in display panel 73 (FIG. 2) and read automatically into the device for controlling the exposure time. Thereupon, the intended photographic picture can be taken.

Prior to releasing the shutter the photographer has the possibility of experiencing the contrast between the exposures of the two photometrically measured image portions to be expected during the shooting, because immediately after the calculation of the exposure time t the exposure computer calculates the total exposure $H_1$ that results during the first exposure measurement in accordance with equation (XXVIII), as well as the total exposure $H_2$ that results during the second exposure measurement in accordance with equation (XXXI). Their APEX values $H_{1v}$ and $H_{2v}$ are obtained with the aid of values $H_1$ and $H_2$ and from it is computed the absolute value of the difference between $H_{1v}$ and $H_{2v}$.

By pressing pushbutton 102 on exposure computer module 80 (FIG. 3), the photographer can display the calculated difference in display panel 73 of camera front part 60 (FIG. 2) in exposure value steps and $\frac{1}{3}$ or $\frac{2}{3}$ exposure value step, as long as he presses pushbutton 102. After releasing pushbutton 102 there immediately reappears in display panel 73 the exposure time t calculated previously. The indicated difference gives information about the contrast between the two measured image portions. If the determined contrast remains within the limits which are permitted for the film material concerned, generally not exceeding 5 exposure value steps the picture provided can be made with the set exposure parameter values. If the determined contrast is too great or, in the photographer's opinion, too small, suitable measures must be taken to change the exposure of the subject and thereupon to repeat the exposure measurement as "single-point measurement" or "two-point measurement".

As in the measuring mode "single-point measurement", also in the measuring mode "two-point measurement" the exposure measurements can be performed either as "internal measurements" with "working aperture" or with "open aperture", or as "external measurements", because in the two last-mentioned cases the exposure computer converts the values resulting from the brightness measurements in each case automatically in accordance with equations (XXII) to (XXV) into values referred to the preselected relative aperture $A_E$. In the measuring mode "two-point measurement" the photographer can change between the first and second exposure measurement at will between "external measurement" and "internal measurement" or between "open aperture" and "working aperture", with the exposure computer correctly interpreting the measuring results in each instance.

Upon completion of the "single-point measurement" or the "two-point measurement" for "mixed light", the photographer can perform, in the position of setting mechanism 83 (FIG. 3) for "mixed light" and "information measurement" on any part of the focusing screen image or of the subject, additional exposure measurements for information purposes without thereby affecting the stored measured values and the last arithmetical result from the "single-point measurement" or from the "two-point measurement". In each of such information exposure measurements, a flashlight measurement and a continuous light measurement are performed automatically one after the other. On the basis of the resulting measured values and of the time interval $t_D$ determined during the previous "single-point measurement" or "two-point measurement", the exposure computer calculates the information exposure $H_i = H' + H''$, as well as the APEX value $H_{iv}$. By pressing push button 103 on exposure computer module 80 (FIG. 3) and actuating the electric contact 294 (FIG. 9), the exposure computer is caused to produce the algebraic difference between said APEX value $H_{iv}$ of the information exposure and the APEX value $H_{ov} = C_v - S_v$ of the mean or nominal exposure $H_o$ and to indicate it in display panel 73 (FIG. 2) in whole and $\frac{1}{3}$ or $\frac{2}{3}$ exposure value steps including sign, as long as push button 103 is depressed.

The additional information exposure measurements thus performed supply the photographer with more detailed information about the light distribution on the subject or on the focusing screen image, particularly also about the influence on the flashlight in relation to the continuous light. With the aid of this additional information, the photographer can decide, prior to pushing release button 169 (FIG. 5), whether the originally provided illumination of flashlight and continuous light is adequate or needs to be altered. Solely by varying the relative aperture preselected by means of setting mechanism 72 (FIG. 2) can the influence of the continuous light on the intended photographic picture in relation to the influence of the flashlight be varied, because then a different exposure time results in each situation. When, following an information exposure measurement [as long as setting mechanism 83 (FIG. 3) is still set to "information measurement"], an exposure parameter value, e.g., the preselected relative aperture $A_E$, the exposure correction factor C, the film speed S, or the Schwarzschild code digit K has been set, the exposure computer calculates immediately the resulting new exposure time t, which is again stored in the microprocessor, read into the device for controlling the exposure of the shutter, and indicated in display panel 73 of camera front part 60 (FIG. 2). Immediately thereafter, the exposure computer recalculates the APEX value $H_{iv}$ of the information exposure $H_i = H' + H''$, as well as the algebraic difference between this APEX value $H_{iv}$ and the APEX value $H_{ov} = C_v - S_v$ of the mean or nominal exposure $H_o$. By pressing push button 103 on exposure computer module 80 (FIG. 3) the photographer can indicate the calculated difference in display panel 73 in exposure value steps and $\frac{1}{3}$ or $\frac{2}{3}$ exposure value step, as long as push button 103 is depressed. Upon release of push button 103 there reappears in display panel 73 the display of the exposure time t calculated previously. For taking the photographic picture with this exposure time t and with the other exposure parameter values now available, it is unnecessary to reset previously the setting mechanism 83 (FIG. 3) from "information measurement" to "single-point measurement" or "two-point measurement".

When the photographer, on the basis of one or more information exposure measurements, alters the position of the flash bulbs, increases or decreases the number of flash bulbs employed, changes the flash output of all or of individual flash bulbs and/or modifies the continuous light, it is necessary to repeat the "single-point measurement" or the "two-point measurement", so that the new photometric measuring data are read into the exposure computer and the resulting exposure time is recalculated.

Exposure computer module 80 (FIG. 3) may, if required, be so designed that even in the event of a determination of the exposure values for mixed light, instead of the brightness sensor 23 (FIG. 12) other commercial light meters are employed, which are suitable for measuring continuous light and flashlight. However, in this case, a plate 96 with a scale 95, which is adapted to the light meter utilized, must be employed on the exposure computer model 80 (FIG. 3). This scale 95 must have a graduation both for flashlight and for continuous light.

The measured values determined by means of the light meter must then be transferred manually by means of setting mechanism 85 (FIG. 3), using scale 95 and dial 94 on the exposure computer and read into the microprocessor by pressing push button 101 of exposure computer module 80 (FIG. 3). Attention must be paid to the sequence of the measured value input: First, input of the measured value from the test flash illumination (which may include a percentage of continuous light) and, thereafter, input of the measured value from the continuous light illumination.

CONTROL OF SEVERAL FLASH UNITS WITH AUTOMATICALLY CONTROLLED FLASH OUTPUT

Figure 14:
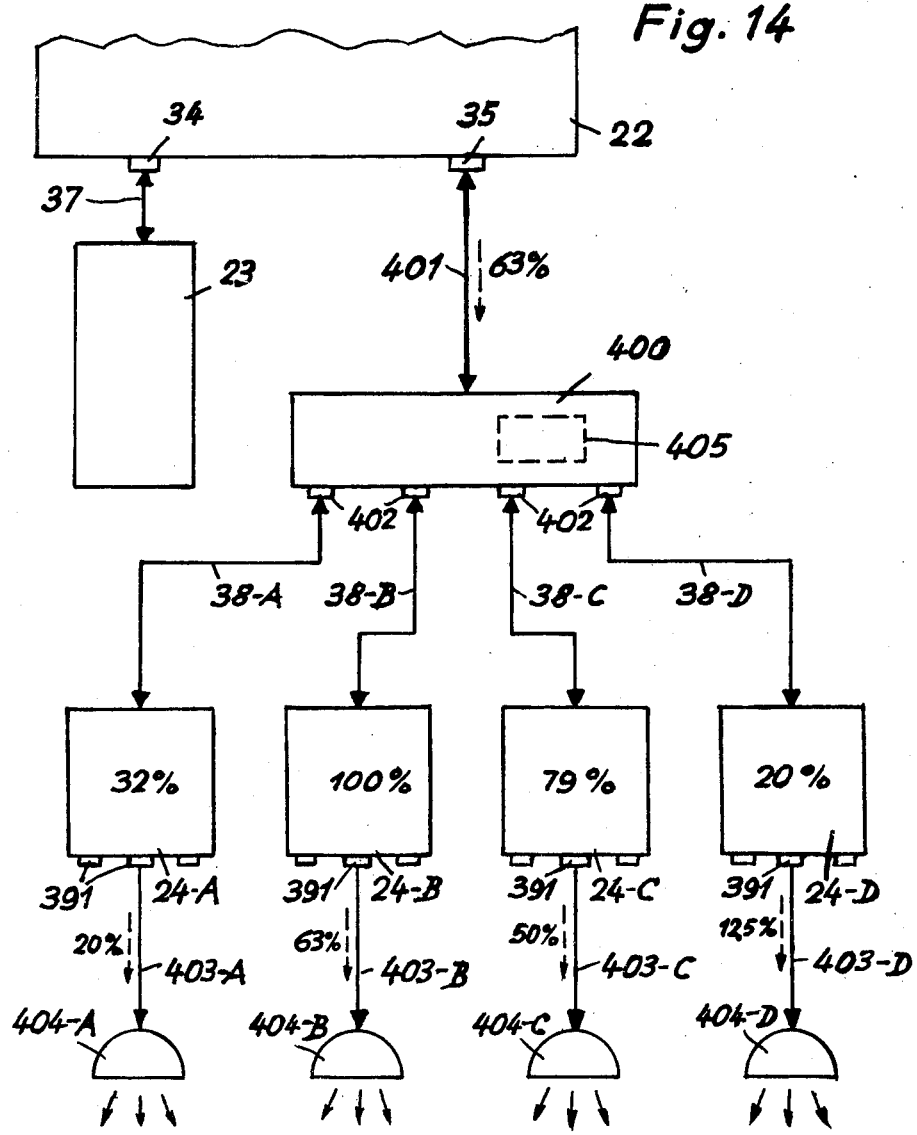
FIG. 14 is a schematic representation of a variation of the apparatus of the invention having a plurality of controlled flash guns.

With reference to FIG. 14, below is a description of a variation of the apparatus embodying the invention, in which a plurality of flash units are employed having an automatically controlled flash output, such as shown in FIG. 13. FIG. 14 shows exposure computer 22, which is designed in accordance with FIGS. 8 through 11. Brightness sensor 23 is connected to connector 34 of exposure computer 22 by means of multiwire connecting line 37. Brightness sensor 23 has the design shown in FIG. 12.

Now, a flashgun/interface unit 400 is connected to connector 35 of exposure computer 22 by means of a multiwire connecting line 401. Unit 400 has a plurality of connectors 402, each of which is designed as connector 35 of exposure computer 22 and serves to connect the multiwire connecting line 38-A, 38-B, 38-C or 38-D to a flash unit 24-A, 24-B, 24-C or 24-D. Each of these flash units has the design illustrated in FIG. 13 and described with reference thereto. A flash bulb 404-A, 404-B, 404-C or 404-D is connected to one of output connectors 391 of each flash unit 24-A through 24-D by means of a connecting line 403-A, 403-B, 403-C or 403-D. In principle, it would also be possible to connect several flash bulbs to individual or to all the flash units.

Generator/interface unit 400 contains not only multiple branches between the individual conductors of connecting line 401 and the correspoding contact members of connector 402, but also has a switching arrangement 405, which receives the electrical signals from signal outputs E, F, G and H of control electronics 385 (FIG. 13) of each flash unit 24-A through 24-D and, after selection, feeds them to exposure computer 22. It is recalled that through these signals the extent of the range of power adjustment of the flash unit is reported to the microprocessor in the exposure computer 22. Circuit arrangement 405 in device 400 is so designed that it transmits via connecting line 401 to exposure computer 22 only those signals which signal the smallest range of power adjustment of the connected flash units 24-A through 24-D. With reference to FIG. 13, it has already been mentioned that control electronics 385 have a data input device 398 in order to be able to program control electronics 385 selectively in such a way that the maximum flash output of the flash unit concerned is either 100% or is reduced to one of the lower percentages indicated in Table I, with the range of power naturally being reduced accordingly.

In the example of FIG. 14 it is assumed that in order to achieve a desired light distribution, the maximum flash output of flash unit 24-A is set at 32%, of unit 24-B at 100%, of unit 24-C at 79%, and of unit 24-D at 20%. Therefore, in this case, unit 24-D has the smallest residual range of power adjustment which, according to Table I contains six other stages, namely, from 20% down to 5%. Thus, exposure computer 22 is signalled via switching arrangement 405 in interface unit 400 that for the automatic control of the flash output of all connected flash units 24-A through 24-D a range of adjustment of 6 steps is available.

The operation of the variation of the apparatus according to the invention shown in FIG. 14 is as follows:

The exposure values for illuminating the subject with flash with automatic control of the flash energy are to be computed. In principle, all that has been said above in the section "COMPUTATION OF THE EXPOSURE VALUES FOR FLASH WITH AUTOMATIC CONTROL OF THE FLASH OUTPUT" applies. To avoid repetitions, only the differences are pointed out below. For the light metering on the basis of test flash illumination, exposure computer 22 transmits via generator/interface unit 400 to connected flash units 24-A through 24-D the command "100% output". However, since these flash units, as mentioned above, have previously been set at different maximum flash outputs, the test flash illumination is actually performed with the preset outputs. Thus, 32% output is fed to flash bulb 404-A, 100% output to flash bulb 404-B, 79% output to flash bulb 404-C, and 20% output to flash bulb 404-D.

Now, if as a result of the exposure measurement during the test flash illumination, exposure computer 22 results in reducing the flash output of all flash bulbs 404-A through 404-D to 53% in relation to the preset values in order to obtain a correctly exposed photographic picture, the microprocessor of exposure computer 22 sends the command "63% output" to flash units 24-A through 24-D via unit 400. This is done by delivering to signal inputs A, B, C and D of control electronics 385 (FIG. 13) of each flash unit the signals 1, 1, 0 or 0 shown in Table I, line 3. This causes the automatic reduction of the flash output of each flash unit 24-A through 24-D by two output steps. Therefore, during the next shooting, flash unit 24-A delivers to flash bulb 404-A a flash output of 20%, flash unit 24-B to flash bulb 404-B a flash output of 63%, flash unit 24-C to bulb 404-C a flash output of 50%, and flash unit 24-D to bulb 404-D a flash output of 12.5%. These output values are indicated with a broken-line arrow in FIG. 14.

If, as a result of the light metering during the test flash illumination, exposure computer 22 manages to deliver to flash bulbs 404-A through 404-D insufficient light for a correctly exposed photographic picture and the setting mechanism 83 on exposure computer module 80 (FIG. 3) is set at "multiple flash", the required number of flashes is calculated and displayed by the exposure computer, with automatic adaptation of the flash output, e.g., by one or two output steps, as required.

In another type of the apparatus, flash units 24-A through 24-D are set up for varying the flash output. However, the associated control electronics 385 and the data input unit 398 (FIG. 13) are not located in the flash unit concerned, but in the flash unit/interface mechanism 400. The operation is the same as described above, but the photographer has the advantage that he can perform the individual presetting of the maximum flash output for the various flash units centrally on mechanism 400.

It will be understood that details of the apparatus described herein can be modified variously. Thus, for example, the microprocessor in camera control unit 21, as well as that in exposure computer 22, can be made up of microprocessor components other than those mentioned by way of example. Also, the microprocessor may be composed of conventional components.

While in the embodiment described with reference to FIGS. 1 through 12, the apparatus is built according to the building-block concept, in many instances it may be practical to design it in the form of a compact unit that includes exposure computer 22 and brightness sensor 23, as well as the parts of camera control unit 21 needed for setting a selected relative aperture and exposure time (for flash measurements) and for displaying the aperture value and aperture time, as well as the arithmetical results of exposure computer 22. Such an apparatus would then enable exposure measurements to be taken and the computation and display of the measured results and of the exposure parameters required for obtaining correctly exposed photographic pictures. The iris diaphragm of the camera lens and the exposure time of the shutter shall then be set manually on the camera with the aid of the computed and displayed values of the relative aperture and exposure time.

In the embodiment described herein, the relative aperture has priority over the exposure time, that is, the photographer can preselect a relative aperture that appears practical to him and let the apparatus calculate and set the appropriate exposure time. Instead of this, it is also possible, to design the apparatus with time priority or to provide the possibility of switching between aperture and time priority.

Since in the apparatus described herein all the data are input and output digitally into the microprocessor, it is likewise easy to provide for a remote input and output via wire or radio or over an infrared or ultrasound transmission path.

The microprocessor of exposure computer 22, in an advantageous type of the apparatus described herein, can also be designed and programmed in such a way that in the event that exposure measurements are evaluated with mixed light, that is, flash and continuous light, the flash energy of at least one connected flash unit 24 is controlled automatically so that a desired ratio results between the exposures by means of flashlight on the one hand and continuous light on the other. It is also possible to design and program the microprocessor in such a way that with mixed light and on the basis of the test exposure measurements the iris diaphragm of the camera lens is automatically set at a working aperture by means of which, with unchanged flash output, a required ratio is achieved with flash on the one hand and with continuous light on the other.

Furthermore, it is also possible, instead of at least one flash unit 24 shown in FIG. 14, to connect a similarly designed apparatus for the automatic control of the brightness of at least one electric continuous-light source to exposure computer 22, with the brightness control again being performed by means of signals from signal outputs L, M, N and O of microprocessor component 234 (FIG. 10). In this case as well, backward measurement of the available range of adjustment by means of signals to signal inputs P, Q, R and S of microprocessor component 234 is possible. It will be understood that the last-mentioned apparatus for controlling the brightness of at least one continuous-light source can also be employed for mixed-light illumination in conjunction with one or more flash bulbs, whose flash output need not be adjustable.

For exposure measurements with flash or with mixed light it is possible to design brightness sensor 23 and exposure computer 22 in such fashion that the exposure measurement is initialized by the leading edge of the test flash itself, so that in this case the pressing of pushbutton 372 of brightness sensor 23 is dispensed with.

In another type of the apparatus, the microprocessor of exposure computer 22 can be programmed in such a way that in the positions of setting mechanism 83 (FIG. 3) for "internal measurement" of the brightness in the measuring mode "two-point measurement" one light metering is automatically performed with open aperture and the other light metering with the preselected working aperture by automatically setting iris diaphragm 64 of camera lens 65 through the microprocessor to its fully opened position or to stop it down to the preselected aperture value. Both measured values from these two light meterings are stored in the microprocessor and displayed momentarily in display panel 73 (FIG. 2). The exposure time to be used for the intended shooting is calculated by means of the average of the two stored measured values.

It is likewise possible to program the microprocessor in such fashion that in each situation two "internal measurements" of the brightness are performed consecutively, with one brightness measurement—as usual—being performed with open shutter and the other brightness measurement with closed shutter, so that the influence of stray light, e.g., through the focusing screen, can be compensated through an arithmetical operation during the computation of the required exposure time.

We claim:

1. An apparatus for calculating and displaying the values of exposure parameters for photographic pictures, having electronic circuitries for the logic operation of the exposure parameter values which determine the exposure and which, in the form of electrical digitally coded signals, are input and output at signal inputs or signal outputs of the combinatorial logic circuitries, and having at least one display device, wherein a manually operated selector (83, 291) is assigned to the combinatorial logic circuitries (130, 230) for the selective programming of the combinatorial logic circuitries for the input and processing of measured values resulting from brightness measurements for continuous light or from exposure measurements for flashlight, wherein during the setting of the selector (83, 291) for exposure measurements for flashlight the combinatorial logic circuitries (130, 230) are programmed in such fashion that by means of a measured value obtained for a single test flash illumination they calculate the difference between the same and a nominal exposure value, including algebraic sign, and thereafter, by means of at least one digital display device (97, 98) indicate the same as a request for making a corresponding correction of at least one of the read-in exposure parameter values or of the flash illumination, and wherein the combinatorial logic circuitries (130, 230) are programmable in such fashion that in the presence of too low a measured value obtained for the test flash illumination the combinatorial logic circuitries (130, 230) calculate the number of successive equal flashes required for achieving the nominal exposure, and any residual difference in relation to the nominal exposure, and display the same by means of the display device (97, 98).

2. The apparatus as set forth in claim 1, wherein the combinatorial logic circuitries (130, 230) are programmable selectively for the calculation of at least one required exposure parameter value resulting from a single measured brightness or exposure value or by means of two or more consecutively read-in measured brightness or exposure values, and wherein in case of two or more measured values the latter are automatically stored after they have been read in, and the mean value is produced from the stored measured values and thereafter is utilized for calculating the required exposure parameter value.

3. The apparatus as set forth in claim 1, wherein by means of the selector (83, 291) the combinatorial logic circuitries (130, 230) are further programmable for performing exposure measurements with mixed light which is composed of flashlight as well as continuous light, signal inputs and signal outputs of the combinatorial logic circuitries (130, 230) being connected with a brightness sensor (23) which has a photoelectric converter (350), an analog to frequency converter (356), an integrator/storage unit (352) controlled by a gate time signal, and a changeover device (354, 355), by means of which the integrator/storage unit (352) can be switched off for brightness measurements with flashlight, the gate time of the integrator/storage unit (352) being controlled by the combinatorial logic circuitries (130, 230), and the changeover means (354, 355) being controlled by a signal from a signal output of the combinatorial logic circuitries (130, 230) as a function of the program set by means of the selector (83, 291), and wherein during the setting of the selector (83, 291) for exposure measurements for mixed light the combinatorial logic circuitries (130,230) are programmed in such fashion that they automatically and consecutively trigger an exposure measurement for test flash illumination and a brightness measurement for continuous-light illumination, so that there is read consecutively into the combinatorial logic circuitries a measured value resulting from an exposure measurement for the single test flash illumination, possibly with a continuous-light component, and a measured value resulting from the brightness measurement for continuous-light illumination, whereupon the two measured values are automatically processed with each other and with the other read-in exposure parameter values to calculate at least one required exposure parameter value.

4. The apparatus as set forth in claim 2, characterized in that the combinatorial logic circuitries (130, 230) control the display device (73) in such fashion that the latter indicates temporarily in each situation the last-input measured brightness or exposure value.

5. The apparatus as set forth in claim 2, characterized in that a signal input of the combinatorial logic circuitries (130, 230) is connected to a manually operated electric contact (102, 293), through the actuation of which the combinatorial logic circuitries can be programmed in such fashion that they compute the difference between the highest and the lowest valued brightness or exposure value stored and display the same by means of the display device (73).

6. The apparatus as set forth in claim 1, characterized in that at signal inputs and signal outputs of the combinatorial logic circuitries (130, 230) there is connected a brightness sensor (23) which has a photoelectric converter (350), an analog frequency converter (356), an integrator/storage unit (352) controlled by a gate time signal, and a changeover device (354, 355), by means of which the integrator/storage unit (352) can be switched off for brightness measurements with continuous light and switched on for exposure measurements with flashlight, that for exposure measurements with flashlight the gate time of the integrator/storage unit (352) is controlled by the combinatorial logic circuitries (130, 230) in conformity with the exposure time read-in by means of a coder (196), and that the changeover means (354, 355) is controlled by a signal from a signal output of the combinatorial logic circuitries (130, 230) as a function of the program set by means of the selector (83, 291).

7. The apparatus as set forth in claim 3, characterized in that the combinatorial logic circuitries (130, 230) can be programmed for the calculation of at least one required exposure parameter value on the basis of the mean value of two exposure values which are each obtained, and stored into memory, from a measured value resulting from an exposure measurement for test flash illumination and from a mesured value resulting from a brightness measurement for test flash illumination.

8. The apparatus as set forth in claim 3, characterized in that upon completion of at least one exposure measurement for mixed light the selector (83, 291) can be switched to a position in which the combinatorial logic circuits (130, 230) are programmed for performing any number of additional exposure measurements for test flash illumination and continuous-light illumination, through which additional measurements the result of the completed exposure measurement stored into memory is not affected, and that a manually operated electric contact (103, 294) is assigned to the combinatorial logic circuitries (130, 230), through the actuation of which the measured value resulting from the immediately preceding additional exposure measurements or its difference in relation to a nominal value is indicated for informational purposes in a display device (73).

9. The apparatus as set forth in claims 1, 2, or 3, characterized in that at least one light-controlling means (24) for controlling the light output of artificial flashlight or continuous-light sources is detachably connected to the combinatorial logic circuits (130, 230) and contains control electronics (385) with signal inputs and which, in turn, are designed to control the light sources, such that the light output of the light sources is varied automatically in accordance with the difference calculated by the combinatorial logic circuitries between an exposure value obtained from at least one brightness or exposure measurement and a nominal exposure value.

10. The apparatus as set forth in claim 9, characterized in that the light output can be varied by the light-controlling means (24) in identical intervals as the other exposure parameters, preferably in ⅓ exposure steps.

11. The apparatus as set forth in claim 9, characterized in that the control electronics (385) of the light-controlling means (24) has signal outputs which are connected to corresponding signal inputs of the combinatorial logic circuitries (130, 230) and read into the combinatorial logic circuitries by means of coded digital signals the extent of the available range of light output adjustment.

12. The apparatus as set forth in claim 11, characterized in that a data input device (398) is assigned to the control electronics (385) of the light-controlling means (24), said data input device (398) being utilized for the manual input of signals to vary the range of adjustment for the automatic light-output control.

13. The apparatus as set forth in claim 12, characterized in that the range of adjustment can be varied in equal intervals as the light output itself.

14. The apparatus as set forth in claim 11, characterized in that a plurality of light-controlling means (24-A through 24-D) for controlling the light output of flashlight or continuous-light sources are connected to the combinatorial logic circuitries (130, 230) via a unit (400, 405) which selects the signals delivered by the control outputs of the control electronics (385) of all the light-controlling means and transmits to the combinatorial logic circuitries only the signals that indicate the smallest range of light-output adjustment.

* * * * *